(12) United States Patent
Takahashi et al.

(10) Patent No.: US 10,367,176 B2
(45) Date of Patent: Jul. 30, 2019

(54) POWER STORAGE DEVICE AND ELECTRONIC DEVICE

(71) Applicant: Semiconductor Energy Laboratory Co., LTD., Atsugi-shi, Kanagawa-ken (JP)

(72) Inventors: Minoru Takahashi, Nagano (JP); Daisuke Furumatsu, Kanagawa (JP); Daisuke Suzawa, Kanagawa (JP); Hirofumi Misono, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 300 days.

(21) Appl. No.: 15/138,596

(22) Filed: Apr. 26, 2016

(65) Prior Publication Data

US 2016/0322612 A1    Nov. 3, 2016

(30) Foreign Application Priority Data

May 1, 2015    (JP) ................................. 2015-094030

(51) Int. Cl.
*H01M 10/05*   (2010.01)
*H01M 2/02*    (2006.01)
(Continued)

(52) U.S. Cl.
CPC .......... *H01M 2/0275* (2013.01); *H01G 11/26* (2013.01); *H01G 11/28* (2013.01);
(Continued)

(58) Field of Classification Search
CPC .......... H01M 2/0275; H01M 10/0585; H01M 10/0525; H01G 11/06; H01G 11/28; H01G 11/78
See application file for complete search history.

(56) References Cited

U.S. PATENT DOCUMENTS 9,196,906 B2    11/2015   Kuriki et al.
2006/0204849 A1*   9/2006   Saito ..................... H01M 4/131
                                                              429/231.1
(Continued)

FOREIGN PATENT DOCUMENTS

JP    2013-211262    10/2013
JP    2015-38868     2/2015

*Primary Examiner* — Osei K Amponsah
(74) *Attorney, Agent, or Firm* — Nixon Peabody LLP; Jeffrey L. Costellia

(57) ABSTRACT

The power storage device includes a positive electrode, a negative electrode, an electrolyte, and an exterior body. The positive electrode includes a positive electrode current collector and a positive electrode active material layer in contact with the positive electrode current collector. The negative electrode includes a negative electrode current collector and a negative electrode active material layer in contact with the negative electrode current collector. The positive electrode active material layer and the negative electrode active material layer overlap with each other. The positive electrode, the negative electrode, and the electrolyte are surrounded by the exterior body. When a length of the positive electrode active material layer is $P_y$, a width of the positive electrode active material layer is $P_x$, a length of the negative electrode active material layer is $N_y$, and a width of the negative electrode active material layer is $N_x$, $P_y > P_x$, $N_y > N_x$, and $N_y > P_y + N_x - P_x$ are satisfied.

20 Claims, 32 Drawing Sheets

(51) Int. Cl.
*H01M 10/0585* (2010.01)
*H01M 10/0525* (2010.01)
*H01G 11/28* (2013.01)
*H01G 11/26* (2013.01)
*H01G 11/70* (2013.01)
*H01G 11/82* (2013.01)
H01G 11/06 (2013.01)

(52) U.S. Cl.
CPC .............. *H01G 11/70* (2013.01); *H01G 11/82* (2013.01); *H01M 10/0525* (2013.01); *H01M 10/0585* (2013.01); H01G 11/06 (2013.01); Y02E 60/13 (2013.01)

(56) References Cited

U.S. PATENT DOCUMENTS

| | | | |
|---|---|---|---|
| 2011/0269020 A1* | 11/2011 | Kamiyama | H01G 11/28 429/218.1 |
| 2013/0224562 A1 | 8/2013 | Momo | |
| 2015/0022957 A1 | 1/2015 | Hiroki et al. | |
| 2015/0111088 A1 | 4/2015 | Hiroki et al. | |
| 2015/0140396 A1 | 5/2015 | Yamazaki | |
| 2015/0140400 A1 | 5/2015 | Yamazaki et al. | |
| 2015/0147626 A1 | 5/2015 | Tajima et al. | |
| 2015/0155530 A1 | 6/2015 | Takahashi et al. | |
| 2015/0162590 A1 | 6/2015 | Takahashi et al. | |
| 2016/0133987 A1* | 5/2016 | Choi | H01M 10/058 429/7 |

* cited by examiner

POWER STORAGE DEVICE AND ELECTRONIC DEVICE

BACKGROUND OF THE INVENTION

1. Field of the Invention

One embodiment of the present invention relates to a power storage device and an electronic device.

Note that one embodiment of the present invention is not limited to the above technical field. One embodiment of the invention disclosed in this specification and the like relates to an object, a method, and a manufacturing method. One embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

Note that electronic devices in this specification generally means devices driven by electricity; and electro-optical devices, information terminal devices, and the like are all electronic devices. Some electronic devices incorporate a power storage device. Note that "incorporate" in this specification refers not only to incorporation of something in a manner that it cannot be detached for replacement, but also to incorporation of something in a manner that it can be freely detached like a battery pack or the like.

2. Description of the Related Art

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for the uses of electronic devices, for example, portable information terminals such as mobile phones, smartphones, and laptop computers, portable music players, and digital cameras; medical equipment; and next-generation clean energy vehicles such as hybrid electric vehicles (HEVs), electric vehicles (EVs), full-cell hybrid vehicles, and plug-in hybrid electric vehicles (PHEVs). The lithium-ion secondary batteries are essential for today's information society as rechargeable energy supply sources.

Also, wearable devices that are used while being worn on the users have been actively developed. In order to be used more comfortably by the users, the wearable devices often have curved shapes or have flexibility. In addition, power storage devices with curved shapes or flexibility to be incorporated in such wearable devices have been developed.

For example, Patent Document 1 discloses a sheet-like power storage device which can be curved in at least one axis direction, and electronic devices including the power storage device. Patent Document 2 discloses a flexible secondary battery and an arm-worn electronic device including the secondary battery.

REFERENCE

Patent Document

[Patent Document 1] Japanese Published Patent Application No. 2013-211262

[Patent Document 2] Japanese Published Patent Application No. 2015-38868

SUMMARY OF THE INVENTION

For greater diversity in functions and shapes of wearable devices, development of power storage devices in which degradation in cycle performance, a decrease in capacity, and the like are not easily caused even when they are used in a curved state is demanded.

Thus, one embodiment of the present invention is to provide a power storage device in which degradation in cycle performance is not easily caused even when it is used in a curved state. Another object of one embodiment of the present invention is to provide a power storage device in which a decrease in capacity and the like are not easily caused even when it is used in a curved state. Another object of one embodiment of the present invention is to inhibit deposition of a metal that is derived from carrier ions or the like of an electrode when a power storage device is used in a curved state. Another object of one embodiment of the present invention is to provide a power storage device in which the area of a region where a positive electrode and a negative electrode overlap with each other changes little when the power storage device is curved.

Further, an object of one embodiment of the present invention is to provide a flexible electronic device. Another object of one embodiment of the present invention is to provide an electronic device including a curved portion.

Another object of one embodiment of the present invention is to provide a novel electrode, a novel power storage device, a novel electronic device, or the like. Note that the description of these objects does not disturb the existence of other objects. One embodiment of the present invention does not necessarily achieve all the objects listed above. Other objects will be apparent from and can be derived from the description of the specification, the drawings, the claims, and the like.

One embodiment of the present invention is a power storage device including a positive electrode, a negative electrode, an electrolyte, and an exterior body. In the power storage device, the positive electrode includes a positive electrode current collector and a positive electrode active material layer in contact with the positive electrode current collector, and the negative electrode includes a negative electrode current collector and a negative electrode active material layer in contact with the negative electrode current collector. The positive electrode active material layer and the negative electrode active material layer overlap with each other. The positive electrode, the negative electrode, and the electrolyte are surrounded by the exterior body. When a length of the positive electrode active material layer is $P_y$, a width of the positive electrode active material layer is $P_x$, a length of the negative electrode active material layer is $N_y$, and a width of the negative electrode active material layer is $N_x$, $P_y > P_x$, $N_y > N_x$, and $N_y > P_y + N_x - P_x$ are satisfied.

In the power storage device having the above-described structure of one embodiment of the present invention, the positive electrode or the negative electrode is configured to be curved. Furthermore, in the power storage device having the above-described structure of one embodiment of the present invention, the positive electrode or the negative electrode includes a curved portion.

One embodiment of the present invention is a power storage device including a stack, an electrolyte, and an exterior body. In the power storage device, the stack includes a positive electrode, a negative electrode, and a separator.

The positive electrode includes a positive electrode current collector and a positive electrode active material layer in contact with the positive electrode current collector. The negative electrode includes a negative electrode current collector and a negative electrode active material layer in contact with the negative electrode current collector. The positive electrode active material layer and the negative electrode active material layer overlap with each other. The stack and the electrolyte are surrounded by the exterior body. The stack is configured to be curved. The stack in a curved state includes a convex surface and a concave surface. When a radius of curvature of the concave surface is r, a height of the stack is z, a length of the positive electrode active material layer is $P_y$, and a length of the negative electrode active material layer is $N_y$, $N_y \geq P_y(z/r+1)$ is satisfied.

One embodiment of the present invention is a power storage device including a stack, an electrolyte, and an exterior body. In the power storage device, the stack includes a positive electrode, a negative electrode, and a separator. The positive electrode includes a positive electrode current collector and a positive electrode active material layer in contact with the positive electrode current collector. The negative electrode includes a negative electrode current collector and a negative electrode active material layer in contact with the negative electrode current collector. The stack and the electrolyte are surrounded by the exterior body. The stack includes a curved portion. The curved portion includes a convex surface and a concave surface. When a radius of curvature of the concave surface is r, a height of the stack is z, a length of the positive electrode active material layer is $P_y$, and a length of the negative electrode active material layer is $N_y$, $N_y \geq P_y(z/r+1)$ is satisfied.

In the power storage device having the above-described structure of one embodiment of the present invention, the exterior body includes a film.

The power storage device having the above-described structure of one embodiment of the present invention may further includes a first electrode and a second electrode. In the power storage device, the first electrode and the second electrode both function as positive electrodes or negative electrodes. The first electrode includes a first current collector and a first active material layer, and the second electrode includes a second current collector and a second active material layer. When a length of the first active material layer is $A_y$ and a length of the second active material layer is $B_y$, $A_y > B_y$ is satisfied.

One embodiment of the present invention is an electronic device including the power storage device having any of the above-described structures and a flexible housing. One embodiment of the present invention is an electronic device including the power storage device having any of the above-described structures and a housing including a curved portion.

One embodiment of the present invention can provide a power storage device in which the area of a region where a positive electrode and a negative electrode overlap with each other changes little when the power storage device is curved. Furthermore, one embodiment of the present invention can inhibit deposition of a metal that is derived from carrier ions or the like of an electrode when a power storage device is used in a curved state. Moreover, one embodiment of the present invention can provide a power storage device in which a decrease in capacity and the like are not easily caused even when it is used in a curved state. Furthermore, one embodiment of the present invention can provide a power storage device in which degradation in cycle performance is not easily caused even when it is used in a curved state.

One embodiment of the present invention can provide a flexible electronic device. Furthermore, one embodiment of the present invention can provide an electronic device including a curved portion.

Furthermore, a novel electrode, a novel secondary battery, a novel power storage device, or a novel electronic device can be provided. Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

In the accompanying drawings:

FIGS. 21A, 21B, 21C1, 21C2, and 21D illustrate a method for manufacturing a power storage device;

FIGS. 25A and 25B illustrate a conductive additive and the like;

FIGS. 26A and 26B illustrate a conductive additive and the like;

FIGS. 30A, 30B1, and 30B2 illustrate examples of electronic devices;

DETAILED DESCRIPTION OF THE INVENTION

Figure 1A:
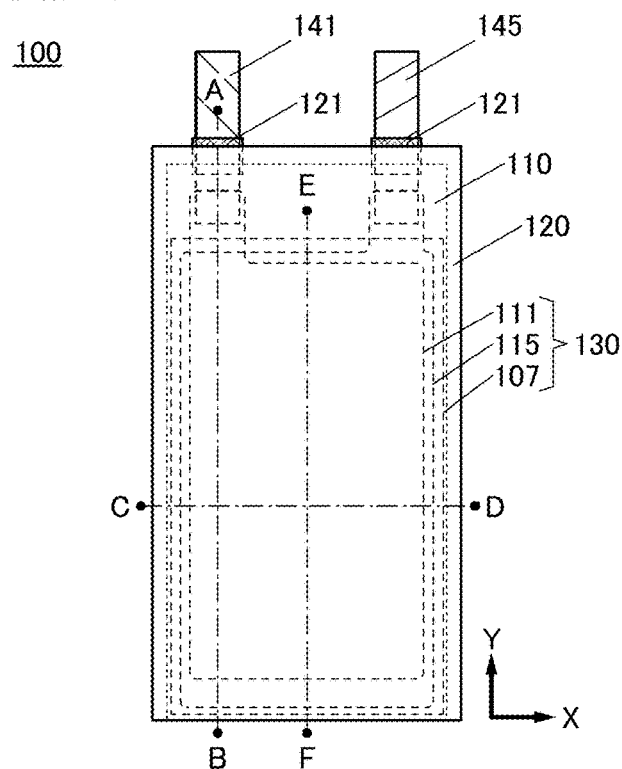
FIGS. 1A to 1D are a front view, a side view, and cross-sectional views illustrating one embodiment of the present invention.

Embodiments of the present invention will be described below in detail with reference to the drawings. However, the present invention is not limited to the following description, and it is easily understood by those skilled in the art that modes and details disclosed herein can be modified in various ways. Further, the present invention is not construed as being limited to description of the following embodiments.

Note that the term "connected" in this specification and the like includes the case where components are connected through an "object having any electric function". There is no particular limitation on the "object having any electric function" as long as electric signals can be transmitted and received between the components connected through the object.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

The position, size, range, or the like of each component illustrated in drawings and the like is not accurately represented in some cases for easy understanding. Therefore, the disclosed invention is not necessarily limited to the position, the size, the range, or the like disclosed in the drawings and the like.

In this specification and the like, ordinal numbers such as "first", "second", and "third" are used in order to avoid confusion among components, and the terms do not limit the number of components.

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to −30° and less than or equal to 30°.

(Embodiment 1)

In this embodiment, a power storage device of one embodiment of the present invention is described with reference to FIGS. 1A to 1D, FIGS. 2A to 2D, FIGS. 3A and 3B, FIGS. 4A to 4C, FIGS. 5A to 5F, and FIGS. 6A to 6D.

Figure 1B:
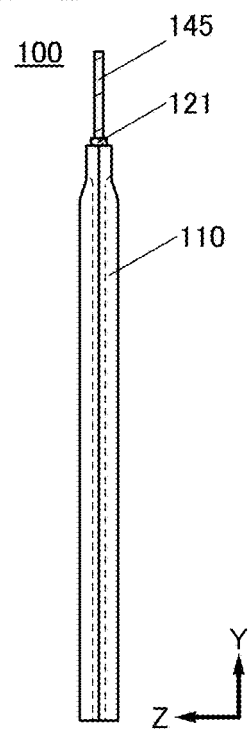
Figure 1C:
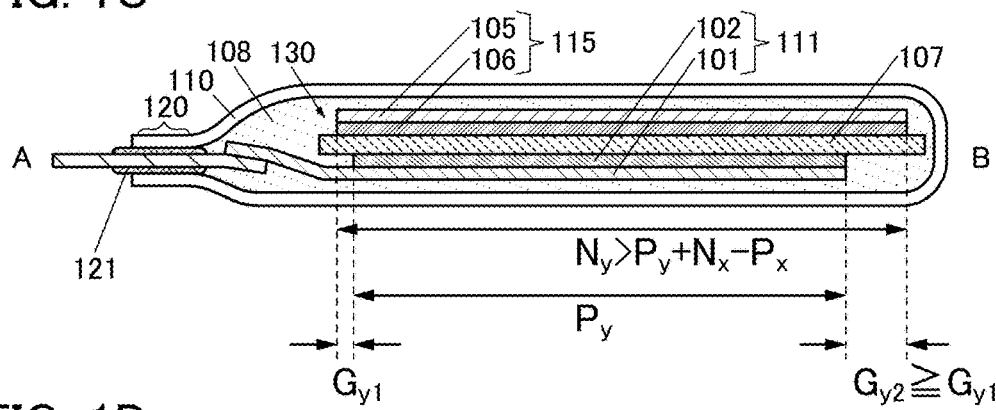
Figure 1D:
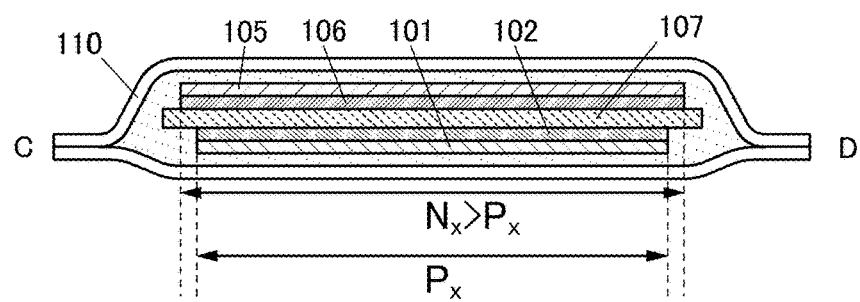
Figure 2A:
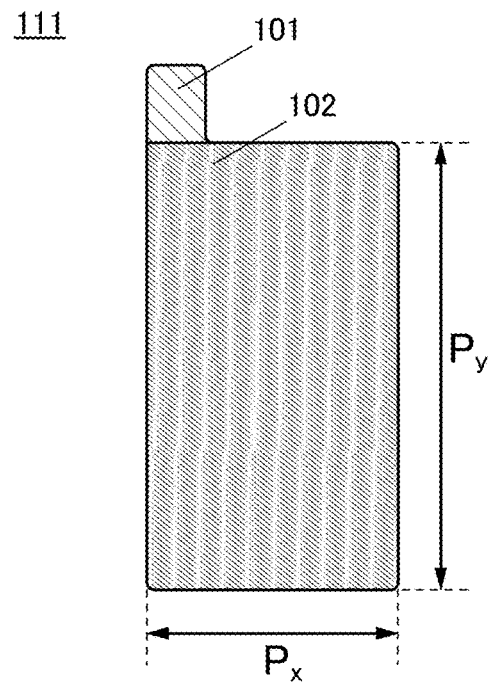
FIGS. 2A to 2D are front views and side views illustrating one embodiment of the present invention.
Figure 2B:
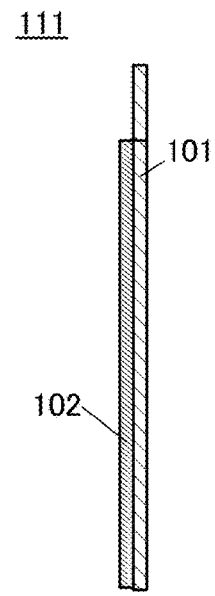
Figure 2C:
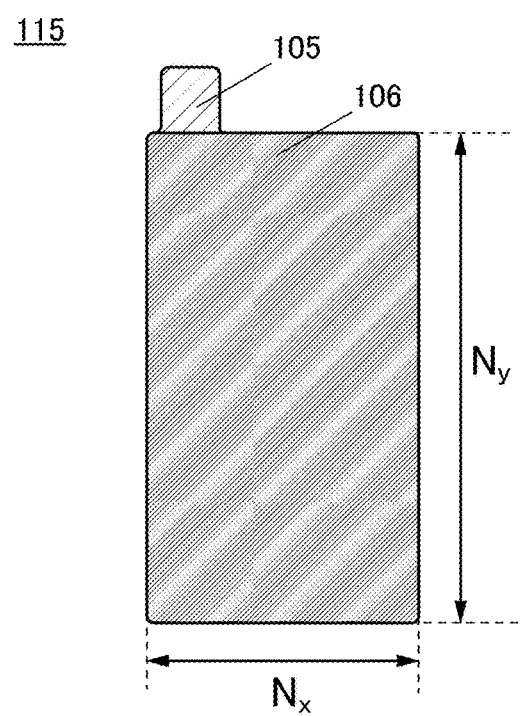
Figure 2D:
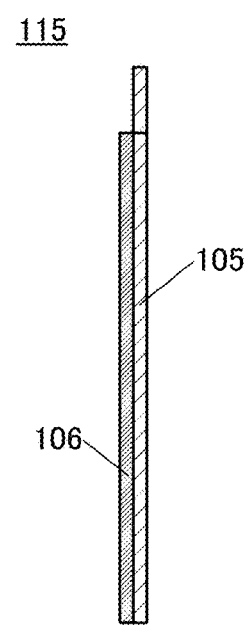

FIGS. 1A and 1B are a front view and a side view, respectively, of a power storage device 100. FIG. 1C is an example of a cross-sectional view of the power storage device 100 taken along a dashed-dotted line AB in FIG. 1A. FIG. 1D is an example of a cross-sectional view of the power storage device 100 taken along a dashed-dotted line CD in FIG. 1A. FIGS. 2A and 2B are a front view and a side view, respectively, of a positive electrode 111 included in the power storage device 100, and FIGS. 2C and 2D are a front view and a side view, respectively, of a negative electrode 115 included in the power storage device 100.

As illustrated in FIGS. 1A and 1B, the power storage device 100 includes an exterior body 110, a positive electrode lead 141, and a negative electrode lead 145. The exterior body 110 has a bag shape which is formed by folding a rectangular film in two and heating the periphery of the film to form a thermocompression-bonded region 120. Part of the positive electrode lead 141 and part of the negative electrode lead 145 are provided in a region that is surrounded by the exterior body 110, and the other part of the positive electrode lead 141 and the other part of the negative electrode lead 145 extend beyond an outer edge of the exterior body 110. A sealing layer 121 formed of a thermoplastic resin such as polypropylene is provided in regions where the positive electrode lead 141 or the negative electrode lead 145 overlaps with the thermocompression-bonded region 120.

The power storage device 100 is flexible and has a function of being curved. This allows the power storage device 100 to be incorporated in an electronic device including a housing having a curved portion, along the housing. When incorporated in an electronic device including a flexible housing, the power storage device 100 can change its shape in accordance with a change in the shape of the housing.

Figure 3A:
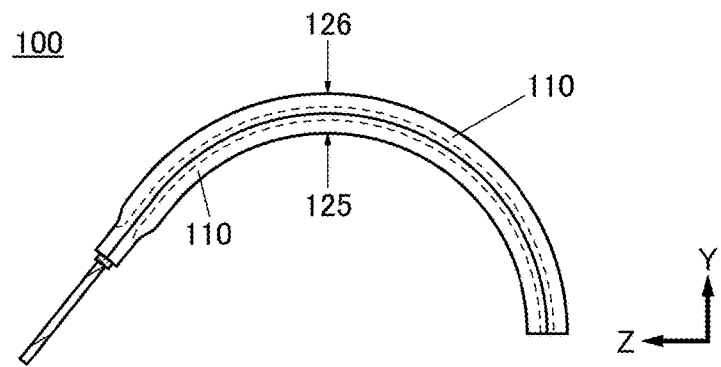
FIGS. 3A and 3B are a side view and a cross-sectional view illustrating one embodiment of the present invention.

In FIG. 3A, the power storage device 100 is curved to form a concave surface 125 and a convex surface 126. The concave surface 125 and the convex surface 126 are each included in the exterior body 110.

Here, "the radius of curvature of a surface", "the X axis", and "the YZ plane" in this specification and the like are explained below.

Figure 4A:
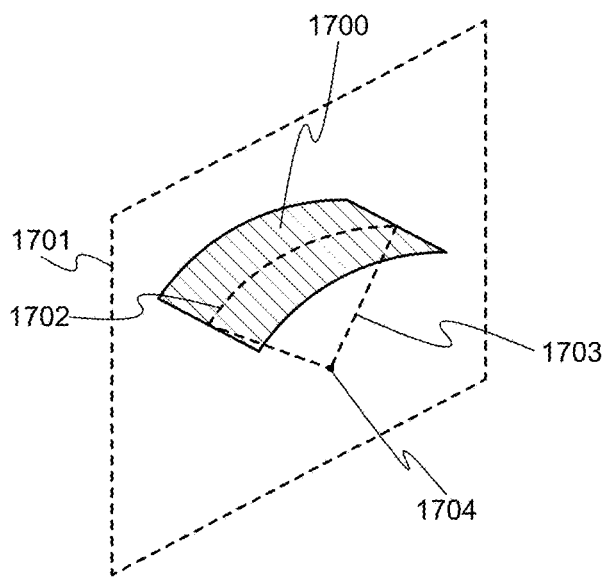
FIGS. 4A to 4C are views for explaining the radius of curvature of a surface.
Figure 4B:
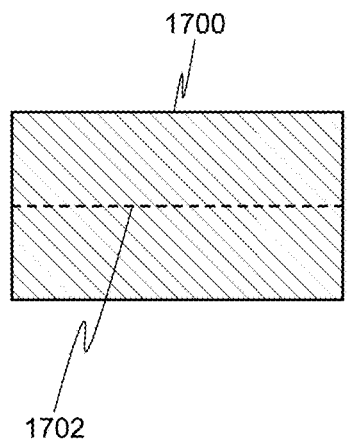
Figure 4C:
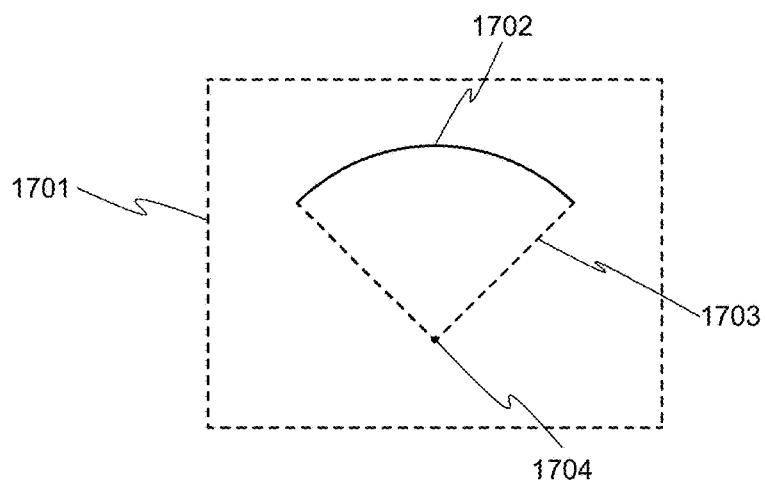

First, the radius of curvature of a surface is explained with reference to schematic views of FIGS. 4A to 4C. When a curved surface 1700 illustrated in FIG. 4A is cut along a plane 1702, part of a curved line 1702 that is the line of intersection of the curved surface 1700 and the plane 1702 is approximated to a circular arc, so that the radius of the circular arc is obtained as a radius of curvature 1703 and the center of the circle is obtained as a center of curvature 1704. FIG. 4B is a top view of the curved surface 1700. FIG. 4C is a cross-sectional view of the curved surface 1700 taken along a plane 1701. When a curved surface is cut by a plane, the radius of curvature of a curve in a cross section differs depending on the angle between the curved surface and the plane or on the cut position, and the smallest radius of curvature is defined as the radius of curvature of the surface, in this specification and the like.

Similarly, when the concave surface 125 or the convex surface 126 of the power storage device 100 is cut along a plane, the line of intersection of the curved surface and the plane, which is a curved line, is approximated to a circular arc. At this time, a plane which cuts the concave surface 125 or the convex surface 126 to obtain the smallest radius of curvature of the circular arc is a YZ plane, and an axis perpendicular to the YZ plane is an X axis. As illustrated in FIGS. 1A and 1B, the power storage device 100 is substantially parallel to the XY plane when the power storage device 100 is not curved.

The use of a film as the exterior body 110 in the above manner allows the power storage device 100 of one embodiment of the present invention to have increased flexibility and to be easily curved.

As the film forming the exterior body 110, a metal foil laminate film in which a plastic film is stacked over metal foil can be used. The metal foil laminate film is preferable because it is capable of sealing by thermocompression bonding and has advantages such as high flexibility in shape, light weight, and flexibility. For the metal foil contained in the metal foil laminate film, aluminum, stainless steel, tin, nickel steel, or the like can be used. For the plastic film stacked over the metal foil, polyethylene terephthalate, nylon, polyethylene, polypropylene, or the like can be used.

Note that in this specification and the like, "laminate" refers to a processing method in which thin materials, such as metal foil and a plastic film, are bonded so that they are stacked.

The film used as the exterior body 110 may be a film in which a single-layer film selected from a hybrid material film containing an organic material (e.g., an organic resin or fiber) and an inorganic material (e.g., ceramic) and a carbon-containing inorganic film (e.g., a carbon film or a graphite film) or a stacked-layer film including two or more of the above films is stacked over metal foil.

The power storage device 100 includes a stack 130 and an electrolyte solution 108 in a region surrounded by the exterior body 110. The stack 130 includes the positive electrode 111, the negative electrode 115, and a separator 107.

As illustrated in FIGS. 2A and 2B, the positive electrode 111 includes a plate-shaped positive electrode current collector 101 and a positive electrode active material layer 102 provided on the positive electrode current collector 101. The positive electrode current collector 101 includes a region in which the positive electrode active material layer 102 is not provided (hereinafter also referred to as a positive electrode tab). In this specification and the like, the length of the positive electrode active material layer 102 is $P_y$, and the width thereof is $P_x$.

As illustrated in FIGS. 2C and 2D, the negative electrode 115 includes a plate-shaped negative electrode current collector 105 and a negative electrode active material layer 106 provided on the negative electrode current collector 105. The negative electrode current collector 105 includes a region over which the negative electrode active material layer 106 is not provided (hereinafter also referred to as a negative electrode tab). In this specification and the like, the length of the negative electrode active material layer 106 is $N_y$, and the width thereof is $N_x$.

Note that in this specification and the like, the length of an active material layer (the positive electrode active material layer 102 or the negative electrode active material layer 106) refers to the maximum distance from one end to the other end of the active material layer in the Y-axis direction. Further, in this specification and the like, the width of an active material layer refers to the maximum distance from one end to the other end of the active material layer in the X-axis direction.

As illustrated in FIGS. 1C and 1D, in the stack 130 included in the power storage device 100, the positive electrode active material layer 102 in the positive electrode 111 and the negative electrode active material layer 106 in the negative electrode 115 overlap with each other with the separator 107 sandwiched therebetween. In order to prevent positional deviation from making the positive electrode 111 and the negative electrode 115 in contact with each other and thereby causing a short circuit when the positive electrode 111 and the negative electrode 115 are stacked, the separator 107 is preferably larger than the negative electrode 115.

In the case where the positive electrode active material layer 102 includes a region not overlapping with the negative electrode active material layer 106, a metal or the like contained in the electrolyte solution 108 is deposited on the negative electrode active material layer 106 in some cases. To prevent this phenomenon, the entire region of a surface of the positive electrode active material layer 102 preferably overlaps with a surface of the negative electrode active material layer 106. In the case where the positive electrode active material layer 102 and the negative electrode active material layer 106 are the same in size, the positional deviation between the positive electrode 111 and the negative electrode 115, or the like, in a process of manufacturing the power storage device 100 might make part of the surface of the positive electrode active material layer 102 fail to overlap with the negative electrode active material layer 106. Therefore, it is preferable that the negative electrode active material layer 106 be larger than the positive electrode active material layer 102. Specifically, the length $N_y$ of the negative electrode active material layer 106 is preferably longer than the length $P_y$ of the positive electrode active material layer 102; in other words, it is preferable that $N_y > P_y$. As illustrated in FIG. 1D, the width $N_x$ of the negative electrode active material layer 106 is preferably longer than the width $P_x$ of the positive electrode active material layer 102; in other words, it is preferable that $N_x > P_x$.

Note that the surface of the positive electrode active material layer 102 refers to a surface on the side opposite to the positive electrode current collector 101 side, of the positive electrode active material layer 102. The surface of the negative electrode active material layer 106 refers to a surface on the side opposite to the negative electrode current collector 105 side, of the negative electrode active material layer 106.

Figure 3B:
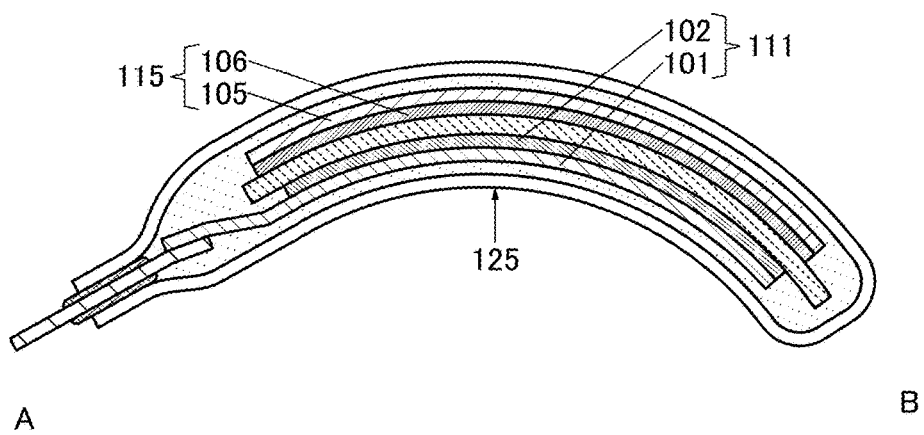

FIG. 3B is a cross-sectional view of the power storage device 100 illustrated in FIG. 1A in the curved state taken along the dashed-dotted line AB. As illustrated in FIG. 3B, when the power storage device 100 is curved such that the positive electrode 111 is close to the concave surface 125, the position of the negative electrode 115 with respect to the positive electrode 111 moves in the Y-axis direction in order to reduce a difference between the inner diameter and the outer diameter of the curve.

In the power storage device 100 of one embodiment of the present invention, the negative electrode active material layer 106 is longer enough than the positive electrode active material layer 102. In the case where the negative electrode active material layer 106 is longer enough than the positive electrode active material layer 102, the entire region of the surface of the positive electrode active material layer 102 can surely overlap with the surface of the negative electrode active material layer 106 even when the power storage device 100 is curved such that the positive electrode 111 is close to the concave surface. Thus, the area of the region in which the positive electrode active material layer 102 and the negative electrode active material layer 106 overlap with each other is not easily changed when the power storage device 100 is curved. Accordingly, a reduction in capacity or the like hardly occurs even when the power storage device is used in a curved state.

Moreover, when the entire region of the surface of the positive electrode active material layer 102 surely overlaps with the surface of the negative electrode active material layer 106 in the curved power storage device 100, deposition of a metal that is derived from carrier ions or the like on the negative electrode can be inhibited. Thus, the cycle performance is unlikely to deteriorate even when the power storage device is used in a curved state. For example, in a lithium ion secondary battery, deposition of lithium on a negative electrode active material layer can be prevented. This can suppress deterioration of the cycle performance of the lithium ion secondary battery.

With the above-described structure, a reduction in capacity or the like hardly occurs even when the power storage device 100 is used in a curved state with a radius of curvature of the concave surface of the exterior body 110 of more than or equal to 40 nm and less than or equal to 150 nm.

Note that if the length $N_y$ of the negative electrode active material layer 106 is longer enough than the length $P_y$ of the positive electrode active material layer 102 when the width $P_x$ of the positive electrode active material layer 102 is longer than the length $P_y$ thereof, a large part of the negative electrode active material layer 106 is not involved in the battery reaction, reducing the capacity per unit volume of the power storage device.

Accordingly, it is preferable that the length $P_y$ of the positive electrode active material layer 102 be longer than the width $P_x$ thereof and that the length $N_y$ of the negative electrode active material layer 106 be longer than the width $N_x$; in other words, it is preferable that $P_y > P_x$ and $N_y > N_x$. This can reduce a part which is not involved in the battery reaction, of the surface of the negative electrode active material layer 106 even when $N_y$ is long enough. Thus, a reduction in the capacity per unit volume of the power storage device 100 can be suppressed. In particular, when the power storage device 100 is not curved or when the power storage device 100 is curved little, the reduction in the capacity per unit volume can be suppressed.

Next, the method for determining the lengths of the negative electrode active material layer 106 and the positive electrode active material layer 102 which are used in the power storage device 100 is described in more detail.

Because the position of the negative electrode 115 with respect to the positive electrode 111 moves in the Y-axis direction when the power storage device 100 is curved, the positive electrode active material layer 102 is preferably long particularly in the Y-axis direction. Thus, a difference between the length of the negative electrode active material layer 106 and the length of the positive electrode active material layer 102 ($N_y - P_y$) is preferably longer than a difference between the width of the negative electrode active material layer 106 and the width of the positive electrode active material layer 102 ($N_x - P_x$). That is, as shown in FIG. 1C, it is preferable that $N_y > P_y + N_x - P_x$. This allows the entire region of the surface of the positive electrode active material layer 102 to keep overlapping with the surface of the negative electrode active material layer 106 even when the power storage device 100 is curved to make the position of the negative electrode 115 with respect to the positive electrode 111 be moved in the Y-axis direction.

In the power storage device 100, the positive electrode tab of the positive electrode 111 is fixed so as to be electrically connected to the positive electrode lead 141 as illustrated in FIGS. 1A and 1C. Further, the negative electrode tab of the negative electrode 115 is fixed so as to be electrically connected to the negative electrode lead 145. The positive electrode lead 141 and the negative electrode lead 145 are fixed to the exterior body 110 by the thermocompression-bonded region 120, the sealing layer 121, and the like. Accordingly, when the power storage device 100 is curved, a positional deviation hardly occurs in the vicinity of the positive electrode tab of the positive electrode 111 and the vicinity of the negative electrode tab of the negative electrode 115.

As illustrated in FIG. 1C, the length on the positive electrode lead 141 side or the negative electrode lead 145 side of the region where the surface of the negative electrode active material layer 106 and the surface of the positive electrode active material layer 102 do not overlap with each other, is represented by $G_{y1}$ and the length on the opposite side thereof is represented by $G_{y2}$. Since the position of the negative electrode 115 with respect to the positive electrode 111 hardly moves on the positive electrode lead 141 side or the negative electrode lead 145 side as described above, it is possible that $G_{y2} > G_{y1}$.

Note that although the positive electrode 111 and the negative electrode 115 illustrated in FIGS. 1A to 1D and FIGS. 2A to 2D include the rectangular positive electrode active material layer 102 and the rectangular negative electrode active material layer 106, respectively, one embodiment of the present invention is not limited to this structure. FIGS. 5A to 5F illustrate examples of a stack including various shapes of the positive electrode 111, the negative electrode 115, and the separator 107.

Figure 5A:
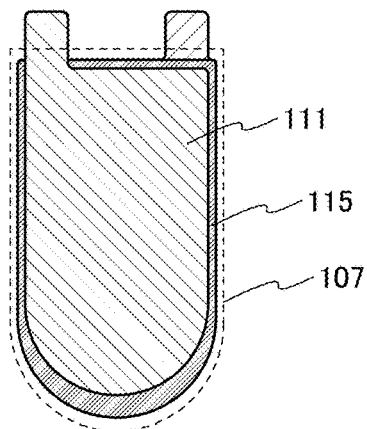
FIGS. 5A to 5F are front views each illustrating one embodiment of the present invention.

A stack 130A illustrated in FIG. 5A includes the positive electrode 111, the negative electrode 115, and the separator 107 each having a combined shape of a rectangle and a semicircle.

Figure 5B:
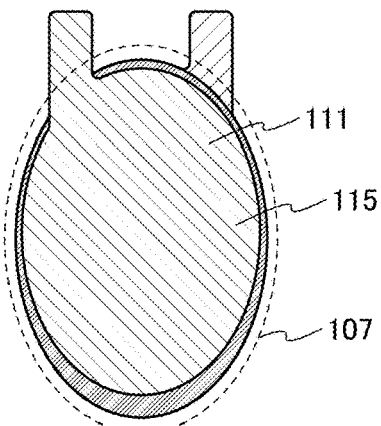

A stack 130B illustrated in FIG. 5B includes the positive electrode 111, the negative electrode 115, and the separator 107 each having an oval shape.

Figure 5C:
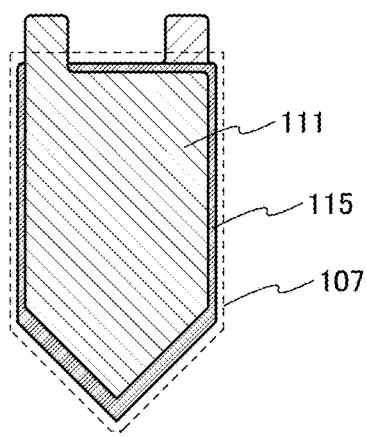

A stack 130C illustrated in FIG. 5C includes the positive electrode 111, the negative electrode 115, and the separator 107 each having a pentangular shape.

Figure 5D:
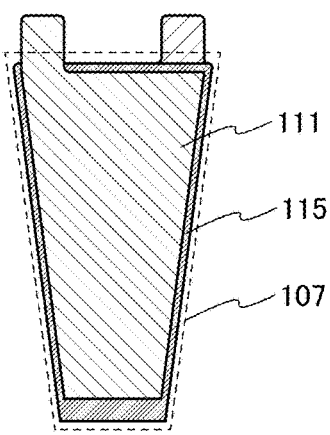
Figure 5E:
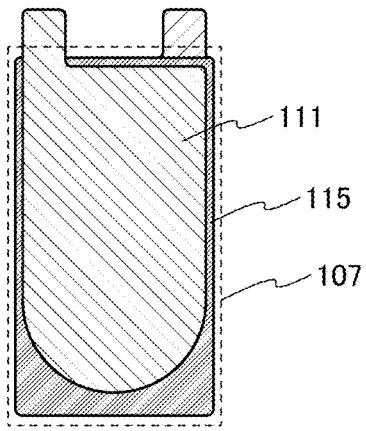

A stack 130D illustrated in FIG. 5D includes the positive electrode 111, the negative electrode 115, and the separator 107 each having a trapezoidal shape.

In a stack, the positive electrode 111 and the negative electrode 115 may have different shapes from each other. A stack 130E illustrated in FIG. 5E includes the positive electrode 111 having a combined shape of a rectangle and a semicircle, the negative electrode 115 having a rectangular shape, and the separator 107 having a rectangular shape.

Figure 5F:
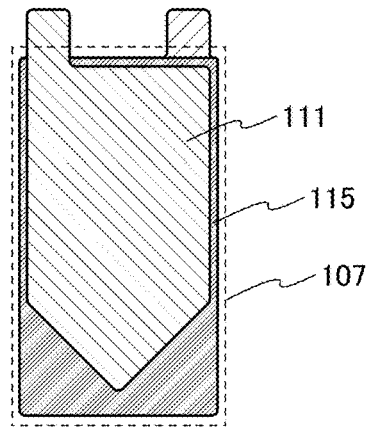

A stack 130F illustrated in FIG. 5F includes the positive electrode 111 having a pentangular shape, the negative electrode 115 having a rectangular shape, and the separator 107 having a rectangular shape.

Although the positive electrode lead 141 and the negative electrode lead 145 extend to the outside from the same side of the exterior body 110 in the power storage device 100 illustrated in FIGS. 1A to 1D, FIGS. 2A to 2D, and FIGS. 3A and 3B, one embodiment of the present invention is not limited to this structure. Furthermore, although the positive electrode 111, the negative electrode 115, and the separator 107 are stacked so that the positive electrode tab and the negative electrode tab are close to each other in the stacks illustrated in FIGS. 5A to 5F, one embodiment of the present invention is not limited to this structure. The positive electrode 111, the negative electrode 115, and the separator 107 may be stacked so that the positive electrode tab and the negative electrode tab are far from each other. Moreover, the positive electrode lead 141 and the negative electrode lead 145 may extend from different sides of the exterior body 110. Furthermore, the positive electrode lead 141 and the negative electrode lead 145 are not necessarily parallel to each other.

Figure 6A:
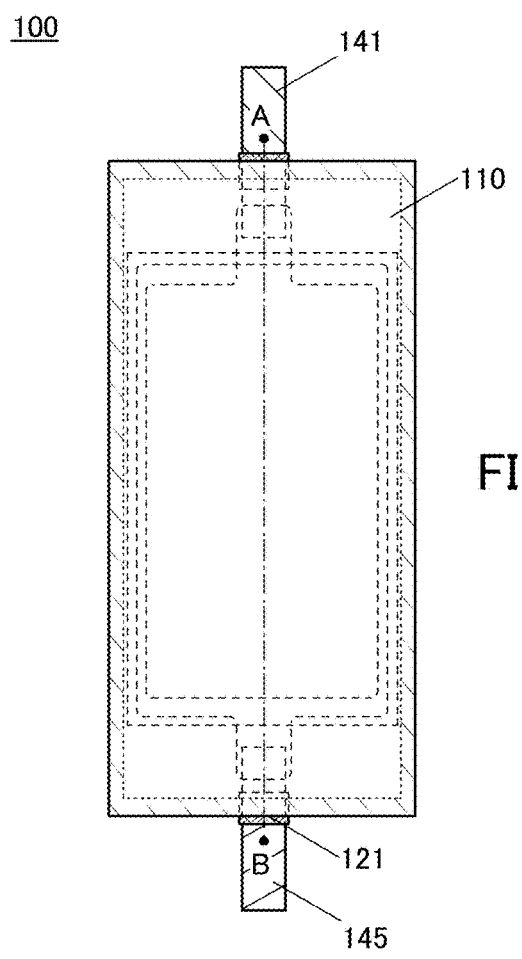
FIGS. 6A to 6D are front views and a cross-sectional view illustrating one embodiment of the present invention.
Figure 6B:
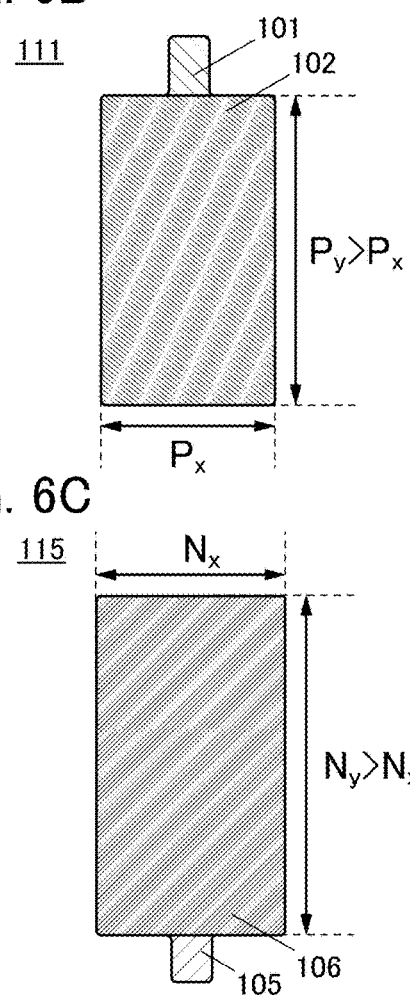
Figure 6C:
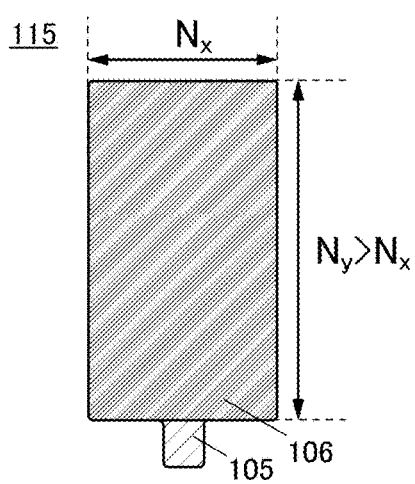
Figure 6D:
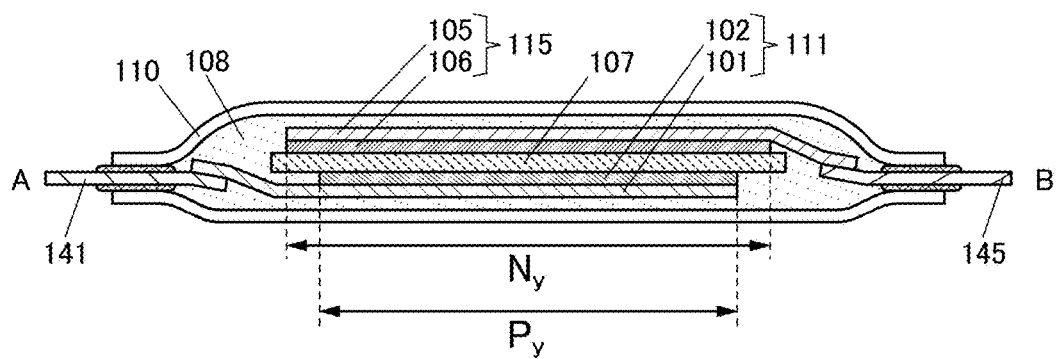

FIG. 6A is a front view of the power storage device 100 in which the positive electrode lead 141 and the negative electrode lead 145 extend from different sides of the exterior body 110, FIG. 6B is a front view of the positive electrode 111, and FIG. 6C is a front view of the negative electrode 115. FIG. 6D is a cross-sectional view of the power storage device 100 taken along a dashed-dotted line AB in FIG. 6A.

In the power storage device 100 illustrated in FIGS. 6A to 6D, the positive electrode 111, the separator 107, and the negative electrode 115 are stacked so that the positive electrode tab of the positive electrode 111 and the negative electrode tab of the negative electrode 115 are far from each other. Thus, the positive electrode lead 141 and the negative electrode lead 145 are arranged so as to extend from different sides of the exterior body 110 from each other. Even in this case, if the negative electrode active material layer 106 is larger enough than the positive electrode active material layer 102, the entire region of the surface of the positive electrode active material layer 102 can overlap with the surface of the negative electrode active material layer 106 in the curved state of the power storage device 100. When the length and width of the positive electrode active material layer 102 in the positive electrode 111 are represented by $P_y$ and $P_x$, respectively, and the length and width of the negative electrode active material layer 106 in the negative electrode 115 are represented by $N_y$ and $N_x$, respectively, it is preferable that $N_y > P_y + N_x - P_x$.

Next, a method for determining the length of the negative electrode active material layer 106 and the length of the positive electrode active material layer 102 in accordance with the degree of curvature of the power storage device 100 is described with reference to FIGS. 7A and 7B to FIGS. 11A and 11B.

Figure 7A:
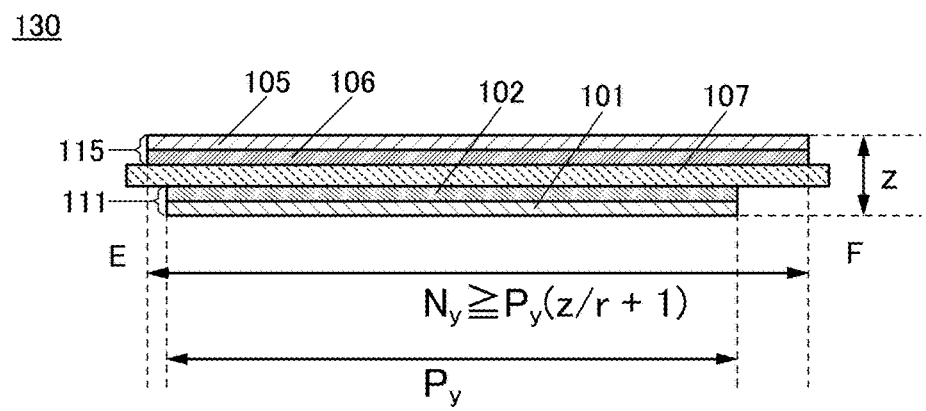
FIGS. 7A and 7B are cross-sectional views illustrating one embodiment of the present invention.

FIGS. 7A and 7B and FIGS. 8A to 8C are examples of a cross-sectional view of the stack 130 taken along a dashed-dotted line EF in FIG. 1A. FIG. 7A is a cross-sectional view of the uncurved stack 130, and FIG. 7B, FIGS. 8A to 8C, FIG. 10B, and FIG. 11B are cross-sectional views of the curved stack 130.

Figure 7B:
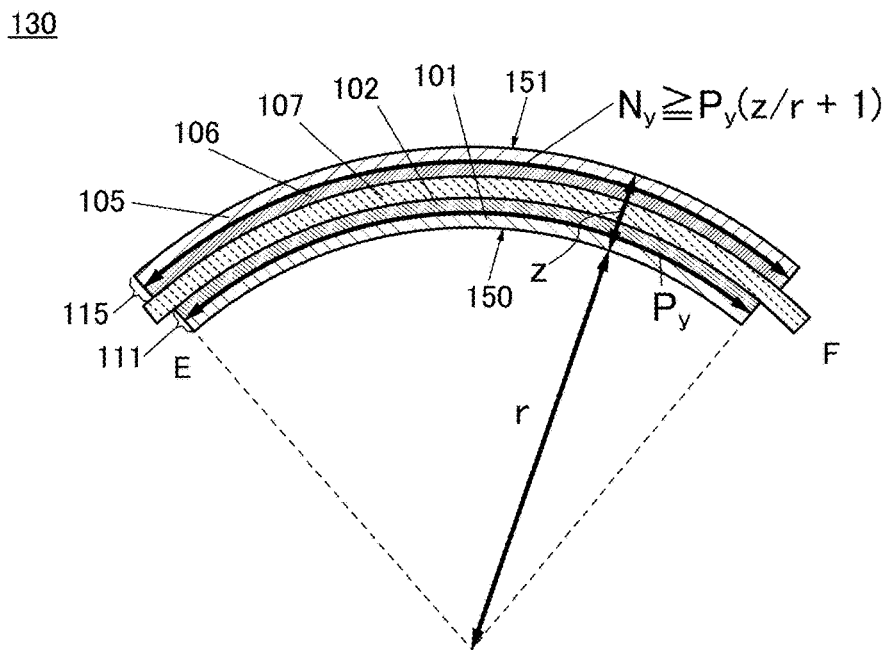

As illustrated in FIG. 7B, when the stack 130 is curved, a concave surface 150 and a convex surface 151 are formed. The concave surface 150 is included in the positive electrode current collector 101. The convex surface 151 is included in the negative electrode current collector 105.

In the stack 130, the length of the positive electrode active material layer 102 is represented by $P_y$, the length of the negative electrode active material layer 106 is represented by $N_y$, and the thickness of the stack 130 is represented by z. The radius of curvature of the concave surface 150 included in the curved stack 130 is represented by r. At this time, from the relation between the length of an arc of a sector shape with a radius r and the length of an arc of a sector shape with a radius (r+z), it is preferable to satisfy the relation, $N_y \geq P_y(z/r+1)$, because the entire region of the surface of the positive electrode active material layer 102 can overlap with the entire region of the negative electrode active material layer 106 even when the stack 130 is in a curved state.

Note that when the power storage device 100 is curved, the cross-sectional shape of the stack 130 is not limited to a simple circular arc shape. Part of the power storage device 100 may be curved so that the cross-sectional shape of the stack 130 partly has a circular arc.

Figure 8A:
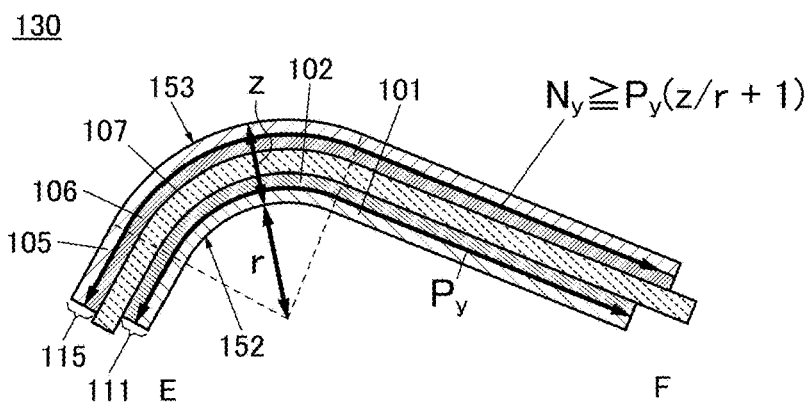
FIGS. 8A to 8C are cross-sectional views each illustrating one embodiment of the present invention.

For example, even when part of the stack 130 is curved to form a concave surface 152 included in part of the positive electrode current collector 101 and a convex surface 153 included in part of the negative electrode current collector 105 as illustrated in FIG. 8A, the lengths of the positive electrode active material layer 102 and the negative electrode active material layer 106 can be determined in a manner similar to that of the above-described method. In other words, if the relation $N_y \geq P_y(z/r+1)$, where r is the radius of curvature of the concave surface 152, is satisfied, the negative electrode active material layer 106 is longer enough than the positive electrode active material layer 102. Thus, even when the stack 130 is in a curved state, the entire region of the surface of the positive electrode active material layer 102 can overlap with the entire region of the negative electrode active material layer 106.

Furthermore, the stack 130 may include a plurality of portions that are curved (also referred to as curved portions). The stack 130 illustrated in FIG. 8B includes a first curved portion and a second curved portion, where the first curved portion includes the concave surface 152 and the convex surface 153 and the second curved portion includes a concave surface 154 and a convex surface 155. The positive electrode current collector 101 includes the concave surface 152 of the first curved portion and the concave surface 154 of the second curved portion, and the negative electrode current collector 105 includes the convex surface 153 of the first curved portion and the convex surface 155 of the second curved portion. The radius of curvature of the concave surface 152 of the first curved portion is represented by r, and the radius of curvature of the concave surface 154 of the second curved portion is represented by r'. The thickness of the first curved portion and the second curved portion is represented by z. In this case, the length $N_y$ of the negative electrode active material layer 106 can be determined using the smaller of the radius of curvature r of the concave surface 152 of the first curved portion and the radius of curvature r' of the concave surface 154 of the second curved portion. That is, under a condition where r'≥r, by using r and satisfying the relation, $N_y \geq P_y(z/r+1)$, the negative electrode active material layer 106 can be made longer enough than the positive electrode active material layer 102. Thus, even when the stack 130 is in a curved state, the entire region of the surface of the positive electrode active material layer 102 can overlap with the entire region of the negative electrode active material layer 106.

Figure 8B:
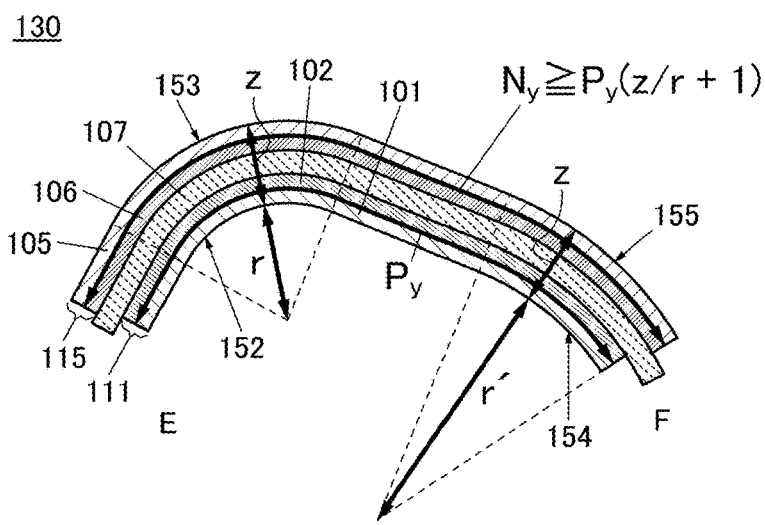
Figure 8C:
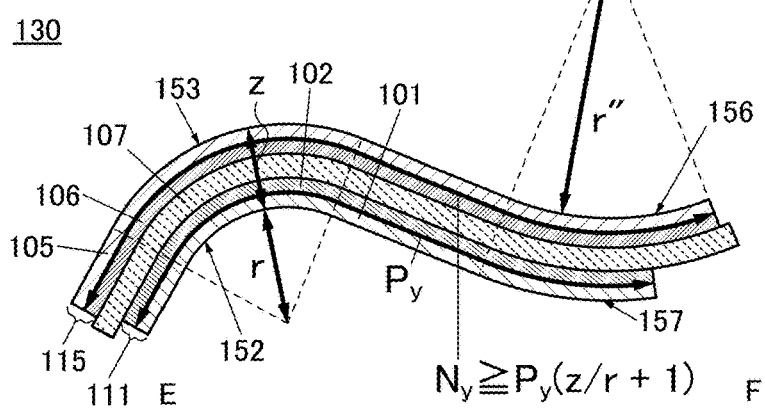

The stack 130 illustrated in FIG. 8C includes a first curved portion and a second curved portion, where the first curved portion includes the concave surface 152 and the convex surface 153 and the second curved portion includes a concave surface 156 and a convex surface 157. The positive electrode current collector 101 includes the concave surface 152 of the first curved portion and the convex surface 157 of the second curved portion, and the negative electrode current collector 105 includes the convex surface 153 of the first curved portion and the concave surface 156 of the second curved portion. The radius of curvature of the concave surface 152 of the first curved portion is represented by r, and the radius of curvature of the concave surface 156 of the second curved portion is represented by r". The thickness of the first curved portion and the second curved portion is represented by z. In this case, the length $N_y$ of the negative electrode active material layer 106 can be determined using the radius of curvature r of the concave surface 152 of the first curved portion included in the positive electrode current collector 101. That is, by satisfying the relation, $N_y \geq P_y(z/r+1)$, the negative electrode active material layer 106 can be made longer enough than the positive electrode active material layer 102. Thus, even when the stack 130 is in a curved state, the entire region of the surface of the positive electrode active material layer 102 can overlap with the entire region of the negative electrode active material layer 106.

Although FIG. 8B illustrates an example in which the stack 130 includes two curved portions in each of which the positive electrode current collector 101 is positioned on the concave surface side, the stack 130 may include three or more curved portions. By using the smallest of the radii of curvature of the concave surfaces of the curved portions, the length $N_y$ of the negative electrode active material layer 106 can be determined.

Furthermore, FIG. 8C illustrates an example in which the stack 130 includes one curved portion in which the positive electrode current collector 101 is positioned on the concave surface side and one curved portion in which the negative electrode current collector 105 is positioned on the concave surface side; however, one embodiment of the present invention is not limited to this example. The stack 130 may include two or more curved portions in each of which the positive electrode current collector 101 is positioned on the concave surface side and two or more curved portions in each of which the negative electrode current collector 105 is positioned on the concave surface side. By using the smallest of the radii of curvature of the plurality of curved portions in each of which the positive electrode current collector 101 is positioned on the concave surface side, the length $N_y$ of the negative electrode active material layer 106 can be determined.

Although the stack 130 includes one positive electrode 111, one negative electrode 115, and one separator 107 in the examples illustrated in FIGS. 1A to 1D, FIGS. 3A and 3B, FIGS. 6A to 6D, FIGS. 7A and 7B, and FIGS. 8A to 8C, one embodiment of the present invention is not limited to these examples. The stack 130 may include a plurality of positive electrodes 111, a plurality of negative electrodes 115, and a plurality of separators 107. It is preferable to increase the number of positive electrodes 111 and negative electrodes 115 because the capacity of the power storage device 100 can be increased.

Figure 9A:
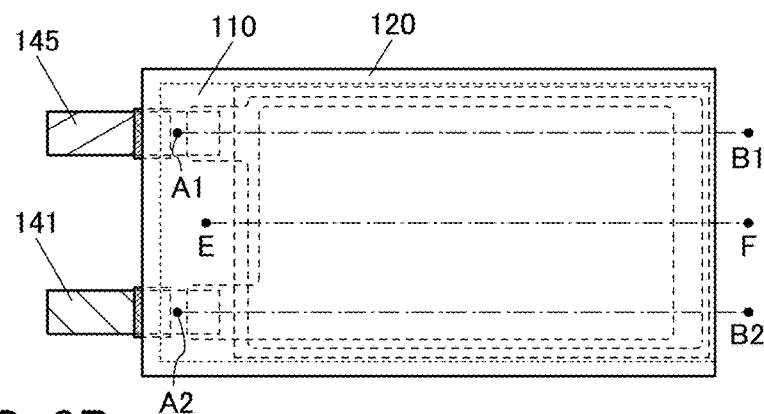
FIGS. 9A to 9C are a front view and cross-sectional views each illustrating one embodiment of the present invention.
Figure 9B:
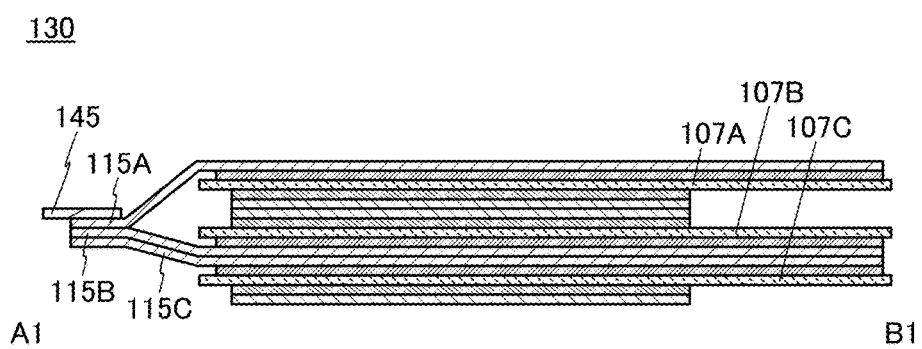
Figure 9C:
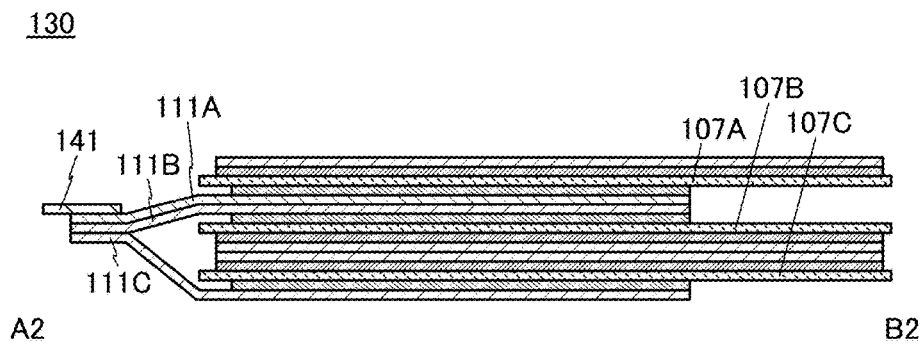
Figure 10A:
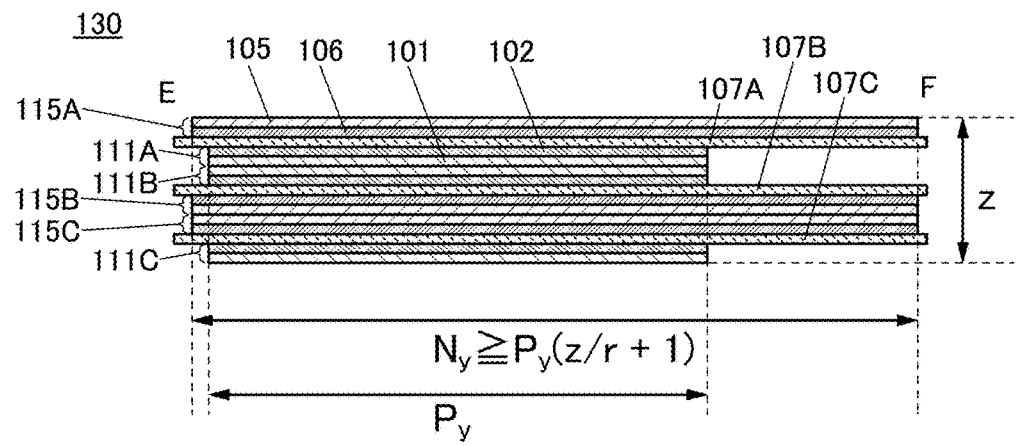
FIGS. 10A and 10B are cross-sectional views illustrating one embodiment of the present invention.
Figure 10B:
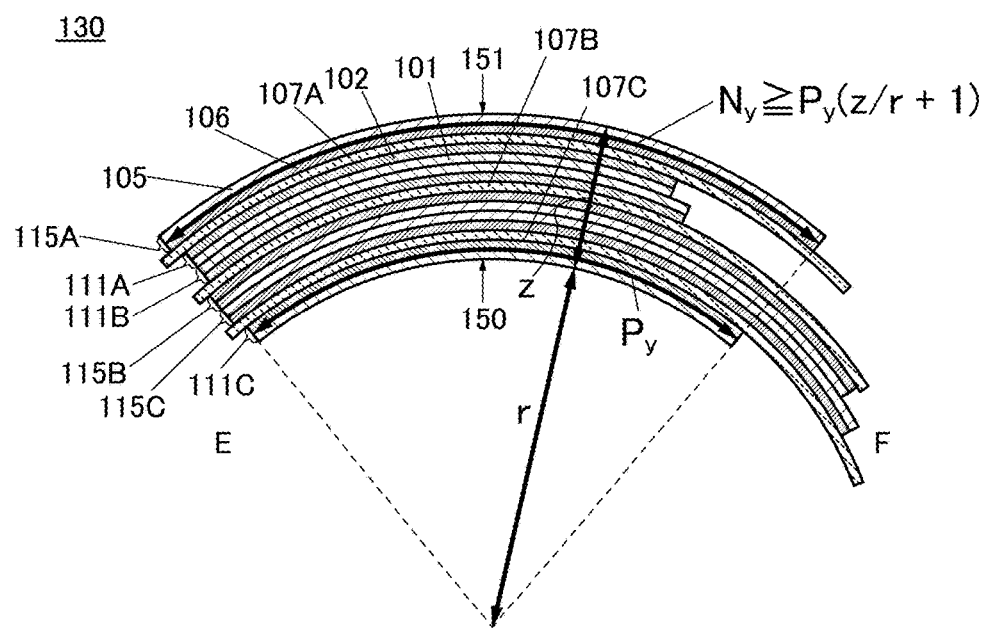

FIGS. 9A to 9C illustrate the power storage device 100 including the stack 130 which includes three positive electrodes, three negative electrodes, and three separators. FIG. 9A is a front view of the power storage device 100. FIG. 9B is a cross-sectional view of the stack 130 taken along a dashed-dotted line A1-B1 in FIG. 9A. FIG. 9C is a cross-sectional view of the stack 130 taken along a dashed-dotted line A2-B2 in FIG. 9A. FIG. 10A is a cross-sectional view of the stack 130 taken along a dashed-dotted line E-F in FIG. 9A, and FIG. 10B is a cross-sectional view of the stack 130 taken along the dashed-dotted line E-F when the power storage device 100 illustrated in FIGS. 9A to 9C is curved.

In FIGS. 9A to 9C and FIGS. 10A and 10B, the stack 130 includes a negative electrode 115A, a separator 107A, a positive electrode 111A, a positive electrode 111B, a separator 107B, a negative electrode 115B, a negative electrode 115C, a separator 107C, and a positive electrode 111C. The negative electrode active material layer 106 of the negative electrode 115A overlaps with the positive electrode active material layer 102 of the positive electrode 111A with the separator 107A interposed therebetween. Further, the positive electrode active material layer 102 of the positive electrode 111B overlaps with the negative electrode active material layer 106 of the negative electrode 115B with the separator 107B interposed therebetween. In addition, the negative electrode active material layer 106 of the negative electrode 115C overlaps with the positive electrode active material layer 102 of the positive electrode 111C with the separator 107C interposed therebetween.

In FIG. 10A, the positive electrode current collector 101 of the positive electrode 111A is in contact with the positive electrode current collector 101 of the positive electrode 111B. In addition, the negative electrode current collector 105 of the negative electrode 115B is in contact with the negative electrode current collector 105 of the negative electrode 115C. By employing such a structure in which electrodes are stacked so that current collectors are in contact with each other, the electrodes can slide on each other at a boundary between the current collectors when the stack 130 is curved. This can make it easy to relieve the stress due to a difference between an outer diameter and an inner diameter that is caused by curving the stack 130. Thus, the positive electrode 111 or the negative electrode 115 can be prevented from being broken by the stress due to the difference between the outer diameter and the inner diameter that is caused when the power storage device 100 is curved. Accordingly, a reduction in capacity caused by curving the power storage device 100, or the like can be prevented.

As illustrated in FIG. 9B, negative electrode tabs of the negative electrode 115A, the negative electrode 115B, and the negative electrode 115C are welded together. The weld of the negative electrode 115A, the negative electrode 115B, and the negative electrode 115C is welded to and electrically connected to the negative electrode lead 145.

As illustrated in FIG. 9C, positive electrode tabs of the positive electrode 111A, the positive electrode 111B, and the positive electrode 111C are welded together. The weld of the positive electrode 111A, the positive electrode 111B, and the positive electrode 111C is welded to and electrically connected to the positive electrode lead 141.

As illustrated in FIG. 10B, the curved stack 130 includes the concave surface 150 and the convex surface 151. The concave surface 150 is positioned on a surface of the positive electrode current collector 101 of the positive electrode 111C. The convex surface 151 is positioned on a surface of the negative electrode current collector 105 of the negative electrode 115A.

Even in this case, the length of the positive electrode active material layer 102 can be determined by the above-described method. In other words, in the stack 130, when the length of the positive electrode active material layer 102 is represented by $P_y$, the length of the negative electrode active material layer 106 is represented by $N_y$, the thickness of the stack 130 is represented by z, and the radius of curvature of the concave surface 150 when the stack 130 is curved is represented by r, if the relation, $N_y \geq P_y(z/r+1)$, is satisfied, the negative electrode active material layer 106 can be made longer enough than the positive electrode active material layer 102. Thus, as illustrated in FIG. 10B, even when the stack 130 is in a curved state, the entire region of the surface of the positive electrode active material layer 102 can overlap with the entire region of the negative electrode active material layer 106.

Although FIGS. 10A and 10B illustrate an example in which the positive electrode active material layers 102 of the positive electrode 111A, the positive electrode 111B, and the positive electrode 111C have the same length and the negative electrode active material layers 106 of the negative electrode 115A, the negative electrode 115B, and the negative electrode 115C have the same length, one embodiment of the present invention is not limited to this example. A plurality of positive electrodes included in the stack 130 may have different sizes from one another. Furthermore, a plurality of negative electrodes included in the stack 130 may have different sizes from one another.

Figure 11A:
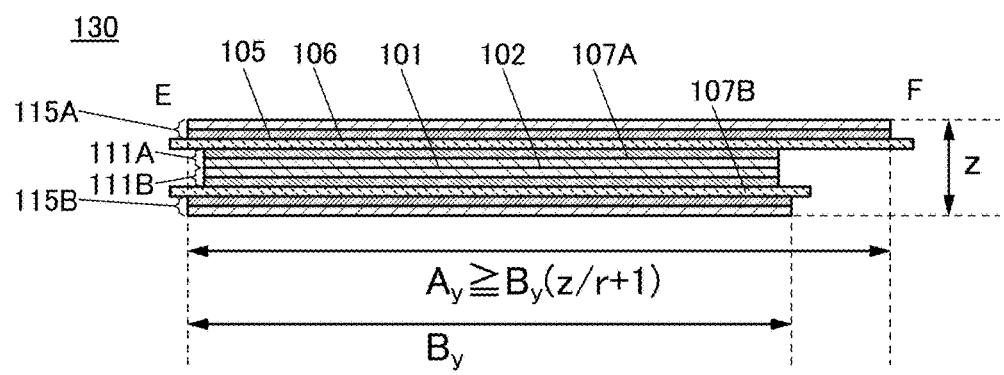
FIGS. 11A and 11B are cross-sectional views illustrating one embodiment of the present invention.
Figure 11B:
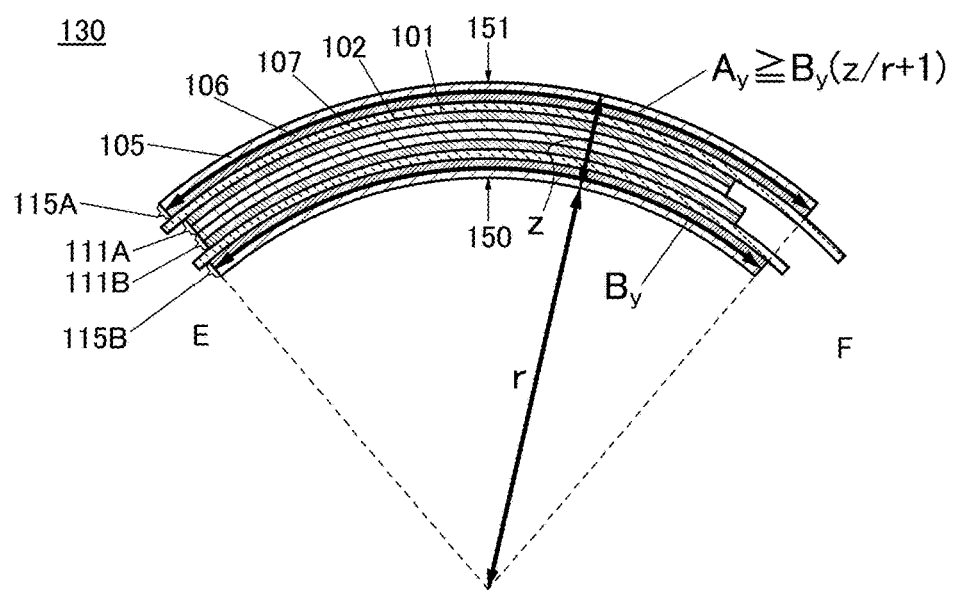

FIGS. 11A and 11B illustrate another example of the stack 130 which includes a plurality of negative electrodes having different sizes from each other. The stack 130 includes the negative electrode 115A, the separator 107A, the positive electrode 111A, the positive electrode 111B, the separator 107B, the negative electrode 115B, and the negative electrode 115C. The negative electrode active material layer 106 of the negative electrode 115A overlaps with the positive electrode active material layer 102 of the positive electrode 111A with the separator 107A interposed therebetween. The positive electrode active material layer 102 of the positive electrode 111B overlaps with the negative electrode active material layer 106 of the negative electrode 115B with the separator 107B interposed therebetween.

As illustrated in FIG. 11B, the curved stack 130 includes the concave surface 150 and the convex surface 151. The concave surface 150 is positioned on a surface of the negative electrode current collector 105 of the negative electrode 115B. The convex surface 151 is positioned on the surface of the negative electrode current collector 105 of the negative electrode 115A.

In the stack 130 illustrated in FIGS. 11A and 11B, the length of the positive electrode active material layer 102 of the positive electrode 111A is equal to that of the positive electrode active material layer 102 of the positive electrode 111B, and the length of the negative electrode active material layer 106 of the negative electrode 115A including the convex surface 151 is longer than that of the negative electrode active material layer 106 of the negative electrode 115B including the concave surface 150. When the length of the negative electrode active material layer 106 of the negative electrode 115A is represented by $A_y$, and the length of the negative electrode active material layer 106 of the negative electrode 115B is represented by $B_y$, the relation, $A_y > B_y$, may be satisfied. This structure is preferable for saving a material used for the negative electrode.

When the thickness of the stack 130 is represented by z and the radius of curvature of the concave surface 150 is represented by r, from the relation between the length of an arc of a sector shape with a radius r and the length of an arc of a sector shape with a radius (r+z), the relation, $A_y > B_y (z/r+1)$, may be satisfied. This structure is preferable because a material used for the negative electrode can be saved according to the degree of curvature of the stack 130.

Figure 12A:
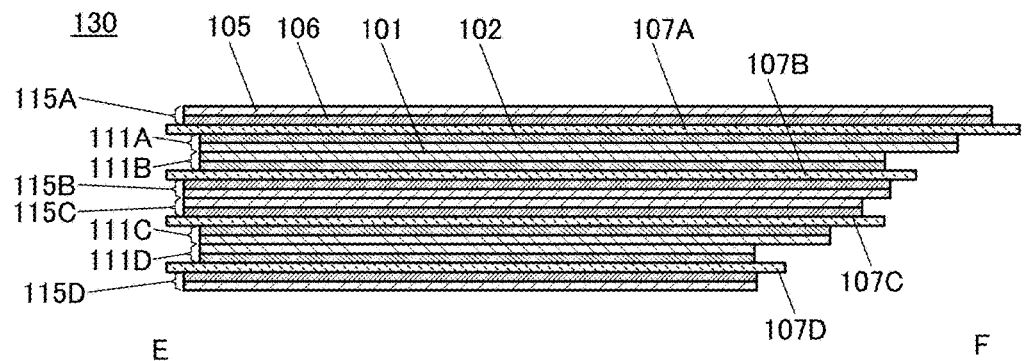
FIGS. 12A and 12B are cross-sectional views illustrating one embodiment of the present invention.
Figure 12B:
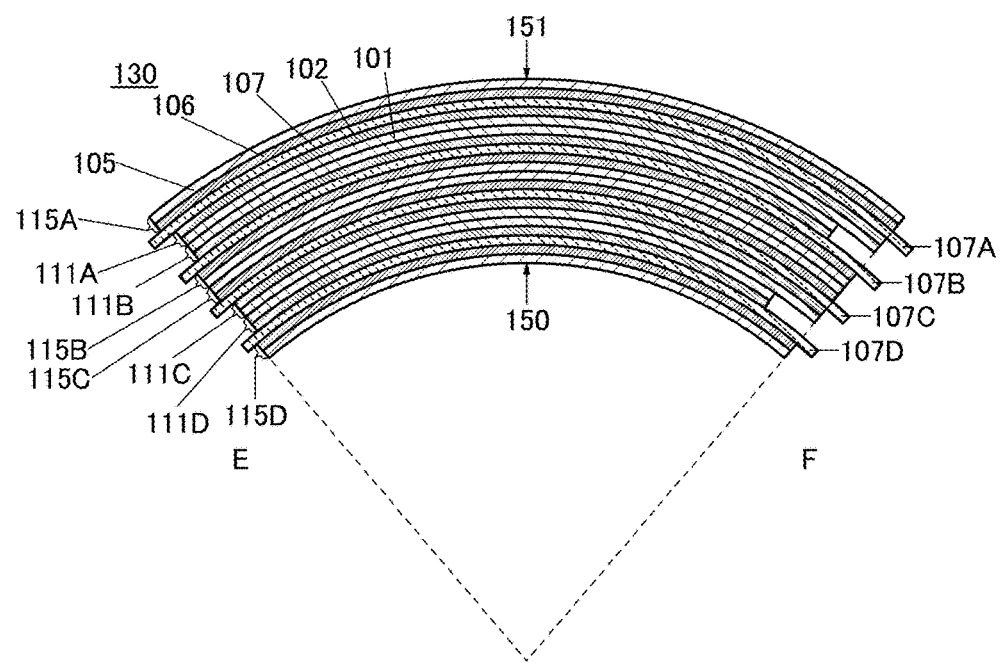

FIGS. 12A and 12B illustrate an example of the stack 130 in which a plurality of positive electrodes and a plurality of negative electrodes have different sizes from one another. The stack 130 includes the negative electrode 115A, the separator 107A, the positive electrode 111A, the positive electrode 111B, the separator 107B, the negative electrode 115B, the negative electrode 115C, the separator 107C, the positive electrode 111C, a positive electrode 111D, a separator 107D, and a negative electrode 115D. The negative electrode active material layer 106 of the negative electrode 115A overlaps with the positive electrode active material layer 102 of the positive electrode 111A with the separator 107A interposed therebetween. The positive electrode active material layer 102 of the positive electrode 111B overlaps with the negative electrode active material layer 106 of the negative electrode 115B with the separator 107B interposed therebetween. Further, the positive electrode active material layer 102 of the positive electrode 111C overlaps with the negative electrode active material layer 106 of the negative electrode 115C with the separator 107C interposed therebetween. Further, the positive electrode active material layer 102 of the positive electrode 111D overlaps with the negative electrode active material layer 106 of the negative electrode 115D with the separator 107D interposed therebetween.

As illustrated in FIGS. 12A and 12B, the active material layer included in the electrode which is positioned close to the concave surface when the stack 130 is curved may be shorter than the active material layer included in the electrode which is positioned close to the convex surface when the stack 130 is curved. As illustrated in FIG. 12B, in the curved stack 130, the concave surface 150 is positioned on a surface of the negative electrode current collector 105 of the negative electrode 115D. The convex surface 151 is positioned on the surface of the negative electrode current collector 105 of the negative electrode 115A. Accordingly, the length of the positive electrode active material layer 102 may be smaller in the order of the positive electrode 111A<the positive electrode 111B<the positive electrode 111C<the positive electrode 111D. Further, the negative electrode active material layer 106 may be shorter in the order of the negative electrode 115A<the negative electrode 115B<the negative electrode 115C<the negative electrode 115D.

Next, variations of the stack 130 are described with reference to FIGS. 13A to 13D.

Figure 13A:
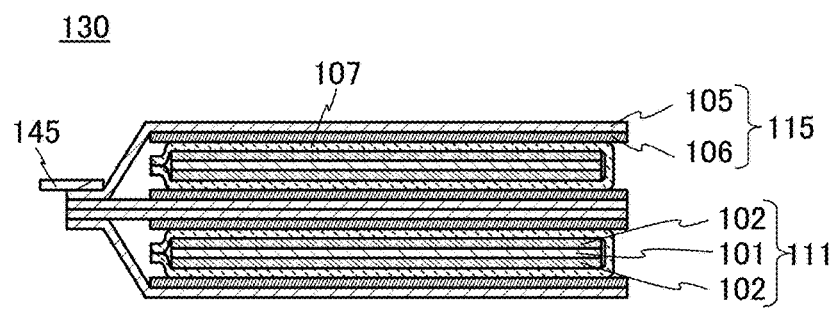
FIGS. 13A to 13D are cross-sectional views each illustrating one embodiment of the present invention.
Figure 13B:
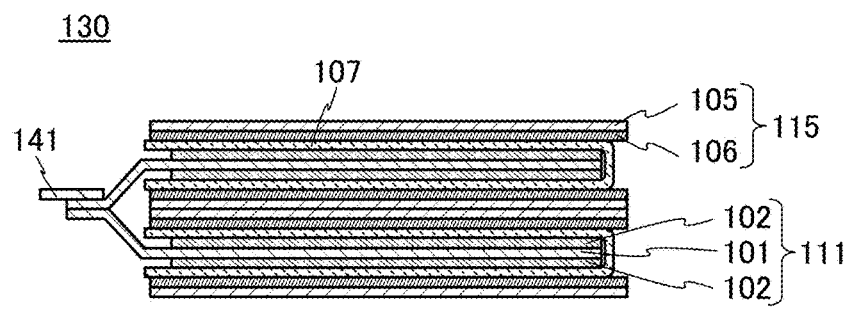

FIGS. 13A and 13B illustrate examples in which the positive electrode 111 and the negative electrode 115 are stacked. Two positive electrodes 111 in each of which the positive electrode active material layers 102 are provided on both surfaces of the positive electrode current collector 101 and four negative electrodes 115 in each of which the negative electrode active material layer 106 is provided on one surface of the negative electrode current collector 105 are stacked. Even in this structure, a contact surface between metals, that is, a contact surface between surfaces on the side opposite to the negative electrode active material layer side of the negative electrodes 115 can be formed. Note that FIG. 13A is a cross-sectional view of the stack 130 taken along the dashed-dotted line A1-B1 in FIG. 9A, and FIG. 13B is a cross-sectional view of the stack 130 taken along the dashed-dotted line A2-B2 in FIG. 9A.

Figure 13C:
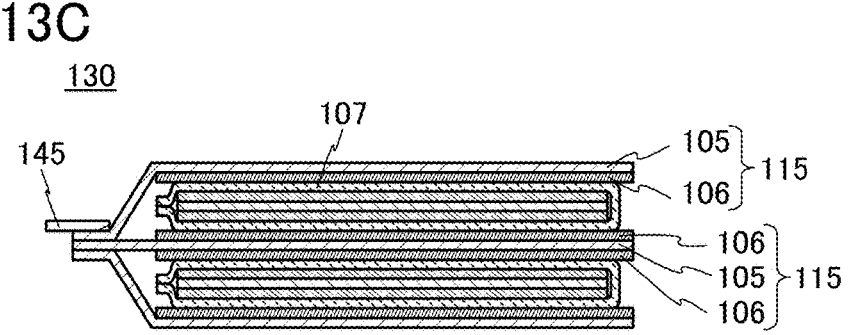
Figure 13D:
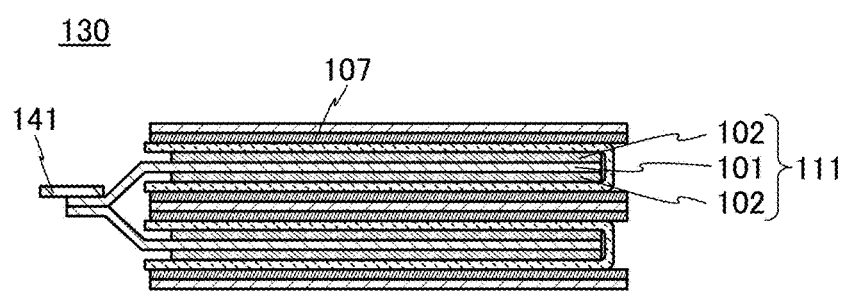

The stacks 130 illustrated in FIGS. 13C and 13D each include the positive electrodes 111 in each of which the positive electrode active material layers 102 are provided on both surfaces of the positive electrode current collector 101 and the negative electrode 115 in which the negative electrode active material layers 106 are provided on both surfaces of the negative electrode current collector 105. This structure is preferable for increasing the capacity of the power storage device 100. Note that FIG. 13C is a cross-sectional view of the stack 130 taken along the dashed-dotted line A1-B1 in FIG. 9A, and FIG. 13D is a cross-sectional view of the stack 130 taken along the dashed-dotted line A2-B2 in FIG. 9A.

Moreover, as illustrated in FIGS. 13A to 13D, the separator 107 in a bag shape may surround the positive electrode 111, which can surely prevent generation of a short circuit due to a contact between the positive electrode 111 and the negative electrode 115.

Figure 14A:
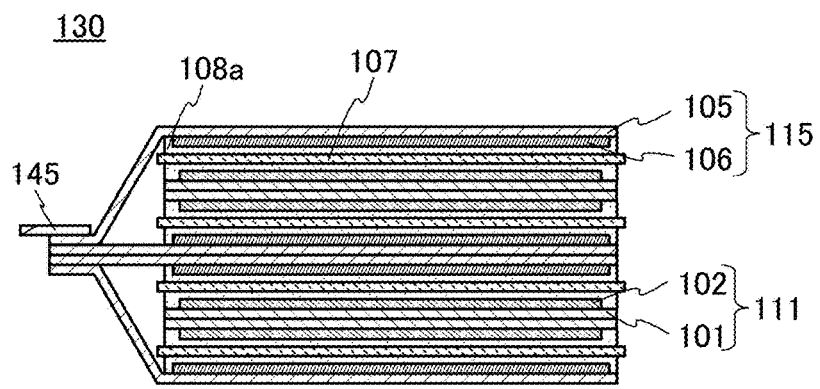
FIGS. 14A and 14B are cross-sectional views each illustrating one embodiment of the present invention.
Figure 14B:
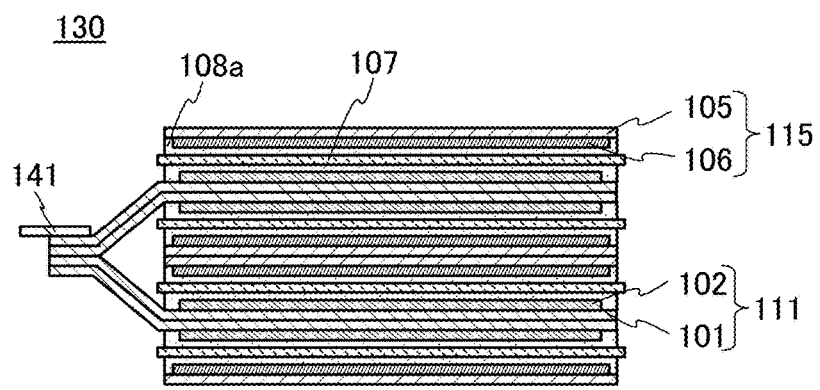

Furthermore, for example, as illustrated in FIGS. 14A and 14B, a gel electrolyte solution 108a may be used as the electrolyte solution 108 to bond a set of the positive electrode 111, the negative electrode 115, and the separator 107. This structure can prevent the positive electrode 111 and the negative electrode 115 between which a battery reaction occurs from sliding over each other when the power storage device 100 is curved. Note that FIG. 14A is a cross-sectional view of the stack 130 taken along the dashed-dotted line A1-B1 in FIG. 9A, and FIG. 14B is a cross-sectional view of the stack 130 taken along the dashed-dotted line A2-B2 in FIG. 9A.

Moreover, many contact surfaces between metals, that is, contact surfaces between surfaces on the side opposite to the positive electrode active material layer side of the positive electrodes 111 and a contact surface between surfaces on the side opposite to the negative electrode active material layer side of the negative electrodes 115, can be formed. Sliding of these contact surfaces can surely relieve the stress applied to the electrodes when the power storage device 100 is curved, which is preferable.

Therefore, the deterioration of the power storage device 100 can be suppressed. Further, the power storage device 100 can have high reliability.

Note that also in the case where the power storage device 100 includes a plurality of positive electrodes 111 and a plurality of negative electrodes 115, the cross-sectional shape of the power storage device is not limited to a simple circular arc shape, and may partly have a circular arc. In the case where the stack 130 is partly curved to form a concave surface and a convex surface, the length of the negative electrode active material layer or the like can be determined based on the radius of curvature r of the concave surface.

Also in the case where the power storage device 100 includes a plurality of positive electrodes 111 and a plurality of negative electrodes 115, the stack 130 may include three or more curved portions. By using the smallest of the radii of curvature of the concave surfaces of the curved portions, the length of the negative electrode active material layer or the like can be determined.

As described above, in one embodiment of the present invention, by making the negative electrode active material layer 106 longer enough than the positive electrode active material layer 102, the entire region of the positive electrode active material layer 102 can surely overlap with the surface of the negative electrode active material layer 106 even when the power storage device 100 is curved. This suppresses a change in the area of the region where the positive electrode active material layer 102 and the negative electrode active material layer 106 overlap with each other even when the power storage device 100 is curved. Accordingly, even when the power storage device is used in a curved state, a reduction in capacity or the like is not easily caused.

Moreover, when the entire region of the surface of the positive electrode active material layer 102 surely overlaps with the surface of the negative electrode active material layer 106 in the curved power storage device 100, deposition of a metal that is derived from carrier ions or the like on the negative electrode can be inhibited. Thus, the cycle performance is unlikely to deteriorate even when the power storage device is used in a curved state. For example, in a lithium ion secondary battery, deposition of lithium on a negative electrode active material layer can be prevented. This can suppress deterioration of the cycle performance of the lithium ion secondary battery.

By employing any of the structures illustrated in FIGS. 1A to 1D to FIGS. 3A and 3B and FIGS. 5A to 5F to FIGS. 14A and 14B, even when the power storage device 100 is used in a curved state where the radius of curvature of the concave surface included in the stack 130 is more than or equal to 40 mm and less than or equal to 150 nm, a reduction in capacity or the like is not easily caused.

In Embodiment 1, one embodiment of the present invention has been described. Other embodiments of the present invention are described in Embodiments 2 to 5. Note that embodiments of the present invention are not limited to these embodiments. That is, since various embodiments of the present invention are disclosed in Embodiments 1 to 5, one embodiment of the present invention is not limited to a specific embodiment. For example, although the example in which one embodiment of the present invention is used for a lithium-ion secondary battery is described, one embodiment of the present invention is not limited thereto. Depending on circumstances or conditions, one embodiment of the present invention can be used for a variety of secondary batteries, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a zinc air battery, a lithium air battery, a primary battery, a capacitor such as an electric double layer capacitor, an ultracapacitor, a supercapacitor, and a lithium ion capacitor, and the like. Alternatively, for example, depending on circumstances or conditions, one embodiment of the present invention is not necessarily used for a lithium-ion secondary battery. For example, although the examples in which one embodiment of the present invention is used for the curved power storage device, the flexible power storage device, or the power storage device that can be changed in shape are shown, one embodiment of the present invention is not limited thereto. Depending on circumstances or conditions, one embodiment of the present invention may be used for a power storage device that can have any of a variety of shapes or a power storage device that can have any level of hardness. Depending on circumstances or conditions, one embodiment of the present invention may be used for a power storage device that is not curved and has a flat plate shape or a power storage device that has a cylindrical shape. Depending on circumstances or conditions, one embodiment of the present invention may be used for a power storage device that does not have flexibility and cannot be changed in shape.

This embodiment can be implemented in appropriate combination with any of the other embodiments.

(Embodiment 2)

In this embodiment, an example of a manufacturing method of the power storage device 100 in one embodiment of the present invention is described with reference to FIGS. 15A to 15C, FIGS. 16A to 16C, FIGS. 17A to 17C, and FIGS. 18A and 18B. Specifically, a manufacturing method of a power storage device including the stack 130 described with reference to FIGS. 13A and 13B in Embodiment 1 is described.

[1. Preparing Positive Electrode and Covering it with Separator]

First, the positive electrode active material layer 102 is formed over both surfaces of the positive electrode current collector 101, and they are processed into a shape of the positive electrode 111. Then, the positive electrode 111 is sandwiched by the folded separator 107 (FIG. 15A).

Figure 15A:
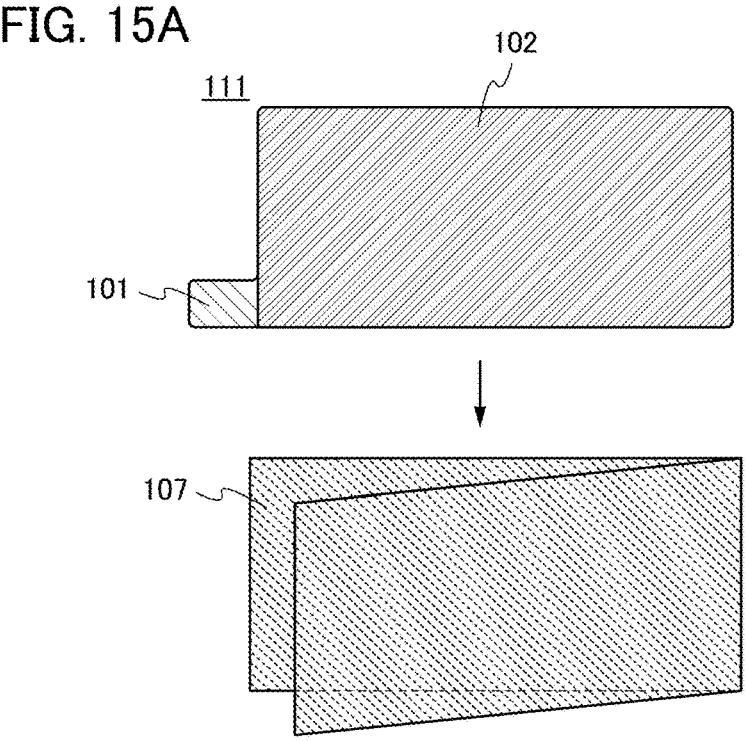
FIGS. 15A to 15C illustrate a method for manufacturing a power storage device.
Figure 15B:
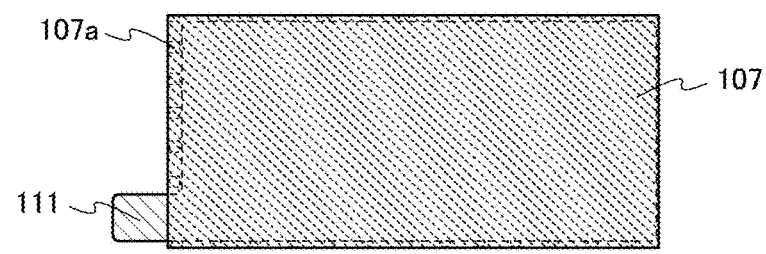

Then, the outer edges of the separator 107 at the outside of the positive electrode 111 are bonded to form the separator 107 having a bag shape (FIG. 15B). The bonding of the outer edges of the separator 107 may be performed with the use of an adhesive or the like, by ultrasonic welding, or by thermal fusion bonding.

In this embodiment, polypropylene is used as the separator 107, and the outer edges of the separator 107 are bonded by heating. The bonding portion is shown as a region 107a in FIG. 15B. In this manner, the positive electrode 111 can be covered with the separator 107. The separator 107 is formed so as to cover the positive electrode active material layer 102 and does not necessarily cover the whole positive electrode 111.

Note that although the separator 107 is folded in FIG. 15A, one embodiment of the present invention is not limited thereto. For example, the positive electrode 111 may be sandwiched between two separators. In that case, the region 107a may be formed to surround almost all of four sides of the separators.

The outer edges of the separator 107 may be bonded intermittently or may be bonded at dot-like portions provided at regular intervals as in FIG. 15B.

Alternatively, bonding may be performed on only one side of the outer edges. Alternatively, bonding may be performed on only two sides of the outer edges. Alternatively, bonding may be performed on four sides of the outer edges, in which case the four sides can be in an even state.

Note that the shape of the separator 107 is not limited to the bag shape. The separator 107 can at least prevent a contact between the positive electrode 111 and the negative electrode 115 in the power storage device 100, and may have a plate shape, for example. Furthermore, in the positive electrode 111 in which the positive electrode active material layer 102 is provided only on one surface of the positive electrode current collector 101, the positive electrode 111 need not be sandwiched by the separator 107.

[2. Preparing Negative Electrode]

Figure 15C:
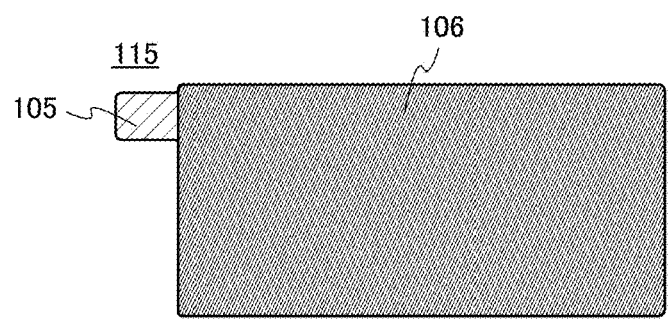

Next, the negative electrode active material layer 106 is formed over one surface of the negative electrode current collector 105, and they are processed into a shape of the negative electrode 115 (FIG. 15C). At this time, as described in Embodiment 1, by making the length of the negative electrode active material layer 106 longer enough than that of the positive electrode active material layer 102, a power storage device that is not easily reduced in capacity and in which the cycle performance does not easily deteriorate even when used in a curved state can be manufactured.

[3. Stacking Positive Electrode and Negative Electrode]

Figure 16A:
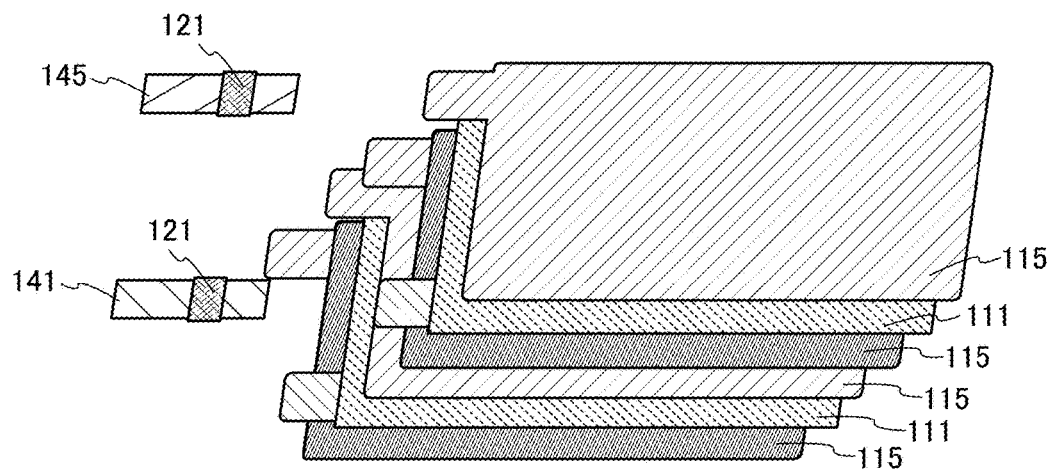
FIGS. 16A to 16C illustrate a method for manufacturing a power storage device.

Next, the positive electrodes 111 each covered with the separator and the negative electrodes 115 are stacked (FIG. 16A). In this embodiment, two positive electrodes 111 each having the positive electrode active material layer on both surfaces of the positive electrode current collector and four negative electrodes 115 each having the negative electrode active material layer 106 on one surface of the negative electrode current collector are stacked. The positive electrodes 111 and the negative electrodes 115 are positioned so that the positive electrode active material layer 102 and the negative electrode active material layer 106 face each other with the separator 107 provided therebetween. Furthermore, the negative electrodes 115 are arranged so that the surfaces on the side opposite to the negative electrode active material layer 106 side of the negative electrodes 115 are in contact with each other.

[4. Connecting Positive Electrode Lead and Negative Electrode Lead]

Next, the positive electrode lead 141 including the sealing layer 121 is electrically connected to positive electrode tabs of the plurality of positive electrode current collectors 101 by ultrasonic wave irradiation while pressure is applied (ultrasonic welding).

A lead electrode is likely to be cracked or cut by stress due to external force applied after fabrication of the power storage device. Here, when subjected to ultrasonic welding, the positive electrode lead 141 and the positive electrode tab may be placed between bonding dies provided with projections, and a curved portion may be formed in a region different from the connection region in the positive electrode tab. This curved portion can relax stress due to external force applied after fabrication of the power storage device 100.

The curved portion is not necessarily formed in the positive electrode tab. The positive electrode current collector may be formed using a high-strength material such as stainless steel or titanium to a thickness of 10 µm or less, in order to easily relax stress due to external force applied after fabrication of a secondary battery.

It is needless to say that two or more of the above examples may be combined to reduce the concentration of stress in the positive electrode tab.

Figure 16B:
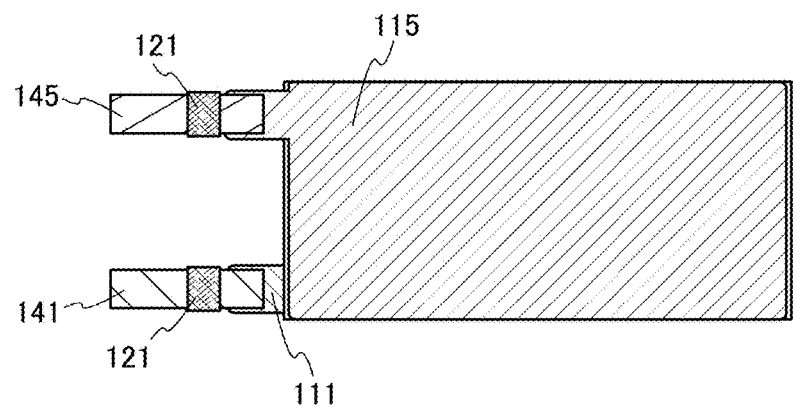

Then, in a manner similar to that of the positive electrode current collector 101, the negative electrode lead 145 including the sealing layer 121 is electrically connected to negative electrode tabs of the plurality of negative electrode current collectors 105 by ultrasonic welding (FIG. 16B). At this time, structures which can easily relax stress may be employed as in the case of the positive electrode tab; for example, the negative electrode tab may be provided with a curved portion or a high-strength material may be used as the current collector.

[5. Preparing Film for Exterior Body]

Figure 16C:
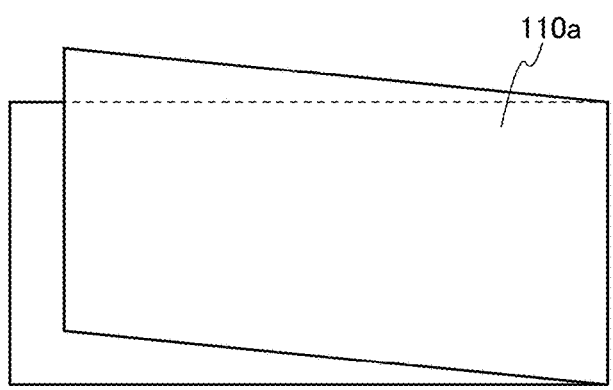

Next, a film 110a used for an exterior body is folded (FIG. 16C).

[6. Bonding at One Side of Exterior Body]

Figure 17A:
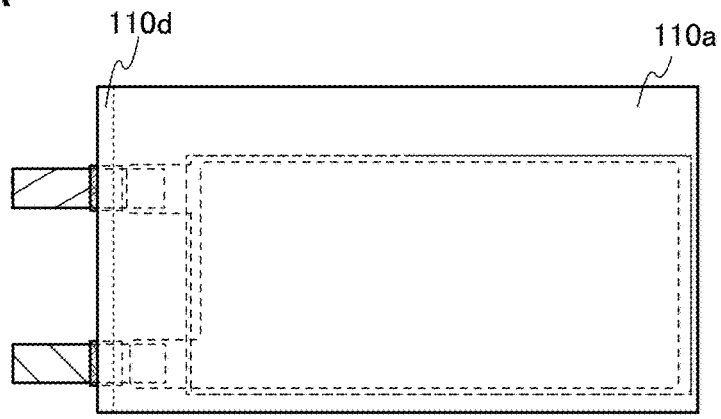
FIGS. 17A to 17C illustrate a method for manufacturing a power storage device.

Next, the positive electrodes 111, the positive electrode lead 141, the negative electrodes 115, and the negative electrode lead 145 are sandwiched by the folded film 110a. Then, the surfaces at a side of the film 110a (a region 110d in FIG. 17A) are bonded to each other (FIG. 17A). The bonding can be performed by thermal welding.

Although the film 110a and the exterior body 110 may have unevenness, such unevenness of the film 110a and the exterior body 110 is not illustrated in FIGS. 17A to 17C and FIGS. 18A and 18B for simplification.

[7. Bonding at Another Side of Exterior Body and Injecting Electrolyte Solution]

Figure 17B:
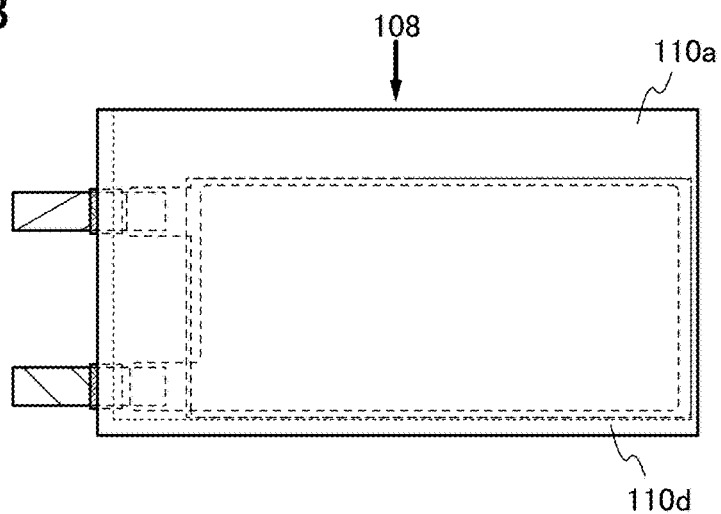

Next, the surfaces at another side of the film 110a (the region 110d in FIG. 17B) are bonded to each other. Then, the electrolyte solution 108 is injected to a region surrounded by the film 110a from a portion where the surfaces of the film 110a are not bonded (FIG. 17B).

[8. Sealing]

Figure 17C:
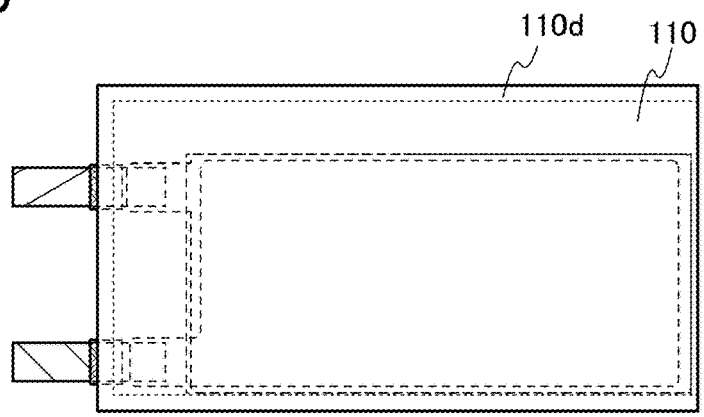

Next, the surfaces at the remaining one side (the region 110d in FIG. 17C) of the film 110a are bonded by heating and pressing under vacuum, so that the film 110a becomes the sealed exterior body 110 (FIG. 17C). This treatment is performed in an environment from which oxygen and water are eliminated, for example, in a glove box. The evacuation to a vacuum may be performed with a vacuum sealer, a liquid pouring sealer, or the like. Heating and pressing can be performed by setting the exterior body 107 between two heatable bars included in the sealer. An example of the conditions is as follows: the degree of vacuum is 60 kPa, the heating temperature is 190° C., the pressure is 0.1 MPa, and the time is 3 seconds. At this time, pressure may be applied to the positive electrode and the negative electrode through the film 110a. The application of pressure enables removal of bubbles which enter between the positive electrode and the negative electrode when the electrolyte solution is injected.

[9. Aging]

Next, charging and discharging are preferably performed in aging treatment. In this specification and the like, the aging treatment refers to a step performed to detect an initial defect of a secondary battery and to form a stable film on a negative electrode active material in initial charging and discharging. Specifically, the aging treatment refers to steps of keeping a charging state for a long time and then performing one or more cycles of charging and discharging, or the like at a temperature close to the upper limit of the operating temperature range of the battery. Moreover, because gas is generated in these steps, a step of releasing gas generated in a region surrounded by the exterior body 110 may be included.

When a stable film is formed on the negative electrode active material in initial charging and discharging, consumption of carrier ions caused by further film formation in charging and discharging after that can be inhibited. Thus, by performing the aging treatment, the performance of the power storage device can be more stabilized and a defective cell can be detected.

Figure 18A:
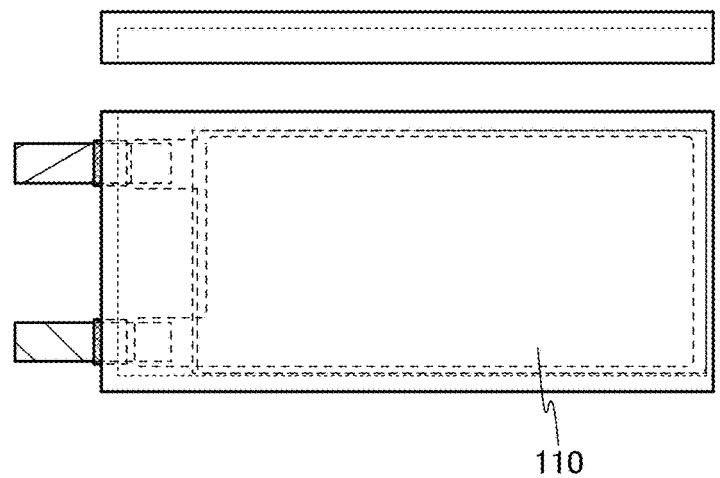
FIGS. 18A and 18B illustrate a method for manufacturing a power storage device.

In this embodiment, after one or more cycles of charging and discharging, a part of the exterior body 110 is cut out to release gas as illustrated in FIG. 18A.

[10. Resealing]

Figure 18B:
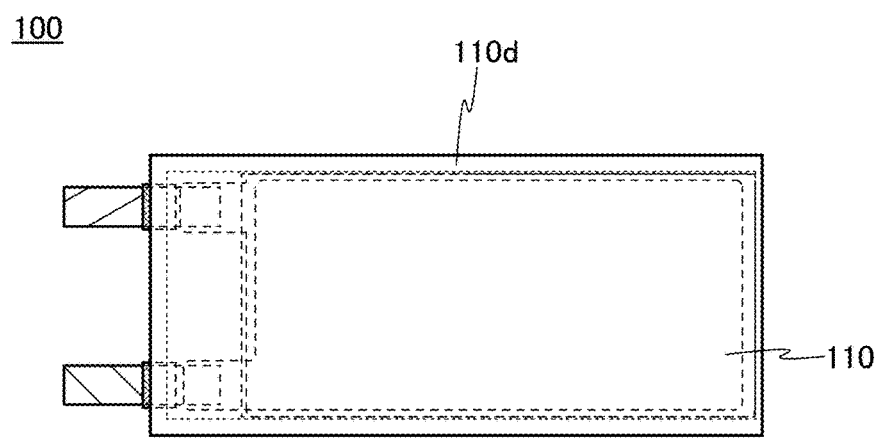

Next, the surfaces at the one side of the exterior body 110 cut out in the aging treatment (the region 110d in FIG. 18B) are resealed (FIG. 18B). Through the above-described process, the power storage device 100 can be fabricated.

Next, another example of the manufacturing method of the stack included in the power storage device 100 is described with reference to FIGS. 19A to 19D, FIGS. 20A to 20D, FIGS. 21A to 21D, FIG. 22, and FIGS. 23A to 23D.

Figure 19A:
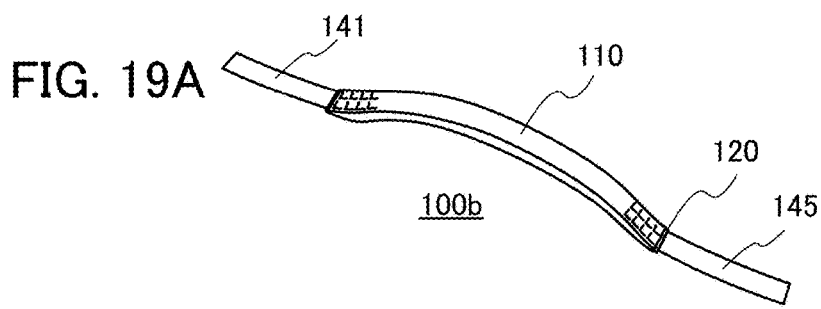
FIGS. 19A to 19D illustrate a method for manufacturing a power storage device.
Figure 19B:
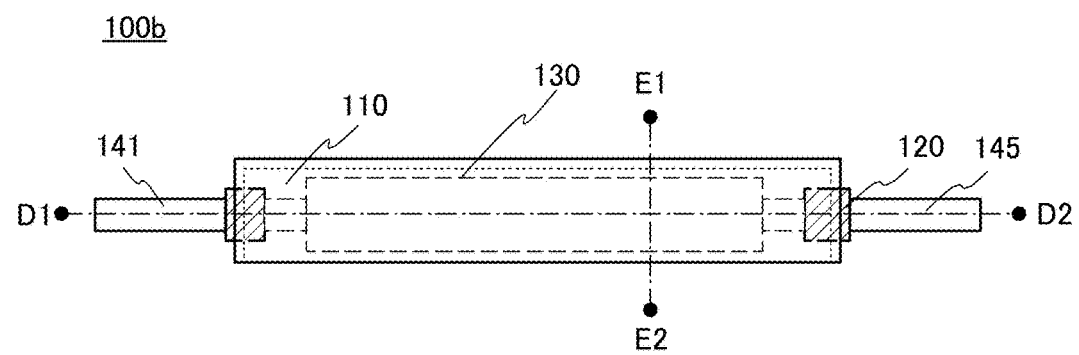
Figure 19C:
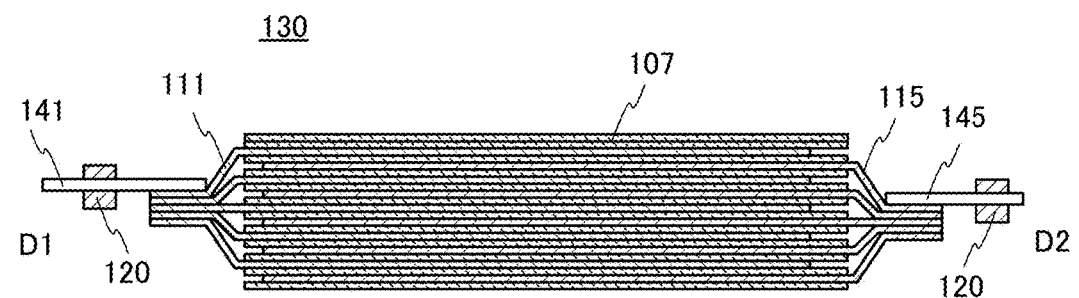
Figure 19D:
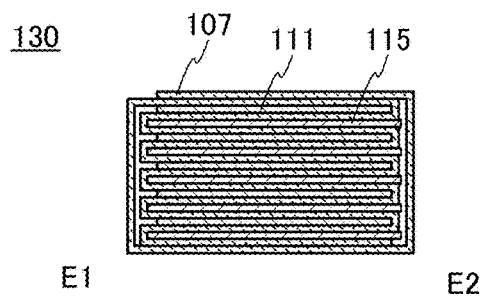

FIGS. 19A to 19D illustrate a power storage device 100b. FIG. 19A is a perspective view of the power storage device 100b, and FIG. 19B is a top view of the power storage device 100b. FIG. 19C is a cross-sectional view of the stack 130, the positive electrode lead 141, and the negative electrode lead 145 taken along a dashed-dotted line D1-D2 in FIG. 19B. FIG. 19D is a cross-sectional view of the stack 130 taken along a dashed-dotted line E1-E2 in FIG. 19B.

Like the power storage device 100b illustrated in FIGS. 19A to 19D, the surfaces of the exterior body 110 may be bonded at three sides.

A manufacturing method of the stack 130 included in the power storage device 100b illustrated in FIGS. 19A to 19D is described with reference to FIGS. 20A to 20D.

First, the negative electrode 115 is positioned over the separator 107 (FIG. 20A) such that the negative electrode active material layer of the negative electrode 115 overlaps with the separator 107.

Then, the separator 107 is folded to overlap with the negative electrode 115. Next, the positive electrode 111 is put to overlap with the separator 107 (FIG. 20B) such that the positive electrode active material layer 102 of the positive electrode 111 overlaps with the separator 107 and the negative electrode active material layer 106. Note that in the case where electrodes in each of which one surface of a current collector is provided with an active material layer are used, the positive electrode active material layer 102 of the positive electrode 111 and the negative electrode active material layer 106 of the negative electrode 115 are positioned to face each other with the separator 107 provided therebetween.

Figure 20A:
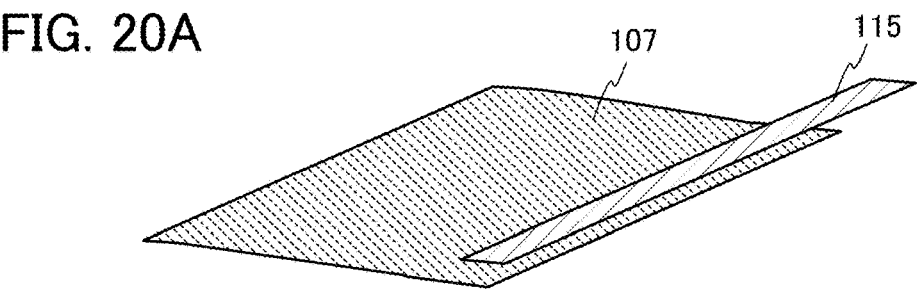
FIGS. 20A to 20D illustrate a method for manufacturing a power storage device.
Figure 20B:
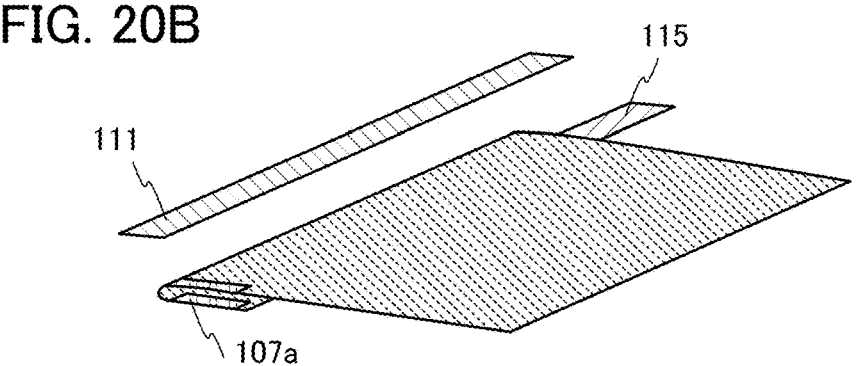

In the case where the separator 107 is formed using a material that can be thermally welded, such as polypropylene, a region where the separator 107 overlaps with itself is thermally welded and then another electrode is put to overlap with the separator 107, whereby the slippage of the electrode in the fabrication process can be suppressed. Specifically, a region which does not overlap with the negative electrode 115 or the positive electrode 111 and in which the separator 107 overlaps with itself, e.g., a region denoted as 107a in FIG. 20B, is preferably thermally welded.

Figure 20C:
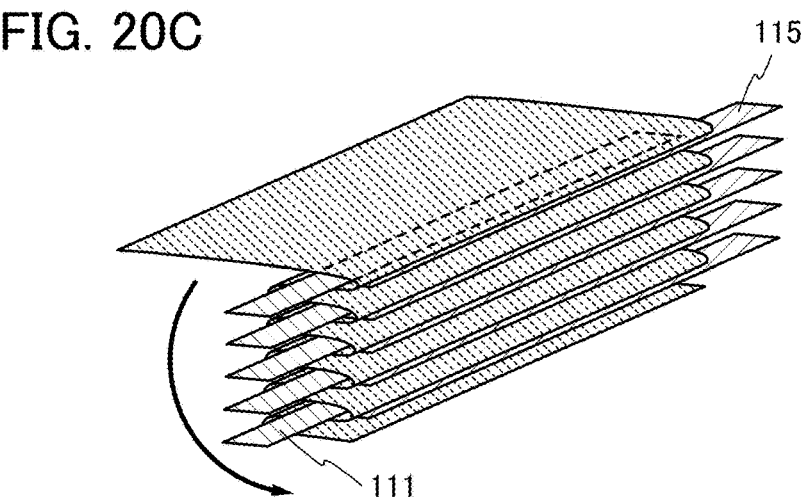

By repeating the above steps, the positive electrodes 111 and the negative electrodes 115 can overlap with each other with the separator 107 provided therebetween as illustrated in FIG. 20C.

Note that the plurality of positive electrodes 111 and the plurality of negative electrodes 115 may be placed to be alternately sandwiched by the separator 107 that is folded many times at different positions in advance.

Then, as illustrated in FIG. 20C, the plurality of positive electrodes 111 and the plurality of negative electrodes 115 are covered with the separator 107.

Figure 20D:
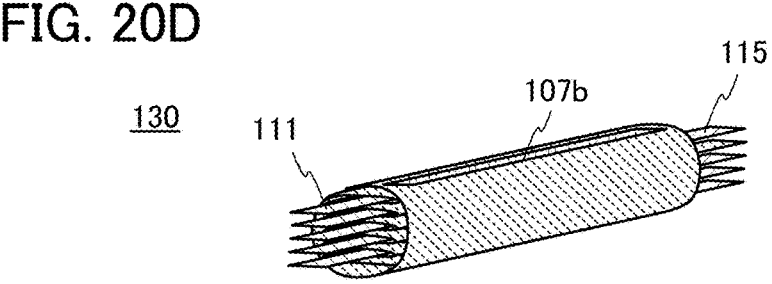

Furthermore, the region where the separator 107 overlaps with itself, e.g., a region 107b in FIG. 20D, is thermally welded as illustrated in FIG. 20D, whereby the plurality of positive electrodes 111 and the plurality of negative electrodes 115 are covered with and tied with the separator 107.

Note that the plurality of positive electrodes 111, the plurality of negative electrodes 115, and the separator 107 may be tied with a binding material.

Since the positive electrodes 111 and the negative electrodes 115 are stacked in the above process, one separator 107 has a region sandwiched between the positive electrode 111 and the negative electrode 115 and a region covering the plurality of positive electrodes 111 and the plurality of negative electrodes 115.

In other words, the separator 107 included in the power storage device 100b in FIGS. 19A to 19D is a single piece of separator which is partly folded. In the folded region of the separator 107, the plurality of positive electrodes 111 and the plurality of negative electrodes 115 are provided.

Figure 21A:
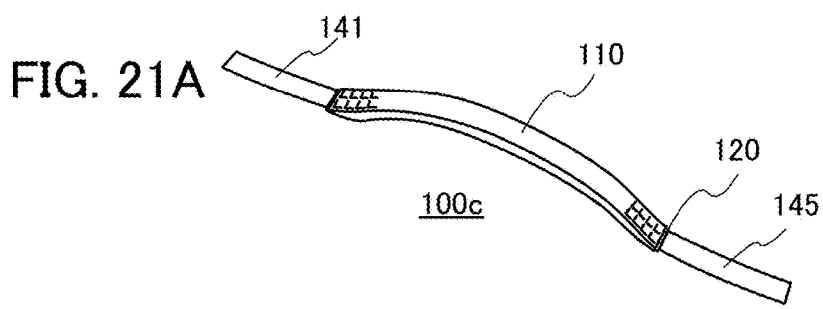
Figure 21B:
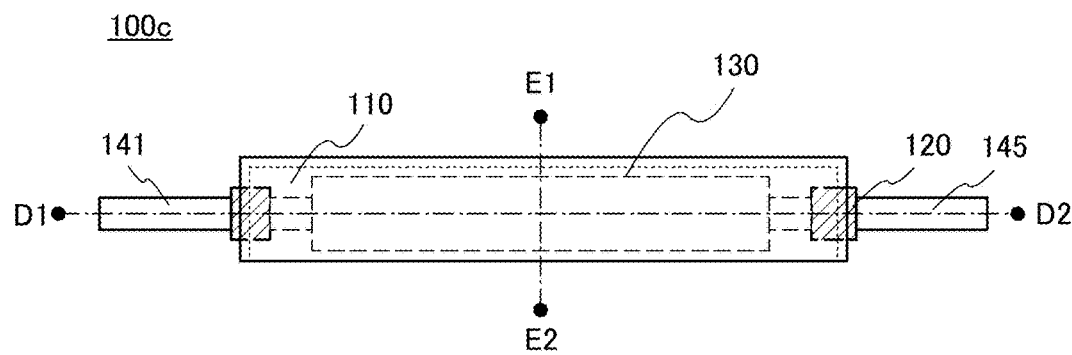
Figure 21B:
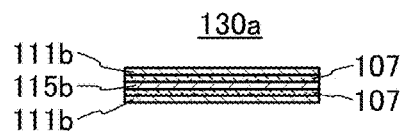
Figure 21B:
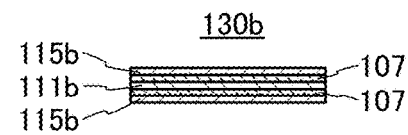
Figure 21D:
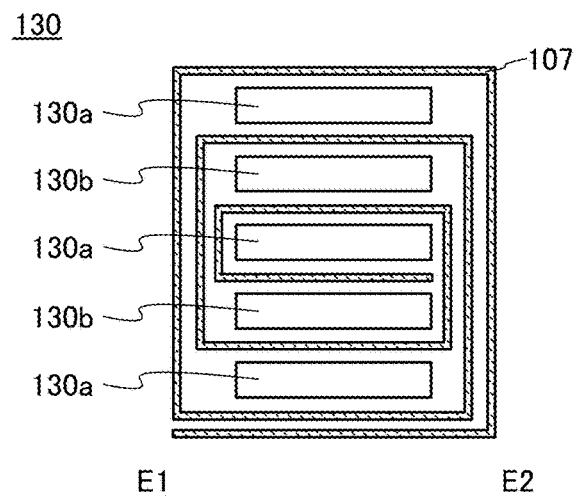
Figure 22:
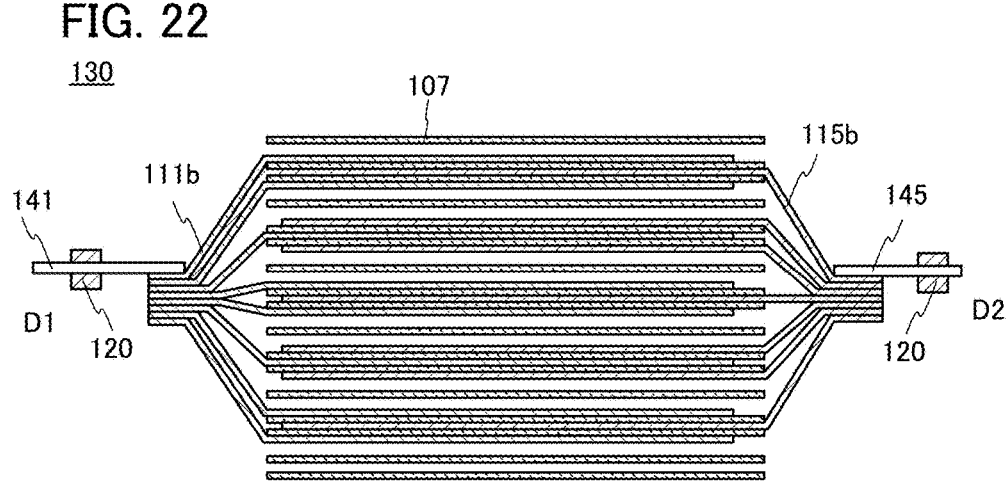
FIG. 22 illustrates a method for manufacturing a power storage device.

FIGS. 21A to 21D and FIG. 22 illustrate a power storage device 100c that is different from the power storage device illustrated in FIGS. 19A to 19D. FIG. 21A is a perspective view of the power storage device 100c, and FIG. 21B is a top view of the power storage device 100c. FIGS. 21C1 and 21C2 are cross-sectional views of a first stack 130a and a second stack 130b, respectively. FIG. 21D is a cross-sectional view of the stack 130 taken along a dashed-dotted line E1-E2 in FIG. 21B. FIG. 22 is a cross-sectional view taken along a dashed-dotted line D1-D2 in FIG. 21B.

The power storage device 100c illustrated in FIGS. 21A to 21D is different from the power storage device 100b illustrated in FIGS. 19A to 19D in the positions of the positive electrodes 111, the negative electrodes 115, and the separator 107.

As illustrated in FIG. 21D and FIG. 22, the stack 130 in the power storage device 100c is formed by combining a plurality of first stacks 130a and a plurality of second stacks 130b.

In the first stack 130a, as illustrated in FIG. 21C1, a positive electrode 111b including the positive electrode active material layer 102 on both surfaces of the positive electrode current collector 101, the separator 107, a negative electrode 115b including the negative electrode active material layer 106 on both surfaces of the negative electrode current collector 105, the separator 107, and another positive electrode 111b including the positive electrode active material layer 102 on both surfaces of the positive electrode current collector 101 are stacked in this order. In the second stack 130b, as illustrated in FIG. 21C2, the negative electrode 115b including the negative electrode active material layer 106 on both surfaces of the negative electrode current collector 105, the separator 107, the positive electrode 111b including the positive electrode active material layer 102 on both surfaces of the positive electrode current collector 101, the separator 107, and the negative electrode 115b including the negative electrode active material layer 106 on both surfaces of the negative electrode current collector 105 are stacked in this order.

As illustrated in FIG. 21D, the plurality of first stacks 130a and the plurality of second stacks 130b are covered with the winding separator 107.

Here, some steps in a manufacturing method of the power storage device 100c illustrated in 21A to 21D are described with reference to FIGS. 23A to 23D.

Figure 23A:
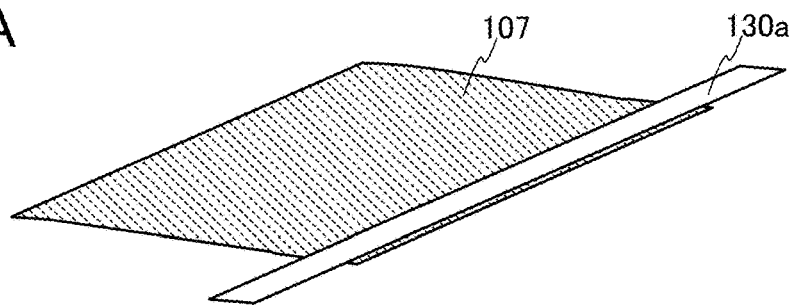
FIGS. 23A to 23D illustrate a method for manufacturing a power storage device.

First, the first stack 130a is put over the separator 107 (FIG. 23A).

Figure 23B:
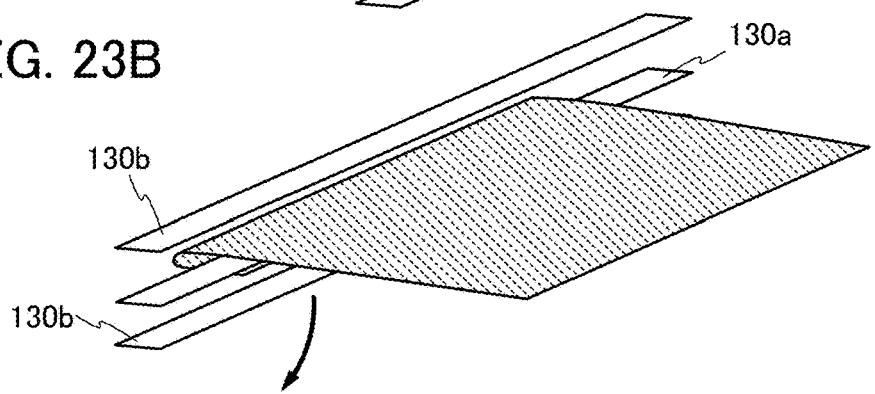

Then, the separator 107 is folded to overlap with the first stack 130a. After that, two second stacks 130b are put over and under the first stack 130a with the separator 107 positioned between the first stack 130a and each of the second stacks 130b (FIG. 23B).

Figure 23C:
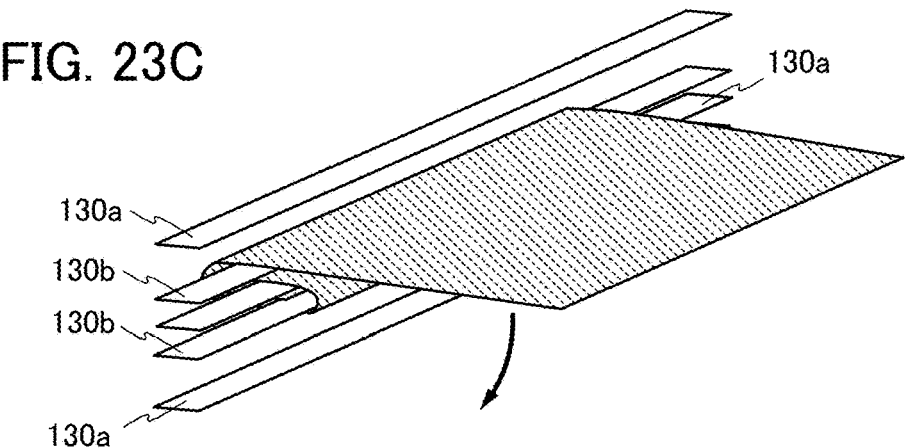

Then, the separator 107 is wound to cover the two second stacks 130b. Moreover, two first stacks 130a are put over and under the two second stacks 130b with the separator 107 positioned between each of the first stacks 130a and each of the second stacks 130b (FIG. 23C).

Figure 23D:
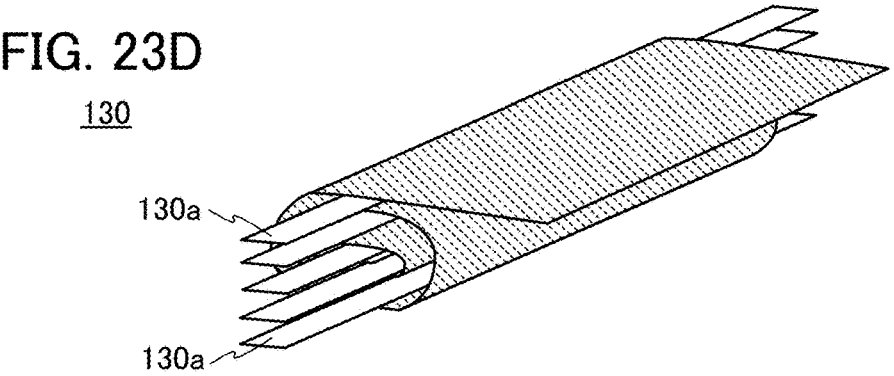

Then, the separator 107 is wound to cover the two first stacks 130a (FIG. 23D).

Since a plurality of first stacks 130a and a plurality of second stacks 130b are stacked in the above process, these stacks are each surrounded by the spirally wound separator 107.

Note that it is preferable in the positive electrode 111b of the outermost first stack 130a that the positive electrode active material layer 102 be not provided on the outer side.

Although FIGS. 21C1 and 21C2 each illustrate a structure in which the stack includes three electrodes and two separators, one embodiment of the present invention is not limited to this structure. The stack may include four or more electrodes and three or more separators. A larger number of electrodes lead to higher capacity of the power storage device 100c. Alternatively, the stack may include two electrodes and one separator. A smaller number of electrodes enable the power storage device 100c having higher resistance against curving. Although FIG. 21D illustrates the structure in which the power storage device 100c includes three first stacks 130a and two second stacks 130b, one embodiment of the present invention is not limited to this structure. The number of stacks may be increased. A larger number of stacks lead to higher capacity of the power storage device 100c. The number of stacks may be decreased. A smaller number of stacks enable a power storage device that can be curved easily.

This embodiment can be implemented in appropriate combination with any of the other embodiments.

(Embodiment 3)

In this embodiment, materials which can be used in a power storage device of one embodiment of the present invention are described in detail with reference to FIGS. 24A and 24B, FIGS. 25A and 25B, and FIGS. 26A and 26B.

[1. Positive Electrode]

The positive electrode 111 includes the positive electrode current collector 101, the positive electrode active material layer 102 formed over the positive electrode current collector 101, and the like.

The positive electrode current collector 101 can be formed using a material that has high conductivity and is not eluted with the potential of the positive electrode, such as a metal like stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 101 can have a foil-like shape, a plate-like shape (a sheet-like shape), a net-like shape, a punching-metal shape, an expanded-metal shape, or the like as appropriate. The positive electrode current collector 101 preferably has a thickness greater than or equal to 5 μm and less than or equal to 30 μm. The surface of the positive electrode current collector 101 may be provided with an undercoat layer using graphite or the like.

The positive electrode active material layer 102 may further include, in addition to the positive electrode active material, a binder for increasing adhesion of the positive electrode active material, a conductive additive for increasing the conductivity of the positive electrode active material layer 102, and the like.

Examples of the positive electrode active material that can be used for the positive electrode active material layer 102 include a composite oxide with an olivine crystal structure, a composite oxide with a layered rock-salt crystal structure, and a composite oxide with a spinel crystal structure. For example, a compound such as $LiFeO_2$, $LiCoO_2$, $LiNiO_2$, $LiMn_2O_4$, $V_2O_5$, $Cr_2O_5$, or $MnO_2$ can be used as the positive electrode active material.

In particular, $LiCoO_2$ is preferable because it has high capacity and higher stability in the air and higher thermal stability than $LiNiO_2$, for example.

It is preferable to add a small amount of lithium nickel oxide ($LiNiO_2$ or $LiNi_{1-x}M_xO_2$ ($0<x<1$) (M=Co, Al, or the like)) to a lithium-containing material with a spinel crystal structure which contains manganese such as $LiMn_2O_4$ because characteristics of the power storage device using such a material can be improved.

In addition, a lithium-manganese composite oxide that is represented by a composition formula $Li_aMn_bM_cO_d$ can be used as the positive electrode active material. Here, the element M is preferably silicon, phosphorus, or a metal element other than lithium and manganese, and further preferably nickel. Furthermore, it is preferable to satisfy the following at the time of discharging in the case where a whole particle of a lithium-manganese composite oxide is measured: $0<a/(b+c)<2$; $c>0$; and $0.26\leq(b+c)/d<0.5$. Note that the composition ratios of metal, silicon, phosphorus, and the like in the whole particle of a lithium-manganese composite oxide can be measured with, for example, an inductively coupled plasma mass spectrometer (ICP-MS). The composition ratio of oxygen in the whole particle of a lithium-manganese composite oxide can be measured by, for example, energy dispersive X-ray spectroscopy (EDX). Alternatively, the composition ratio of oxygen in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one element selected from chromium, cobalt, aluminum, nickel, iron, magnesium, molybdenum, zinc, indium, gallium, copper, titanium, niobium, silicon, phosphorus, and the like.

To achieve high capacity, the lithium-manganese composite oxide preferably includes a region where the surface portion and the middle portion are different in the crystal structure, the crystal orientation, or the oxygen content. In order that such a lithium-manganese composite oxide can be obtained, the composition formula is preferably $Li_aMn_bNi_cO_d$ satisfying the following: $1.6 \leq a \leq 1.848$; $0.19 \leq c/b \leq 0.935$; and $2.5 \leq d \leq 3$. Further, it is particularly preferable to use a lithium-manganese composite oxide represented by a composition formula $Li_{1.68}Mn_{0.8062}Ni_{0.318}O_3$. In this specification and the like, a lithium-manganese composite oxide represented by a composition formula $Li_{1.68}Mn_{0.8062}Ni_{0.318}O_3$ refers to that formed at a ratio (molar ratio) of the amounts of materials of $Li_2CO_3$: $MnCO_3$: $NiO$=0.84:0.8062:0.318. Although this lithium-manganese composite oxide is represented by a composition formula $Li_{1.68}Mn_{0.8062}Ni_{0.318}O_3$, the composition might be different.

Figure 24A:
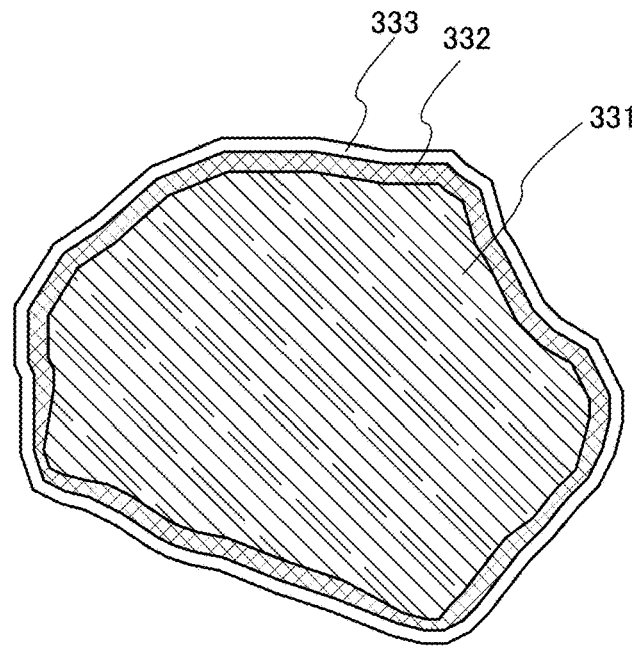
FIGS. 24A and 24B each illustrate an active material that can be used in a power storage device.
Figure 24B:
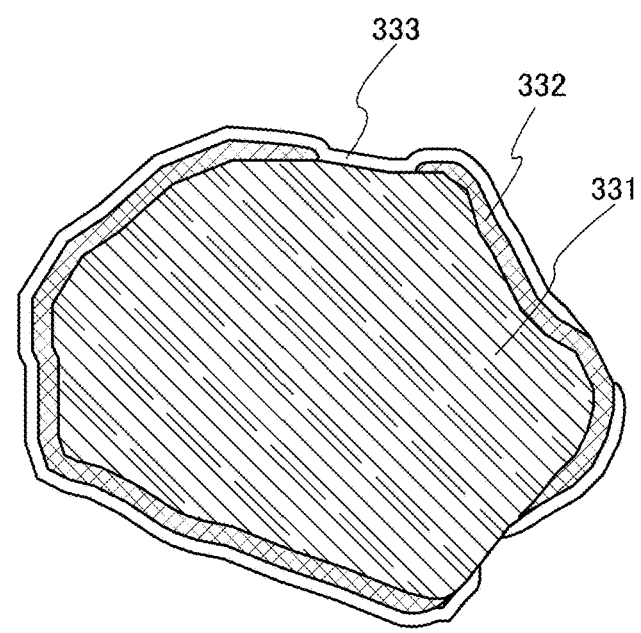

FIGS. 24A and 24B illustrate examples of a cross-sectional view of a particle of a lithium-manganese composite oxide having a region with a different crystal structure, crystal orientation, or oxygen content.

As illustrated in FIG. 24A, the lithium-manganese composite oxide having a region with different crystal structure, crystal orientation, or oxygen content preferably has a first region 331, a second region 332, and a third region 333. The second region 332 is connected to at least part of the outside of the first region 331. Here, the term "outside" refers to the side closer to a surface of a particle. The third region 333 preferably includes a region corresponding to a surface of a particle containing the lithium manganese composite oxide.

As illustrated in FIG. 24B, the first region 331 may include a region not covered with the second region 332. The second region 332 may include a region not covered with the third region 333. For example, the first region 331 may include a region connected to the third region 333. The first region 331 may include a region covered with neither the second region 332 nor the third region 333.

The second region 332 preferably has composition different from that of the first region 331.

For example, the case is described where the composition of the first region 331 and that of the second region 332 are separately measured and the first region 331 and the second region 332 each contain lithium, manganese, the element M, and oxygen; the atomic ratio of lithium to manganese, the element M and oxygen in the first region 331 is represented by a1:b1:c1:d1; and the atomic ratio of lithium to manganese, the element M, and oxygen in the second region 332 is represented by a2:b2:c2:d2. Note that the composition of each of the first region 331 and the second region 332 can be measured by, for example, energy dispersive X-ray spectroscopy (EDX) using a transmission electron microscope (TEM). In measurement by EDX, the composition ratio of lithium is sometimes difficult to measure. Thus, a difference between the first region 331 and the second region 332 in composition ratios of elements other than lithium is described below. Here, d1/(b1+c1) is preferably greater than or equal to 2.2, further preferably greater than or equal to 2.3, and still further preferably greater than or equal to 2.35 and less than or equal to 3. Furthermore, d2/(b2+c2) is preferably less than 2.2, further preferably less than 2.1, and still further preferably greater than or equal to 1.1 and less than or equal to 1.9. Also in this case, the composition of a whole particle of the lithium-manganese composite oxide including the first region 331 and the second region 332 preferably satisfies $0.26 \leq (b+c)/d < 0.5$ as described above.

The valence of manganese in the second region 332 may be different from that of manganese in the first region 331.

The valence of the element M in the second region 332 may be different from that of the element M in the first region 331.

Specifically, the first region 331 is preferably a lithium-manganese composite oxide with a layered rock-salt crystal structure. The second region 332 is preferably a lithium-manganese composite oxide with a spinel crystal structure.

Here, in the case where the composition of the regions or valences of elements in the regions are spatially distributed, for example, the composition or valences in a plurality of portions are obtained, the average values thereof are calculated, and the average values are regarded as the composition or valences of the regions.

A transition layer may be provided between the second region 332 and the first region 331. Here, the transition layer is a region where composition is changed continuously or gradually, a region where a crystal structure is changed continuously or gradually, or a region where the lattice constant of a crystal is changed continuously or gradually. A mixed layer may be provided between the second region 332 and the first region 331. The mixed layer is a layer in which, for example, two or more crystals having different crystal orientations are mixed, two or more crystals having different crystal structures are mixed, or two or more crystals having different compositions are mixed.

The third region 333 preferably contains carbon or a metal compound. Examples of the metal include cobalt, aluminum, nickel, iron, manganese, titanium, zinc, and lithium. As an example of the metal compound, an oxide of such metal, a fluoride of such metal, or the like can be given.

Among the above-described materials, carbon is particularly preferably included in the third region 333. Since carbon has high conductivity, the particle coated with carbon in the electrode of the storage battery can reduce the resistance of the electrode, for example. When the third region 333 contains carbon, the second region 332 connected to the third region 333 can be oxidized. The third region 333 may contain graphene, graphene oxide, or graphene oxide subjected to reduction. Graphene and reduced graphene oxide have excellent electrical characteristics of high conductivity and excellent physical properties of high flexibility and high mechanical strength. Moreover, a particle of the lithium-manganese composite oxide can be coated efficiently.

When the third region 333 includes a carbon material such as graphene, the power storage device using the lithium-manganese composite oxide as the positive electrode material can have improved cycle performance.

The thickness of a layer containing carbon is preferably greater than or equal to 0.4 nm and less than or equal to 40 nm.

Furthermore, the average size of primary particles of the lithium-manganese composite oxide is preferably greater than or equal to 5 nm and less than or equal to 50 μm and further preferably greater than or equal to 100 nm and less than or equal to 500 nm, for example. Furthermore, the specific surface area is preferably greater than or equal to 5 $m^2/g$ and less than or equal to 15 $m^2/g$. Furthermore, the average size of secondary particles is preferably greater than or equal to 5 μm and less than or equal to 50 μm. Note that the average particle sizes can be measured with a particle size distribution analyzer or the like using a laser diffraction and scattering method or by observation with a scanning electron microscope (SEM) or a TEM. The specific surface area can be measured by a gas adsorption method.

Alternatively, a complex material ($LiMPO_4$ (general formula) (M is one or more of Fe(II), Mn(II), Co(II), and Ni(II))) can be used as the positive electrode active material.

Typical examples of the general formula LiMPO$_4$ which can be used as a material are lithium compounds such as LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<1, and 0<i<1).

LiFePO$_4$ is particularly preferable because it meets requirements for a positive electrode active material with balance, such as safety, stability, high capacity density, and the existence of lithium ions that can be extracted in initial oxidation (charging).

Alternatively, a complex material such as Li$_{(2-j)}$MSiO$_4$ (general formula) (M is one or more of Fe(II), Mn(II), Co(II), and Ni(II); 0≤j≤2) can be used. Typical examples of the general formula Li$_{(2-j)}$MSiO$_4$ which can be used as a material are lithium compounds such as Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a nasicon compound expressed by A$_x$M$_2$(XO$_4$)$_3$ (general formula) (A=Li, Na, or Mg, M=Fe, Mn, Ti, V, or Nb, X=S, P, Mo, W, As, or Si) can be used for the positive electrode active material. Examples of the nasicon compound are Fe$_2$(MnO$_4$)$_3$, Fe$_2$(SO$_4$)$_3$, and Li$_3$Fe$_2$(PO$_4$)$_3$. Still further alternatively, compounds represented by a general formula, Li$_2$MPO$_4$F, Li$_2$MP$_2$O$_7$, and Li$_5$MO$_4$ (M=Fe or Mn), a perovskite fluoride such as NaFeF$_3$ and FeF$_3$, a metal chalcogenide (a sulfide, a selenide, and a telluride) such as TiS$_2$ and MoS$_2$, an oxide with an inverse spinel crystal structure such as LiMVO$_4$, a vanadium oxide based material (e.g., V$_2$O$_5$, V$_6$O$_{13}$, and LiV$_3$O$_8$), a manganese oxide, and an organic sulfur compound can be used as the positive electrode active material, for example.

In the case where carrier ions are alkali metal ions other than lithium ions or alkaline-earth metal ions, the positive electrode active material contains, instead of lithium, an alkali metal (e.g., sodium or potassium) or an alkaline-earth metal (e.g., calcium, strontium, barium, beryllium, or magnesium). For example, the positive electrode active material may be a layered oxide containing sodium such as NaFeO$_2$ or Na$_{2/3}$[Fe$_{1/2}$Mn$_{1/2}$]O$_2$.

Note that although not illustrated, a conductive material such as a carbon layer may be provided on a surface of the positive electrode active material layer 102. With the conductive material such as the carbon layer, conductivity of the electrode can be increased. For example, the positive electrode active material layer 102 can be coated with the carbon layer by mixing a carbohydrate such as glucose at the time of baking the positive electrode active material.

The average particle diameter of the primary particle of the positive electrode active material is preferably greater than or equal to 50 nm and less than or equal to 100 μm.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt % and further preferably greater than or equal to 1 wt % and less than or equal to 5 wt %.

A network for electrical conduction can be formed in the electrode by the conductive additive. The conductive additive also allows maintaining of a path for electric conduction between the particles of the active material. The addition of the conductive additive to the active material layer increases the electrical conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. Thus, the use of graphene as the conductive additive can increase contact points and the contact area of active materials.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in the graphene. In the case where graphene contains oxygen, the proportion of oxygen in the graphene measured by X-ray photoelectron spectroscopy (XPS) is higher than or equal to 2 atomic % and lower than or equal to 11 atomic %, preferably higher than or equal to 3 atomic % and lower than or equal to 10 atomic %.

Graphene is capable of making low-resistance surface contact and has extremely high conductivity even with a small thickness. Therefore, even a small amount of graphene can efficiently form a conductive path in an active material layer.

In the case where an active material with a small average particle size (e.g., 1 μm or less) is used, the specific surface area of the active material is large and thus more conductive paths for the active materials are needed. In such a case, it is particularly preferable to use graphene with extremely high conductivity that can efficiently form a conductive path even in a small amount.

A cross-sectional structure example of a positive electrode active material layer containing graphene as a conductive additive is described below. Note that a negative electrode active material layer may contain graphene as a conductive additive.

Figure 25A:
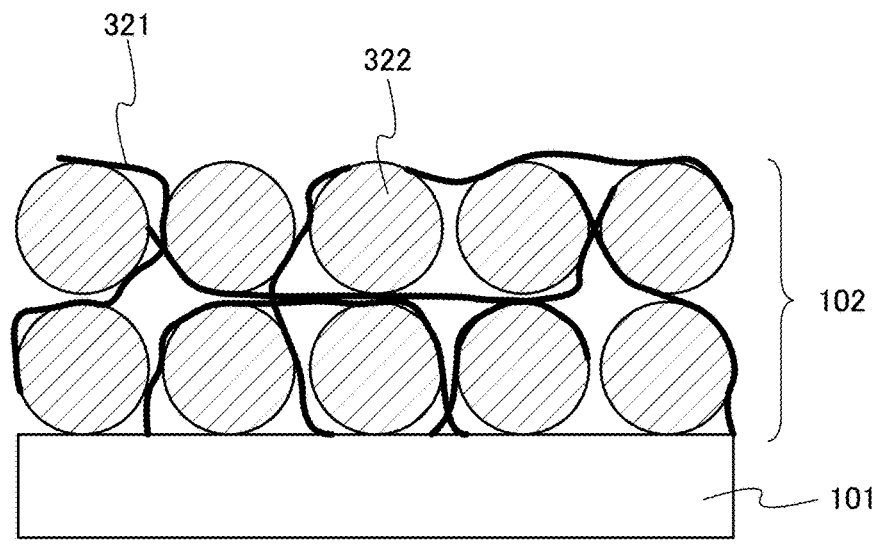

FIG. 25A is a longitudinal sectional view illustrating the positive electrode active material layer 102 and the positive electrode current collector 101. The positive electrode active material layer 102 includes positive electrode active material particles 322, graphene flakes 321 as a conductive additive, and a binder (not illustrated).

In the longitudinal section of the positive electrode active material layer 102, as illustrated in FIG. 25A, the sheet-like graphene flakes 321 in the positive electrode active material layer 102 substantially uniformly cover the positive electrode active material particles such that surface contact is made. The graphene flakes 321 are schematically shown by thick lines in FIG. 25A but are actually thin films each having a thickness corresponding to the thickness of a single layer or a multi-layer of carbon molecules. The plurality of graphene flakes 321 are formed in such a way as to wrap, cover, or adhere to the surfaces of the plurality of positive electrode active material particles 322, so that the graphene flakes 321 make surface contact with the positive electrode active material particles 322. Furthermore, the graphene flakes 321 are also in surface contact with each other; consequently, the plurality of graphene flakes 321 form a three-dimensional network for electric conduction.

This is because graphene oxide with extremely high dispersibility in a polar solvent is used for the formation of the graphene flakes 321. The solvent is removed by volatilization from a dispersion medium in which graphene oxide is uniformly dispersed, and the graphene oxide is reduced to graphene; hence, the graphene flakes 321 remaining in the positive electrode active material layer 102 partly overlap with each other and cover the positive electrode active material such that surface contact is made, thereby forming an electrical conduction path. Note that, graphene oxide may be reduced by, for example, heat treatment or with the use of a reducing agent.

Unlike a conventional conductive additive in the form of particles, such as acetylene black, which makes point contact with an active material, the graphene flakes 321 are capable of making low-resistance surface contact; accordingly, the electrical conduction between the positive electrode active material particles 322 and the graphene flakes 321 can be improved without an increase in the amount of a conductive additive. Thus, the proportion of the positive electrode active material particles 322 in the positive electrode active material layer 102 can be increased. Accordingly, the discharge capacity of a power storage device can be increased.

Graphene flakes are bonded to each other to form net-like graphene (hereinafter referred to as a graphene net). The graphene net covering the active material can function as a binder for binding particles. The amount of a binder can thus be reduced, or the binder does not have to be used. This can increase the proportion of the active material in the electrode volume or weight. That is to say, the capacity of the power storage device can be increased.

A structure where a positive active material layer or a negative active material layer contains graphene as a conductive additive as described above is particularly effective for a flexible power storage device.

Figure 26A:
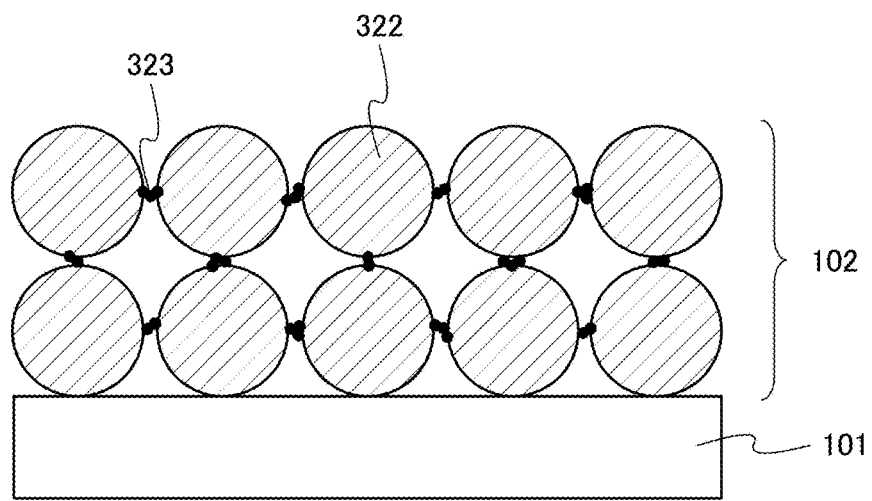

FIG. 26A is a longitudinal sectional view illustrating the positive electrode active material layer 102 and the positive electrode current collector 101 of the case where conductive additive particles 323 such as acetylene black are used, as a conventional example. A network for electrical conduction is formed between the positive electrode active material particles 322 by contact with the conductive additive particles 323.

Figure 26B:
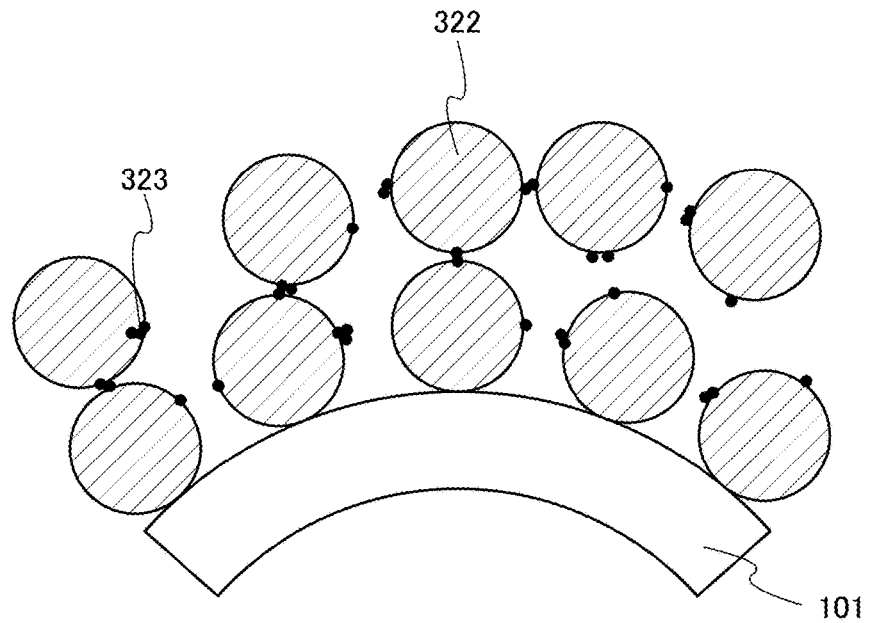

FIG. 26B shows the case where the positive electrode active material layer 102 and the positive electrode current collector 101 in FIG. 26A are curved. As illustrated in FIG. 26B, when the conductive additive particles 323 are used as a conductive additive, the distance between the positive electrode active material particles 322 is changed because of curving of the positive electrode active material layer 102, and part of the network for electrical conduction between the positive electrode active material particles 322 may be broken.

Figure 25B:
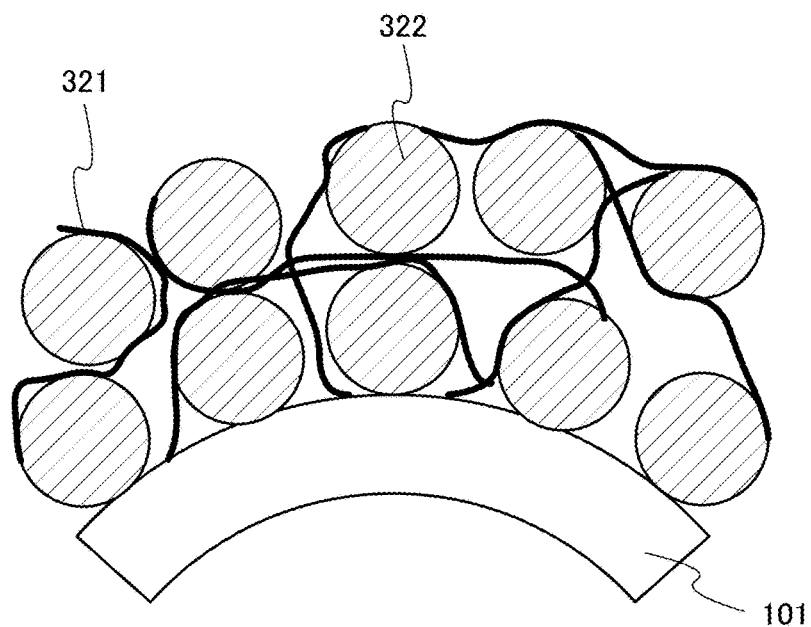

In contrast, FIG. 25B shows the case where the positive electrode current collector 101 and the positive electrode active material layer 102, which contains graphene as a conductive additive, in FIG. 25A are curved. Even when the distance between the positive electrode active material particles 322 is changed because of curving of the positive electrode active material layer 102 as in FIG. 25B, the network for electrical conduction can be maintained because graphene is a flexible sheet.

Various methods can be used for forming an electrode which is used for the power storage device of one embodiment of the present invention. For example, in the case where an active material layer is formed over a current collector by a coating method, the active material, the binder, the conductive additive, and the dispersion medium (also referred to as a solvent) are mixed to form a paste, the paste is applied to the current collector, and the dispersion medium is vaporized. After that, the active material layer may be pressed by a compression method such as a roll press method or a flat plate press method so as to be consolidated if necessary.

As the dispersion medium, water, a polar organic solvent such as N-methylpyrrolidone (NMP) or dimethylformamide can be used, for example. Water is preferably used in terms of the safety and cost.

It is preferable for the binder to include, for example, water-soluble polymers. As the water-soluble polymers, a polysaccharide or the like can be used, for example. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, fluorine rubber, or ethylene-propylene-diene copolymer is preferably used. Any of these rubber materials is further preferably used in combination with the aforementioned water-soluble polymers.

Alternatively, as the binder, a material such as polystyrene, poly(methyl acrylate), poly(methyl methacrylate) (polymethyl methacrylate (PMMA)), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVdF), polyacrylonitrile (PAN), polyvinyl chloride, ethylene-propylene-diene polymer, polyvinyl acetate, or nitrocellulose is preferably used.

Two or more of the above materials may be used in combination for the binder.

The content of the binder in the positive electrode active material layer 102 is preferably greater than or equal to 1 wt % and less than or equal to 10 wt %, further preferably greater than or equal to 2 wt % and less than or equal to 8 wt %, and still further preferably greater than or equal to 3 wt % and less than or equal to 5 wt %. The content of the conductive additive in the positive electrode active material layer 102 is preferably greater than or equal to 1 wt % and less than or equal to 10 wt % and further preferably greater than or equal to 1 wt % and less than or equal to 5 wt %.

In the case where the positive electrode active material layer 102 is formed by a coating method, the positive electrode active material, the binder, and the conductive additive are mixed to form a positive electrode paste (slurry), and the positive electrode paste is applied to the positive electrode current collector 101 and dried.

[2. Negative Electrode]

The negative electrode 115 includes, for example, the negative electrode current collector 105 and the negative electrode active material layer 106 formed over the negative electrode current collector 105.

The negative electrode current collector 105 can be formed using a material that has high conductivity and is not alloyed with a carrier ion of lithium or the like, such as a metal like stainless steel, gold, platinum, iron, copper, titanium, or an alloy thereof. Alternatively, an aluminum alloy to which an element which improves heat resistance, such as silicon, titanium, neodymium, scandium, or molybdenum, is added can be used. The negative electrode current collector 105 can have a foil-like shape, a plate-like shape (sheet-like shape), a net-like shape, a punching-metal shape, an expanded-metal shape, or the like as appropriate. The negative electrode current collector 105 may have a thickness greater than or equal to 5 μm and less than or equal to 30 μm. The surface of the negative electrode current collector 105 may be provided with an undercoat layer using graphite or the like.

The negative electrode current collector is preferably formed using a high-strength material such as stainless steel or titanium because the negative electrode current collector can resist the change in the shape caused by expansion of the negative electrode active material layer. Particularly in the case where the negative electrode active material is formed using a material whose volume is largely changed by charging and discharging, such as a material containing silicon, the above negative electrode current collector is preferable.

The negative electrode active material layer 106 may further include, in addition to the negative electrode active material, a binder for increasing adhesion of the negative electrode active material, a conductive additive for increasing the conductivity of the negative electrode active material layer 106, and the like. For the materials of the binder and the conductive additive which are used for the negative electrode active material layer, the materials of the binder and the conductive additive which are used for the positive electrode active material layer are referred to.

A material with which lithium can be dissolved and precipitated or a material which can reversibly react with lithium ions can be used for a negative electrode active material; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, and pitch-based artificial graphite, and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion power storage device can have a high operating voltage. In addition, graphite is preferable because of its advantages such as relatively high capacity per unit volume, small volume expansion, low cost, and safety greater than that of a lithium metal.

As the negative electrode active material, other than the above carbon materials, a material which enables charge-discharge reaction by alloying and dealloying reaction with carrier ions can be used. In the case where carrier ions are lithium ions, for example, a material containing at least one element of Mg, Ca, Al, Si, Ge, Sn, Pb, As, Sb, Bi, Ag, Au, Zn, Cd, Hg, In, and the like can be used. Such elements have higher capacity than carbon. In particular, silicon has a significantly high theoretical capacity of 4200 mAh/g. For this reason, silicon is preferably used as the negative electrode active material. Examples of the material including such elements are $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Note that SiO refers to the powder of a silicon oxide and can also be referred to as $SiO_y$ (2>y>0). SiO may include a silicon-rich portion. Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a power storage device is fabricated using SiO as a material thereof and the SiO is oxidized because of repeated charge and discharge cycles, SiO is changed into $SiO_2$ in some cases.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides may be used as a positive electrode active material because of its high potential.

In the case where the negative electrode active material layer 106 is formed by a coating method, the negative electrode active material and the binder are mixed to form a negative electrode paste (slurry), and the negative electrode paste is applied to the negative electrode current collector 105 and dried.

Graphene may be formed on a surface of the negative electrode active material layer 106. In the case of using silicon as the negative electrode active material, the volume of silicon is greatly changed due to occlusion and release of carrier ions in charge-discharge cycles. Therefore, adhesion between the negative electrode current collector 105 and the negative electrode active material layer 106 is decreased, resulting in degradation of battery characteristics caused by charge and discharge. Thus, graphene is preferably formed on a surface of the negative electrode active material layer 106 containing silicon because even when the volume of silicon is changed in charge-discharge cycles, decrease in the adhesion between the negative electrode current collector 105 and the negative electrode active material layer 106 can be inhibited, which makes it possible to reduce degradation of battery characteristics.

Alternatively, a film of an oxide or the like may be formed on the surface of the negative electrode active material layer 106. A film formed by decomposition or the like of an electrolyte solution or the like in charging cannot release electric charges used at the formation, and therefore forms irreversible capacity. In contrast, the film of an oxide or the like provided on the surface of the negative electrode active material layer 106 in advance can reduce or prevent generation of irreversible capacity.

As the film covering the negative electrode active material layer 106, an oxide film of any one of niobium, titanium, vanadium, tantalum, tungsten, zirconium, molybdenum, hafnium, chromium, aluminum, and silicon or an oxide film containing any one of these elements and lithium can be used. Such a film is much denser than a conventional film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions. Alternatively, silicon oxide or aluminum oxide may be used.

A sol-gel method can be used to form a film that covers the negative electrode active material layer 106, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the film can be formed on the surface of the negative electrode active material layer 106. A decrease in the capacity of the power storage unit can be prevented by using the film.

[3. Separator]

As a material of the separator 107, a porous insulator such as cellulose, polypropylene (PP), polyethylene (PE), polybutene, nylon, polyester, polysulfone, polyacrylonitrile, polyvinylidene fluoride, tetrafluoroethylene, or polyphenylene sulfide can be used. Alternatively, nonwoven fabric of a glass fiber or the like, or a diaphragm in which a glass fiber and a polymer fiber are mixed may be used. Alternatively, to increase heat resistance, a polyester nonwoven fabric to which ceramic is applied or which is coated with aramid may be used as a separator.

[4. Electrolyte Solution]

As a solvent for the electrolyte solution 108 used in the power storage device 100, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more ionic liquids (room temperature molten salts) which are less likely to burn and volatilize as the solvent for the electrolyte solution can prevent the power storage device from exploding or catching fire even when the power storage unit internally shorts out or the internal temperature increases due to overcharging or the like.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(FSO_2)_2$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

Polymer may be added to the electrolytic solution so that the electrolytic solution becomes gelled. The gelled electrolytic solution has higher safety against liquid leakage or the like. Further, the power storage device can be thinner and more lightweight. As the polymer capable of making the electrolytic solution gelled, a polyalkylene oxide-based polymer, a polyacrylonitrile-based polymer, a polyvinylidene fluoride-based polymer, a polyacrylate based polymer, or a polymethacrylate-based polymer can be used. In this specification and the like, the term polyvinylidene fluoride-based polymer, for example, refers to a polymer including polyvinylidene fluoride, and includes a poly(vinylidene fluoride-hexafluoropropylene) copolymer and the like. The formed polymer may be porous.

The above polymer can be qualitatively analyzed using a Fourier transform infrared (FT-IR) spectrometer or the like. For example, the polyvinylidene fluoride-based polymer has an absorption peak showing a C—F bond in a spectrum obtained with the FT-IR spectrometer. Furthermore, the polyacrylonitrile-based polymer has an absorption peak showing a C≡N bond in a spectrum obtained by the FT-IR spectrometer.

The electrolyte solution used for the power storage device preferably contains a small amount of dust particles and elements other than the constituent elements of the electrolyte solution (hereinafter, also simply referred to as impurities) so as to be highly purified. Specifically, the weight ratio of impurities to the electrolyte solution is less than or equal to 1%, preferably less than or equal to 0.1% and further preferably less than or equal to 0.01%. An additive agent such as vinylene carbonate may be added to the electrolyte solution.

Instead of the electrolyte solution, a solid electrolyte including an inorganic material such as a sulfide-based inorganic material or an oxide-based inorganic material can be used. When the solid electrolyte is used, a separator and a spacer are not necessary. Furthermore, the battery can be entirely solidified; therefore, there is no danger of liquid leakage, dramatically improving the safety of the battery.

[5. Exterior Body]

As a material of the exterior body, any of the films described in Embodiment 1 can be used.

In addition, on the exterior body 110, depressions, projections, or depressions and projections are preferably formed by embossing or the like.

Forming depressions or projections on a surface of a film containing metal foil by embossing increases the surface area of the exterior body 110 exposed to outside air, achieving efficient heat dissipation.

In the case where the power storage device 100 is changed in shape by externally applying force, compressive stress is applied to the inward exterior body 110 close to the flexural center, and tensile stress is applied to the outward exterior body 110 apart from the flexural center. Due to the stress, the exterior body 110 is strained and might be partly deformed or damaged.

Projections or depressions formed on the exterior body 110 by embossing or the like can increase the creeping distance of the exterior body 110 and can relax compressive stress and tensile stress per unit length. Therefore, the power storage device 100 can be highly reliable.

Note that a "strain" is the scale of change in form indicating the displacement of a point of an object relative to the reference (initial) length of the object. The depression or the projection formed on the surface of the exterior body 110 can reduce the influence of a strain caused by application of external force to the secondary battery.

This embodiment can be implemented in appropriate combination with any of the other embodiments.

(Embodiment 4)

Described in this embodiment are examples of an electronic device including the power storage device shown in Embodiment 1.

Figure 27:
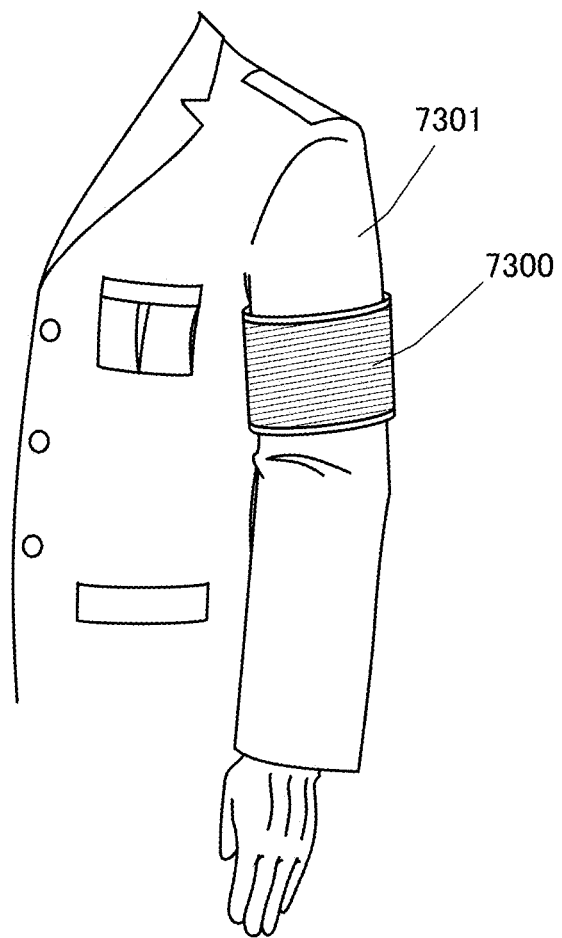
FIG. 27 illustrates an example of an electronic device.

FIG. 27 illustrates an example of an armband electronic device including a flexible power storage device. An armband device 7300 illustrated in FIG. 27 can be worn on an arm 7301 and includes a display portion having a curved surface and a bendable power storage device.

Note that in the display portion, a display element, a display device which is a device including a display element, a light-emitting element, and a light-emitting device which is a device including a light-emitting element can employ a variety of modes or can include a variety of elements. The display element, the display device, the light-emitting element, or the light-emitting device includes at least one of an electroluminescent (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical systems (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electrowetting element, a piezoelectric ceramic display, a display element including a carbon nanotube, and the like. In addition to that, the display element, the display device, the light-emitting element, or the light-emitting device may include a display medium whose contrast, luminance, reflectivity, transmittance, or the like is changed by electrical or magnetic effect. Examples of a display device having an EL element include an EL display. Examples of display devices having electron emitters include a field emission display (FED), an SED-type flat panel display (SED: surface-conduction electron-emitter display), and the like. Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, electronic liquid powder (registered trademark), or electrophoretic elements include electronic paper. In the case of a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multi-layer film in which a plurality of layers are stacked. When graphene or graphite is provided in this manner, a nitride semiconductor, for example, an n-type GaN semiconductor layer including crystals can be easily formed thereover. Furthermore, a p-type GaN semiconductor layer including crystals or the like can be provided thereover, and thus the LED can be formed. Note that an AlN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

Preferably, the armband device 7300 further includes one or more functional elements, e.g., a sensor. Examples of the sensor include a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. The armband device 7300 may include a functional element such as a touch panel, an antenna, a power generation element, or a speaker.

For example, when a user wears the armband device 7300 on his or her arm and makes its display emit light at nighttime, traffic safety can be ensured. The armband device 7300 can also be effectively used in the field of sports. For another example, when a construction crew or the like who wears a helmet wears the armband device 7300 and operates it, he or she can carry out communication or easily obtain positional information of other crews for safe working.

FIGS. 28A to 28F illustrate other examples of the electronic device including a flexible power storage device. Examples of electronic devices each including a flexible power storage device include television devices (also referred to as televisions or television receivers), monitors of computers or the like, cameras such as digital cameras and digital video cameras, digital photo frames, cellular phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 28A:
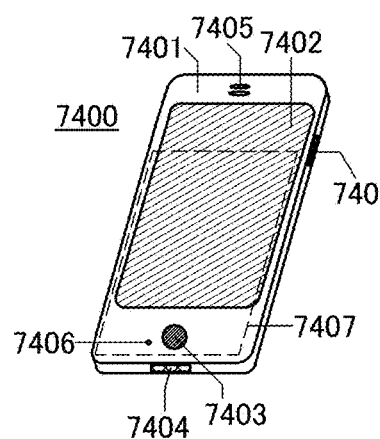
FIGS. 28A to 28F illustrate examples of electronic devices.

FIG. 28A illustrates an example of a cellular phone. A cellular phone 7400 includes a display portion 7402 incorporated in a housing 7401, operation buttons 7403, an external connection port 7404, a speaker 7405, a microphone 7406, and the like. Note that the cellular phone 7400 includes a power storage device 7407.

Figure 28B:
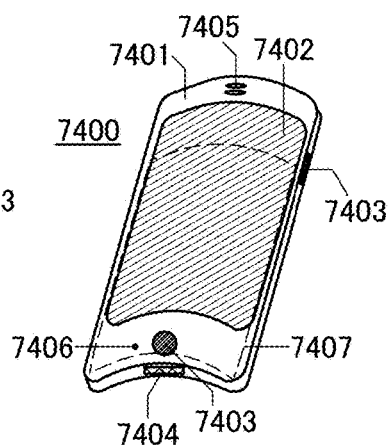
Figure 28C:
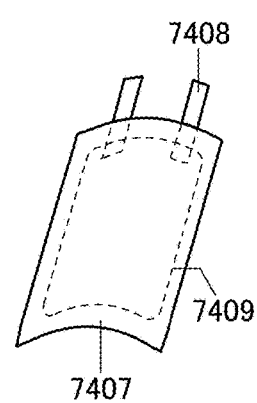

FIG. 28B illustrates the cellular phone 7400 that is curved. When the whole cellular phone 7400 is curved by external force, the power storage device 7407 included in the cellular phone 7400 is also curved. FIG. 28C illustrates the curved power storage device 7407. The power storage device 7407 is a thin power storage device. The power storage device 7407 is fixed in the curved state. Note that the power storage device 7407 includes a lead electrode 7408 electrically connected to a current collector 7409. The current collector 7409 is, for example, copper foil, and partly alloyed with gallium so as to improve the adhesion between the current collector 7409 and an active material layer. Consequently, the power storage device 7407 can have high reliability even in a state of being curved.

Figure 28D:
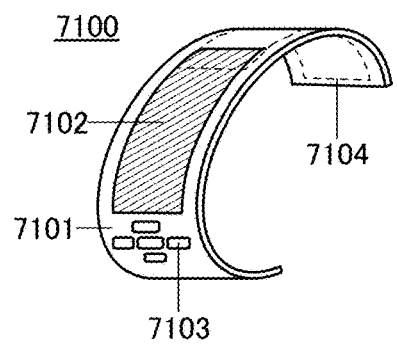
Figure 28E:
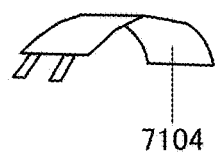
Figure 28F:
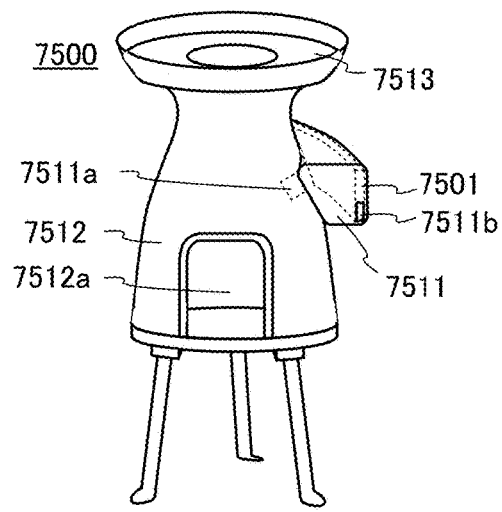

FIG. 28D illustrates an example of a bangle display device. A portable display device 7100 includes a housing 7101, a display portion 7102, operation buttons 7103, and a power storage device 7104. FIG. 28E illustrates the bent power storage device 7104. When the display device is worn on a user's arm while the power storage device 7104 is bent, the shape of the housing changes to change the curvature of part or the whole of the power storage device 7104. Note that the radius of curvature of a curve at a point refers to the radius of the circular arc that best approximates the curve at that point. The reciprocal of the radius of curvature is curvature. Specifically, part or the whole of the housing or the main surface of the power storage device 7104 is changed in the range of radius of curvature from 40 mm to 150 mm. When the radius of curvature at the main surface of the power storage device 7104 is 40 mm to 150 mm, the reliability can be kept high.

Furthermore, the power storage device which can be curved can be provided with high space efficiency in any of a variety of electronic devices. For example, in a stove 7500 illustrated in FIG. 28F, a module 7511 is attached to a main body 7512. The module 7511 includes a power storage device 7501, a motor, a fan, an air outlet 7511a, and a thermoelectric generation device. In the stove 7500, after a fuel is injected through an opening 7512a and ignited, outside air can be sent through the air outlet 7511a to the inside of the stove 7500 by rotating the motor and the fan which are included in the module 7511 using power of the power storage device 7501. In this manner, the stove 7500 can have strong heating power because outside air can be taken into the inside of the stove 7500 efficiently. In addition, cooking can be performed on an upper grill 7513 with thermal energy generated by the combustion of fuel. When the thermal energy is converted into power with the thermoelectric generation device of the module 7511, the power storage device 7501 can be charged with the power. The power charged into the power storage device 7501 can be output through an external terminal 7511b.

Figure 29A:
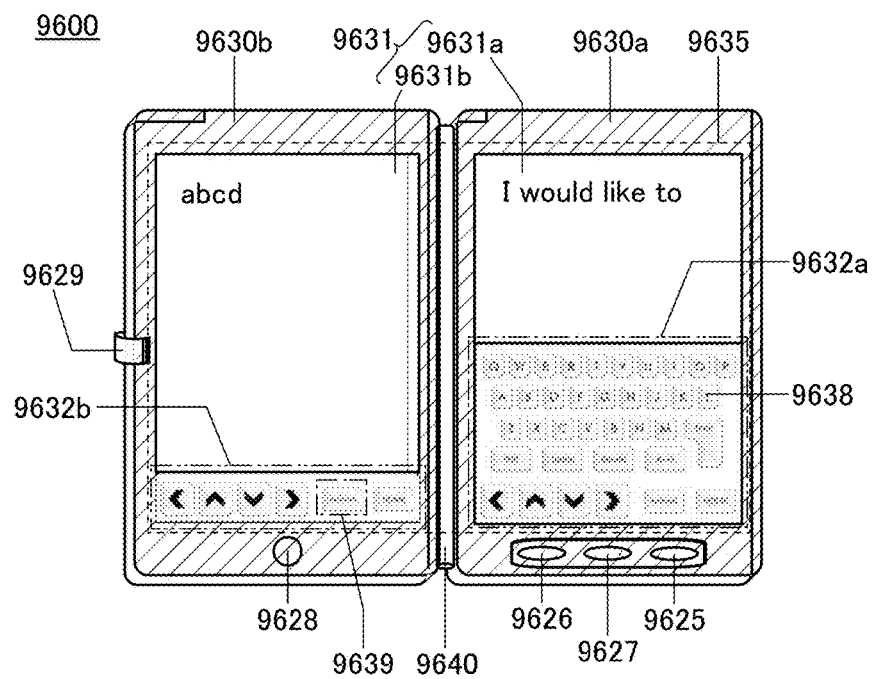
FIGS. 29A to 29C illustrate an example of an electronic device.
Figure 29B:
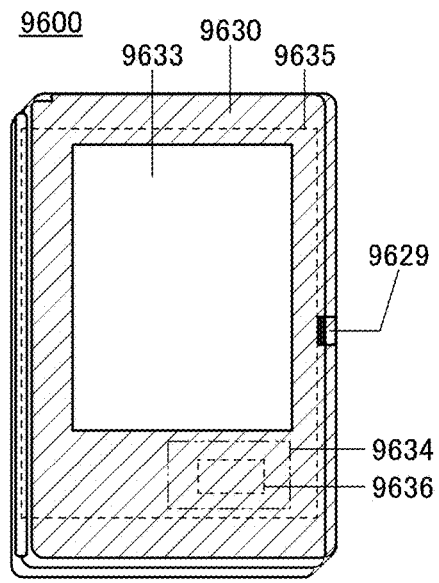

FIGS. 29A and 29B illustrate an example of a tablet terminal that can be folded in half. A tablet terminal 9600 illustrated in FIGS. 29A and 29B includes a housing 9630a, a housing 9630b, a movable portion 9640 connecting the housings 9630a and 9630b, a display portion 9631 including a display portion 9631a and a display portion 9631b, a display mode switch 9626, a power switch 9627, a power-saving mode switch 9625, a fastener 9629, and an operation switch 9628. FIGS. 29A and 29B illustrate the tablet terminal 9600 opened and closed, respectively.

The tablet terminal 9600 includes a power storage device 9635 inside the housings 9630a and 9630b. The power storage device 9635 is provided across the housings 9630a and 9630b, passing through the movable portion 9640.

Part of the display portion 9631a can be a touch panel region 9632a, and data can be input by touching operation keys 9638 that are displayed. Note that FIG. 29A illustrates, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display keyboard buttons and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The switch 9626 for switching a display mode allows switching between a landscape mode and a portrait mode, color display and black-and-white display, and the like. The power-saving mode switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Note that FIG. 29A illustrates an example in which the display portion 9631a and the display portion 9631b have the same display area; however, one embodiment of the present invention is not limited and one of the display portions may be different from the other display portion in size and display quality. For example, one of the display portions 9631a and 9631b may display higher definition images than the other.

The tablet terminal is closed in FIG. 29B. The tablet terminal includes the housing 9630, a solar cell 9633, and a charge and discharge control circuit 9634 including a DC-DC converter 9636. The power storage device of one embodiment of the present invention is used as the power storage device 9635.

The tablet terminal 9600 can be folded so that the housings 9630a and 9630b overlap with each other when not in use. Thus, the display portions 9631a and 9631b can be protected, which increases the durability of the tablet terminal 9600. In addition, the power storage device 9635, which is the power storage device of one embodiment of the present invention, has flexibility and can be repeatedly bent without a large decrease in charge and discharge capacity. Thus, a highly reliable tablet terminal can be provided.

The tablet terminal illustrated in FIGS. 29A and 29B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the power storage device 9635 can be charged efficiently. When the power storage device of one embodiment of the present invention is used as the power storage device 9635, the tablet terminal can be used for a long period because the deterioration of discharge capacity caused by repetition of charging and discharging can be suppressed.

Figure 29C:
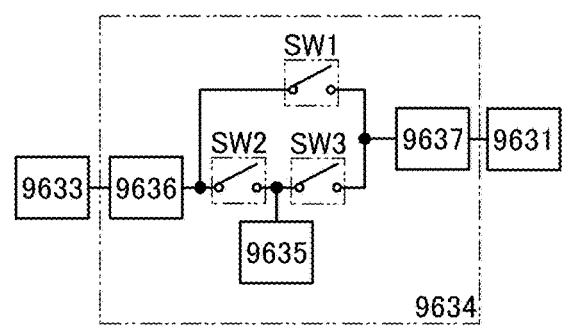

The structure and the operation of the charge and discharge control circuit 9634 illustrated in FIG. 29B will be described with reference to a block diagram in FIG. 29C. The solar cell 9633, the power storage device 9635, the DC-DC converter 9636, a converter 9637, switches SW1 to SW3, and the display portion 9631 are illustrated in FIG. 29C, and the power storage device 9635, the DC-DC converter 9636, the converter 9637, and the switches SW1 to SW3 correspond to the charge and discharge control circuit 9634 in FIG. 29B.

First, an example of operation in the case where power is generated by the solar cell 9633 using external light is described. The voltage of electric power generated by the solar cell is raised or lowered by the DC-DC converter 9636 to a voltage for charging the power storage device 9635. When the display portion 9631 is operated with the power from the solar cell 9633, the switch SW1 is turned on and the voltage of the power is raised or lowered by the converter 9637 to a voltage needed for operating the display portion 9631. In addition, when display on the display portion 9631 is not performed, the switch SW1 is turned off and the switch SW2 is turned on so that the power storage device 9635 may be charged.

Note that the solar cell 9633 is described as an example of a power generation means; however, one embodiment of the present invention is not limited to this example. The power storage device 9635 may be charged using another power generation means such as a piezoelectric element or a thermoelectric conversion element (Peltier element). For example, the power storage device 9635 may be charged with a non-contact power transmission module capable of performing charging by transmitting and receiving electric power wirelessly (without contact), or any of the other charge means used in combination.

The power storage device described in Embodiment 1 can be provided in wearable devices illustrated in FIGS. 30A, 30B1, and 30B2.

Figure 30A:
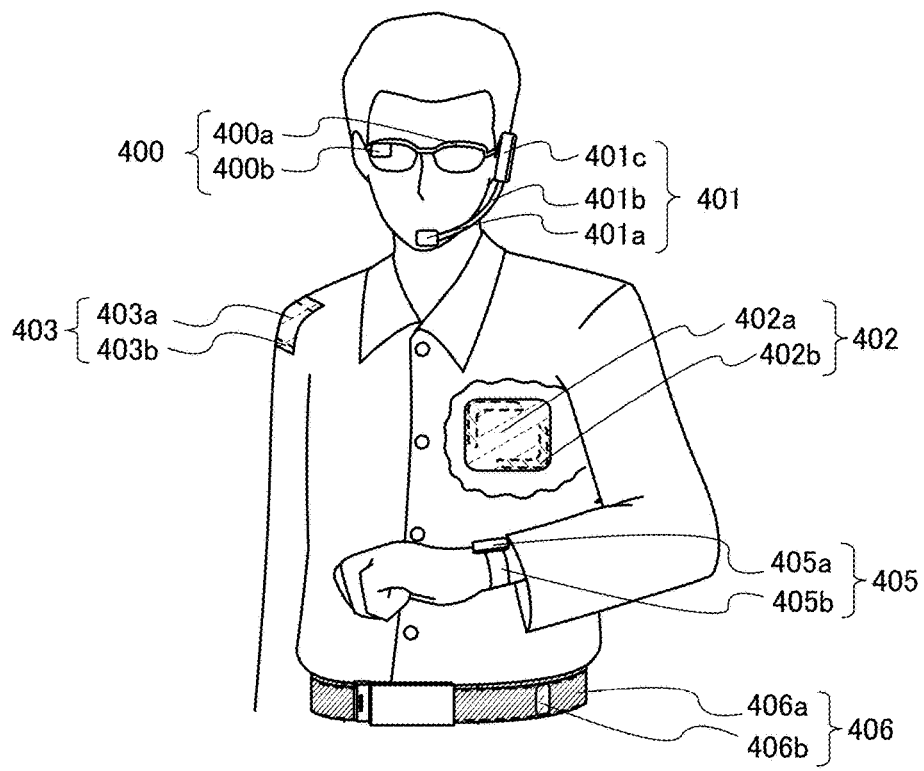
Figure 30A:
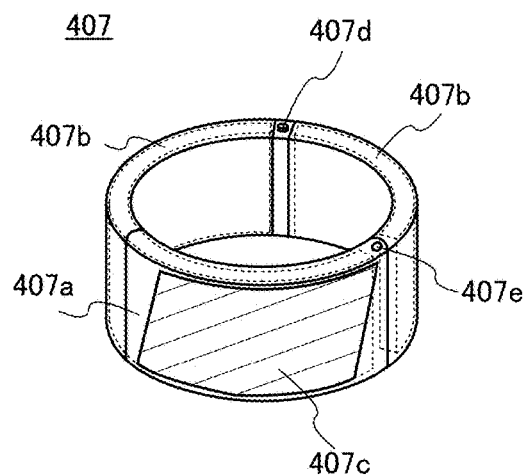
Figure 30A:
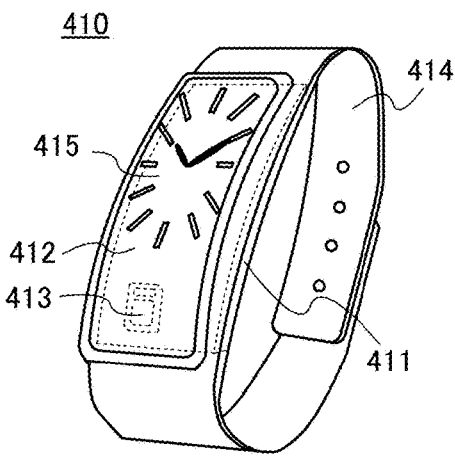

For example, the power storage device can be provided in a glasses-type device 400 illustrated in FIG. 30A. The glasses-type device 400 includes a frame 400a and a display portion 400b. The power storage device is provided in a temple of the frame 400a having a curved shape, whereby the glasses-type device 400 can have a well-balanced weight and can be used continuously for a long time.

The power storage device can also be provided in a headset-type device 401. The headset-type device 401 includes at least a microphone portion 401a, a flexible pipe 401b, and an earphone portion 401c. The power storage device can be provided in the flexible pipe 401b and the earphone portion 401c.

Furthermore, the power storage device can be provided in a device 402 that can be attached directly to a body. A power storage device 402b can be provided in a thin housing 402a of the device 402.

Furthermore, the power storage device can be provided in a device 403 that can be attached to clothes. A power storage device 403b can be provided in a thin housing 403a of the device 403.

Furthermore, the power storage device can be provided in a watch-type device 405. The watch-type device 405 includes a display portion 405a and a belt portion 405b, and the power storage device can be provided in the display portion 405a or the belt portion 405b.

Furthermore, the power storage device can be provided in a belt-type device 406. The belt-type device 406 includes a belt portion 406a and a wireless power feeding and receiving portion 406b, and the power storage device can be provided inside the belt portion 406a.

The power storage device described in Embodiment 1 can be provided in a wristband device 407 illustrated in FIG. 30B1. The wristband device 407 includes two curved power storage devices 407b in a case 407a. A curved display portion 407c is provided over a surface of the case 407a. For the display portion which can be used for the display portion 407c, the description of the display portion in FIG. 27 can be referred to. The armband device 407 includes a connection portion 407d and a hinge portion 407e. A portion between the connection portion 407d and the hinge portion 407e can be flexibly moved using the hinge portion 407e as an axis. Charging or the like through an external terminal provided in the connection portion 407d is also possible.

The power storage device described in Embodiment 1 can be provided in a wearable device 410 illustrated in FIG. 30B2. The wearable device 410 is provided with a curved power storage device 412 and a sensor portion 413 in a main body 411. The wearable device 410 includes a display portion 415 and a band portion 414 and can be worn on a wrist, for example. For the display portion which can be used for the display portion 415, the description of the display portion in FIG. 27 can be referred to. The display portion 415 can display various kinds of information such as time as illustrated in FIG. 30B2 and reception information of an e-mail or an incoming call.

In addition, the watch-type device 405 and the wearable device 410 are wearable devices that are wound around an arm directly; thus, a sensor that measures the pulse, the blood pressure, or the like of the user may be incorporated therein. Data on the exercise quantity and health of the user can be stored to be used for health maintenance.

Furthermore, devices that can be carried around, such as the above-described armband device 7300, mobile phone 7400, portable display device 7100, tablet terminal 9600, belt-type device 406, watch-type device 405, armband device 407, and wearable device 410, may be provided with a positioning system such as the global positioning system (GPS). With the system, the user can find his/her present position, and the system is useful in dealing with kidnapping, wandering, and the like.

Figure 31:
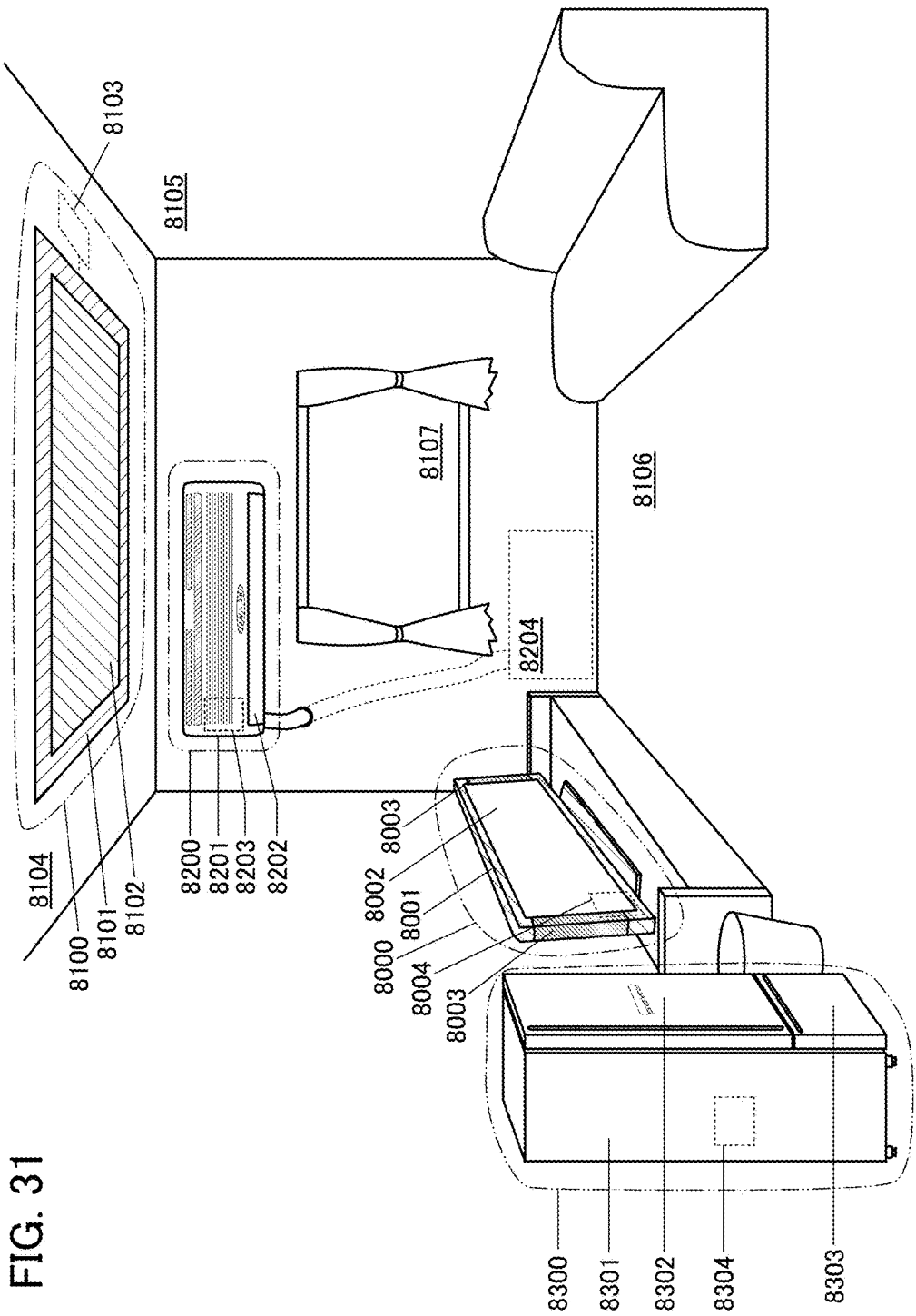
FIG. 31 illustrate examples of electronic devices.

FIG. 31 illustrates other examples of electronic devices. In FIG. 31, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, the power storage device 8004, and the like. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can operate with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 31, an installation lighting device 8100 is an example of an electronic device including a power storage device 8103 of one embodiment of the present invention. Specifically, the lighting device 8100 includes a housing 8101, a light source 8102, the power storage device 8103, and the like. Although FIG. 31 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can operate with the use of the power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 31 as an example, the power storage device of one embodiment of the present invention can be used in an installation lighting device provided in, for example, a wall 8105, a floor 8106, or a window 8107 other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 31, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, the power storage device 8203, and the like. Although FIG. 31 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can operate with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 31 as an example, the power storage device of one embodiment of the present invention can be used in an air conditioner in which the functions of an indoor unit and an outdoor unit are integrated in one housing.

In FIG. 31, an electric refrigerator-freezer 8300 is an example of an electronic device including a power storage device 8304 of one embodiment of the present invention. Specifically, the electric refrigerator-freezer 8300 includes a housing 8301, a refrigerator door 8302, a freezer door 8303, the power storage device 8304, and the like. The power storage device 8304 is provided in the housing 8301 in FIG. 31. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can operate with the use of the power storage device 8304 of one embodiment of the present invention as an uninterruptible power supply even when electric power cannot be supplied from a commercial power supply due to power failure or the like.

This embodiment can be implemented in appropriate combination with any of the other embodiments.

(Embodiment 5)

In this embodiment, examples of vehicles including the power storage device described in Embodiment 1 will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 32A:
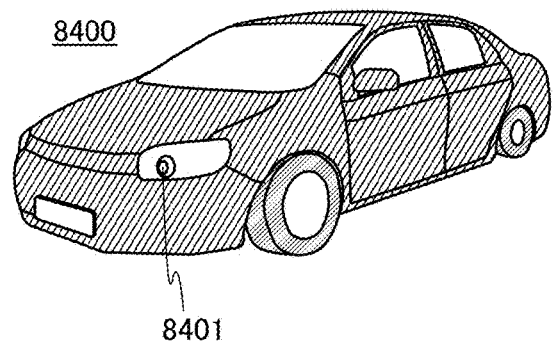
FIGS. 32A and 32B illustrate examples of electronic devices.
Figure 32B:
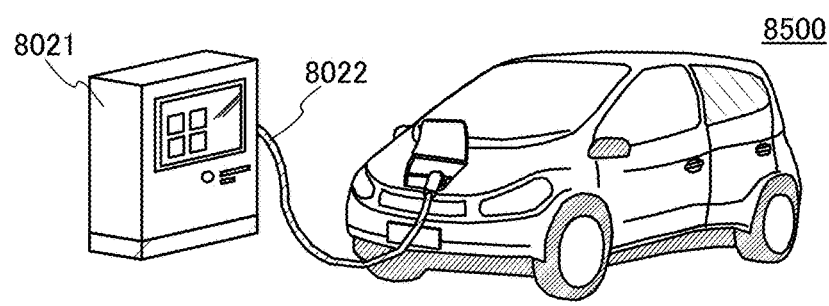

FIGS. 32A and 32B each illustrate an example of a vehicle using one embodiment of the present invention. An automobile 8400 illustrated in FIG. 32A is an electric vehicle which runs on the power of the electric motor. Alternatively, the automobile 8400 is a hybrid electric vehicle capable of driving using either the electric motor or the engine as appropriate. One embodiment of the present invention achieves a high-mileage vehicle. The automobile 8400 includes the power storage device. The power storage device is used not only to drive the electric motor, but also to supply electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 32B illustrates an automobile 8500 including the power storage device. The automobile 8500 can be charged when the power storage device is supplied with electric power through external charging equipment by a plug-in system, a contactless power feeding system, or the like. In FIG. 32B, the power storage device included in the automobile 8500 is charged with the use of a ground-based charging apparatus 8021 through a cable 8022. In charging, a given method such as CHAdeMO (registered trademark) or Combined Charging System may be referred to for a charging method, the standard of a connector, or the like as appropriate. The charging apparatus 8021 may be a charging station provided in a commerce facility or a power source in a house. With the use of a plug-in technique, the power storage device included in the automobile 8500 can be charged by being supplied with electric power from outside, for example. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between vehicles. A solar cell may be provided in the exterior of the vehicle to charge the power storage device when the vehicle stops or moves. To supply electric power in such a contactless manner, an electromagnetic induction method or a magnetic resonance method can be used.

Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

This application is based on Japanese Patent Application serial no. 2015-094030 filed with Japan Patent Office on May 1, 2015, the entire contents of which are hereby incorporated by reference.

What is claimed is:

1. A power storage device comprising:
   a positive electrode;
   a negative electrode;
   an electrolyte;
   an exterior body; and
   an electrode lead,
   wherein the positive electrode comprises a positive electrode current collector and a positive electrode active material layer in contact with the positive electrode current collector,
   wherein the negative electrode comprises a negative electrode current collector and a negative electrode active material layer in contact with the negative electrode current collector,
   wherein the positive electrode active material layer and the negative electrode active material layer overlap with each other,
   wherein the positive electrode, the negative electrode, and the electrolyte are surrounded by the exterior body,
   wherein $P_y > P_x$, $N_y > N_x$, and $N_y > P_y + N_x - P_x$ are satisfied, where a length of the positive electrode active material layer is $P_y$, a width of the positive electrode active material layer is $P_x$, a length of the negative electrode active material layer is $N_y$, and a width of the negative electrode active material layer is $N_x$, and
   wherein $N_y = P_y + G_{y1} + G_{y2}$ is satisfied and $G_{y2}$ is greater than $G_{y1}$, where $G_{y1}$ is a distance between a first end of the positive electrode active material layer and a first end of the negative electrode active material layer and $G_{y2}$ is a distance between a second end of the positive electrode active material layer and a second end of the negative electrode active material layer in a length direction, the first end of the positive electrode active material layer is closer to the electrode lead than the second end of the positive electrode active material layer is, and the first end of the negative electrode active material layer is closer to the electrode lead than the second end of the negative electrode active material layer is.

2. The power storage device according to claim 1, wherein the positive electrode or the negative electrode is configured to be curved.

3. The power storage device according to claim 1, wherein the positive electrode or the negative electrode comprises a curved portion.

4. The power storage device according to claim 1, wherein the exterior body comprises a film.

5. The power storage device according to claim 1, further comprising:
   a first electrode; and
   a second electrode,
   wherein the first electrode and the second electrode both function as positive electrodes or negative electrodes,
   wherein the first electrode comprises a first current collector and a first active material layer,
   wherein the second electrode comprises a second current collector and a second active material layer, and
   wherein $A_y > B_y$ is satisfied, where a length of the first active material layer is $A_y$ and a length of the second active material layer is $B_y$.

6. An electronic device comprising:
   the power storage device according to claim 1; and
   a flexible housing.

7. An electronic device comprising:
   the power storage device according to claim 1; and
   a housing comprising a curved portion.

8. A power storage device comprising:
   a stack;
   an electrolyte;
   an exterior body; and
   an electrode lead,
   wherein the stack comprises a positive electrode, a negative electrode, and a separator,
   wherein the positive electrode comprises a positive electrode current collector and a positive electrode active material layer in contact with the positive electrode current collector,
   wherein the negative electrode comprises a negative electrode current collector and a negative electrode active material layer in contact with the negative electrode current collector,
   wherein the positive electrode active material layer and the negative electrode active material layer overlap with each other,
   wherein the stack and the electrolyte are surrounded by the exterior body,
   wherein the stack is configured to be curved,
   wherein $N_y \geq P_y(z/r+1)$ is satisfied, where a radius of curvature of a concave surface of the stack is r when the stack is curved, a height of the stack is z, a length of the positive electrode active material layer is $P_y$, and a length of the negative electrode active material layer is $N_y$, and
   wherein $N_y = P_y + G_{y1} + G_{y2}$ is satisfied and $G_{y2}$ is greater than $G_{y1}$, where $G_{y1}$ is a distance between a first end of the positive electrode active material layer and a first end of the negative electrode active material layer and $G_{y2}$ is a distance between a second end of the positive electrode active material layer and a second end of the negative electrode active material layer in a length direction, the first end of the positive electrode active material layer is closer to the electrode lead than the second end of the positive electrode active material layer is, and the first end of the negative electrode active material layer is closer to the electrode lead than the second end of the negative electrode active material layer is.

9. The power storage device according to claim 8, wherein the exterior body comprises a film.

10. The power storage device according to claim 8, further comprising:
a first electrode; and
a second electrode,
wherein the first electrode and the second electrode both function as positive electrodes or negative electrodes,
wherein the first electrode comprises a first current collector and a first active material layer,
wherein the second electrode comprises a second current collector and a second active material layer, and
wherein $A_y > B_y$ is satisfied, where a length of the first active material layer is $A_y$ and a length of the second active material layer is $B_y$.

11. An electronic device comprising:
the power storage device according to claim 8; and
a flexible housing.

12. An electronic device comprising:
the power storage device according to claim 8; and
a housing comprising a curved portion.

13. A power storage device comprising:
a stack;
an electrolyte;
an exterior body; and
an electrode lead,
wherein the stack comprises a positive electrode, a negative electrode, and a separator,
wherein the positive electrode comprises a positive electrode current collector and a positive electrode active material layer in contact with the positive electrode current collector,
wherein the negative electrode comprises a negative electrode current collector and a negative electrode active material layer in contact with the negative electrode current collector,
wherein the stack and the electrolyte are surrounded by the exterior body,
wherein the stack comprises a curved portion,
wherein the curved portion comprises a convex surface and a concave surface,
wherein $N_y \geq P_y(z/r+1)$ is satisfied, where a radius of curvature of the concave surface is r, a height of the stack is z, a length of the positive electrode active material layer is $P_y$, and a length of the negative electrode active material layer is $N_y$, and
wherein $N_y = P_y + G_{y1} + G_{y2}$ is satisfied and $G_{y2}$ is greater than $G_{y1}$, where $G_{y1}$ is a distance between a first end of the positive electrode active material layer and a first end of the negative electrode active material layer and $G_{y2}$ is a distance between a second end of the positive electrode active material layer and a second end of the negative electrode active material layer in a length direction, the first end of the positive electrode active material layer is closer to the electrode lead than the second end of the positive electrode active material layer is, and the first end of the negative electrode active material layer is closer to the electrode lead than the second end of the negative electrode active material layer is.

14. The power storage device according to claim 13, wherein the exterior body comprises a film.

15. The power storage device according to claim 13, further comprising:
a first electrode; and
a second electrode,
wherein the first electrode and the second electrode both function as positive electrodes or negative electrodes,
wherein the first electrode comprises a first current collector and a first active material layer,
wherein the second electrode comprises a second current collector and a second active material layer, and
wherein $A_y > B_y$ is satisfied, where a length of the first active material layer is $A_y$ and a length of the second active material layer is $B_y$.

16. An electronic device comprising:
the power storage device according to claim 13; and
a flexible housing.

17. An electronic device comprising:
the power storage device according to claim 13; and
a housing comprising a curved portion.

18. The power storage device according to claim 1, further comprising a separator, wherein a length of the separator is greater than $N_y$.

19. The power storage device according to claim 8, wherein a length of the separator is greater than $N_y$.

20. The power storage device according to claim 13, wherein a length of the separator is greater than $N_y$.

* * * * *